US011108987B2

(12) United States Patent
Ray et al.

(10) Patent No.: US 11,108,987 B2
(45) Date of Patent: Aug. 31, 2021

(54) 360 NEIGHBOR-BASED QUALITY SELECTOR, RANGE ADJUSTER, VIEWPORT MANAGER, AND MOTION ESTIMATOR FOR GRAPHICS

(71) Applicant: Intel Corporation, Santa Clara, CA (US)

(72) Inventors: Joydeep Ray, Folsom, CA (US); Abhishek R. Appu, El Dorado Hills, CA (US); Stanley J. Baran, Chandler, AZ (US); Sang-Hee Lee, San Jose, CA (US); Atthar H. Mohammed, Folsom, CA (US); Jong Dae Oh, San Jose, CA (US); Hiu-Fai R. Chan, Rancho Cordova, CA (US); Ximin Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 16/707,986

(22) Filed: Dec. 9, 2019

(65) Prior Publication Data
US 2020/0195878 A1 Jun. 18, 2020

Related U.S. Application Data

(63) Continuation of application No. 15/477,014, filed on Apr. 1, 2017, now Pat. No. 10,506,196.

(51) Int. Cl.
*H04N 17/00* (2006.01)
*H04N 13/00* (2018.01)
(Continued)

(52) U.S. Cl.
CPC ............ *H04N 5/52* (2013.01); *H04N 13/139* (2018.05); *H04N 19/124* (2014.11);
(Continued)

(58) Field of Classification Search
CPC ............ H04N 5/23238; H04N 19/124; H04N 2207/10016; G06T 2207/10016
(Continued)

(56) References Cited

U.S. PATENT DOCUMENTS 10,506,196 B2 * 12/2019 Ray .................... H04N 13/139
10,506,255 B2 * 12/2019 Boyce .................. G06T 11/003
(Continued)

FOREIGN PATENT DOCUMENTS

| EP | 2645717 A1 | 10/2013 |
| WO | 2012050808 A1 | 4/2012 |
| WO | 2013064098 A1 | 5/2013 |

OTHER PUBLICATIONS

Nicholas Wilt, "The CUDA Handbook: A Comprehensive Guide to GPU Programming", 522 pages, Jun. 2013, Addison-Wesley, USA.
(Continued)

*Primary Examiner* — Brian P Yenke
*Assistant Examiner* — Jean W Desir
(74) *Attorney, Agent, or Firm* — Jordan IP Law, LLC

(57) ABSTRACT

An embodiment may include a display processor, memory to store a 2D frame corresponding to a projection from a 360 video, and a quality selector to select a quality factor for a block of the 2D frame based on quality information from neighboring blocks of the 2D frame, including blocks which are neighboring only in the 360 video space. The system may also include a range adjuster to adjust a search range for the 2D frame based on a search area of the 2D frame, a viewport manager to determine if a request for a viewport of the 2D frame extends beyond a first edge of the 2D frame and to fill the requested viewport with wrap-around image information, and/or a motion estimator to estimate motion information based on both color information and depth information. Other embodiments are disclosed and claimed.

24 Claims, 44 Drawing Sheets

(51) Int. Cl.

| | |
|---|---|
| *H04N 5/52* | (2006.01) |
| *H04N 19/124* | (2014.01) |
| *H04N 19/154* | (2014.01) |
| *H04N 13/139* | (2018.01) |
| *H04N 19/176* | (2014.01) |
| *H04N 19/167* | (2014.01) |
| *H04N 19/597* | (2014.01) |
| *H04N 19/436* | (2014.01) |
| *H04N 19/86* | (2014.01) |
| *H04N 5/232* | (2006.01) |
| *H04N 5/14* | (2006.01) |

(52) U.S. Cl.
CPC ......... *H04N 19/154* (2014.11); *H04N 19/167* (2014.11); *H04N 19/176* (2014.11); *H04N 19/436* (2014.11); *H04N 19/597* (2014.11); *H04N 19/86* (2014.11); *G06T 2207/10016* (2013.01); *H04N 5/144* (2013.01); *H04N 5/23238* (2013.01)

(58) Field of Classification Search
USPC ................. 348/420.1, 36, 51; 382/232, 236; 375/240.24, 240.01
See application file for complete search history.

(56) References Cited

U.S. PATENT DOCUMENTS

| | | | |
|---|---|---|---|
| 10,587,800 B2* | 3/2020 | Boyce | ................ H04N 5/23238 |
| 2006/0034374 A1 | 2/2006 | Park et al. | |
| 2010/0091836 A1 | 4/2010 | Jia | |
| 2010/0128777 A1 | 5/2010 | Garg et al. | |
| 2010/0128797 A1 | 5/2010 | Dey | |
| 2010/0128798 A1 | 5/2010 | Choudhury | |
| 2010/0201791 A1 | 8/2010 | Slavenburg et al. | |
| 2011/0085079 A1 | 4/2011 | Ruggiero | |
| 2011/0248993 A1 | 10/2011 | Xu | |
| 2012/0050303 A1 | 3/2012 | McAllister et al. | |
| 2012/0075437 A1 | 3/2012 | Slavenburg et al. | |
| 2013/0120524 A1 | 5/2013 | Zheng | |
| 2013/0121563 A1 | 5/2013 | Chen et al. | |
| 2013/0322526 A1 | 12/2013 | Aoki et al. | |
| 2014/0028679 A1 | 1/2014 | Pajak et al. | |
| 2014/0028703 A1 | 1/2014 | Pajak et al. | |
| 2014/0049602 A1 | 2/2014 | Zhu et al. | |
| 2014/0057714 A1 | 2/2014 | Phadake | |
| 2014/0062975 A1 | 3/2014 | Panvelwala | |
| 2014/0071245 A1 | 3/2014 | Zhang et al. | |
| 2014/0079327 A1 | 3/2014 | Diard | |
| 2014/0092113 A1 | 4/2014 | Petersen et al. | |
| 2014/0153635 A1 | 6/2014 | Zhang et al. | |
| 2014/0184813 A1 | 7/2014 | Cohen et al. | |
| 2014/0184894 A1 | 7/2014 | Motta | |
| 2014/0185952 A1 | 7/2014 | Cabral | |
| 2014/0267222 A1 | 9/2014 | Gupta et al. | |
| 2014/0270551 A1 | 9/2014 | Baranowski et al. | |
| 2014/0282751 A1 | 9/2014 | Lee et al. | |
| 2014/0286390 A1 | 9/2014 | Fear | |
| 2014/0321732 A1 | 10/2014 | Bhat et al. | |
| 2014/0327771 A1 | 11/2014 | Malachowsky et al. | |
| 2014/0347439 A1 | 11/2014 | Jia et al. | |
| 2014/0369613 A1 | 12/2014 | Avadhanam et al. | |
| 2015/0009306 A1 | 1/2015 | More | |
| 2015/0022636 A1 | 1/2015 | Savransky | |
| 2015/0036875 A1 | 2/2015 | Savransky | |
| 2015/0103184 A1 | 4/2015 | Tracey et al. | |
| 2015/0116294 A1 | 4/2015 | Kumar | |
| 2015/0138065 A1 | 5/2015 | Alfieri | |
| 2015/0139543 A1 | 5/2015 | Stewart | |
| 2015/0208079 A1 | 7/2015 | Pore et al. | |
| 2015/0221064 A1 | 8/2015 | Thomas et al. | |
| 2015/0229879 A1 | 8/2015 | Vojkovich | |
| 2015/0243048 A1 | 8/2015 | Kim | |
| 2015/0256835 A1* | 9/2015 | Sakai | .................... G06F 16/786 375/240.25 |
| 2015/0264299 A1 | 9/2015 | Leech et al. | |
| 2015/0310789 A1 | 10/2015 | Heide et al. | |
| 2015/0310798 A1 | 10/2015 | Heide et al. | |
| 2015/0348509 A1 | 12/2015 | Verbeure et al. | |
| 2016/0112704 A1 | 4/2016 | Grange et al. | |
| 2017/0026659 A1 | 1/2017 | Lin et al. | |
| 2017/0251204 A1 | 8/2017 | Gupte et al. | |
| 2017/0374375 A1 | 12/2017 | Makar et al. | |
| 2018/0242016 A1* | 8/2018 | Lee | ........................ H04N 19/86 |
| 2018/0286024 A1* | 10/2018 | Schluessler | ............... G06T 1/20 |
| 2018/0288435 A1* | 10/2018 | Boyce | .................. H04N 19/176 |
| 2018/0295282 A1* | 10/2018 | Boyce | ................ H04N 21/4728 |
| 2019/0230337 A1* | 7/2019 | Kim | ........................ H04N 19/13 |
| 2019/0297332 A1* | 9/2019 | Zheng | .................. H04N 19/105 |
| 2020/0186831 A1* | 6/2020 | Boyce | .................. H04N 19/136 |
| 2020/0388003 A1* | 12/2020 | Dsouza | .................... G06T 5/50 |

OTHER PUBLICATIONS

Shane Cook, "CUDA Programming: A Developer's Guide to Parallel Computing with GPUs", 591 pages, 2013, Elsevier, USA.

European Search Report for EP Patent Application No. 18165269.4, dated Sep. 4, 2018, 16 pages.

Kondo et al., "Improvement of delta-QP Coding", Joint Collaborative Team on Video Coding of ITU-T SG16 WP3 and ISO/IEC JTCI/SC29/WG11, Jul. 14-22, 2011, 6 pages.

Hanhart et al., "AHG8: High level syntax extensions for signaling of 360-degree video information", Joint Video Exploration Team of ITU-T SG16 WP3 and ISO/IEC JTC 1/SC 29/WG 11, Oct. 15-21, 2016, 6 pages.

Extended European Search Report for EP Patent Application No. 18165269.4, dated Dec. 10, 2018, 13 pages.

Restriction Requirement for U.S. Appl. No. 15/477,014, dated Nov. 1, 2017, 8 pages.

Office Action for U.S. Appl. No. 15/477,014, dated May 9, 2018, 15 pages.

Office Action for U.S. Appl. No. 15/477,014, dated Dec. 13, 2018, 8 pages.

Office Action for U.S. Appl. No. 15/477,014, dated Mar. 20, 2019, 13 pages.

Notice of Allowance for U.S. Appl. No. 15/477,014, dated Jul. 26, 2019, 7 pages.

\* cited by examiner

Frame t

Frame t+1

Frame t + 1.5

360 NEIGHBOR-BASED QUALITY SELECTOR, RANGE ADJUSTER, VIEWPORT MANAGER, AND MOTION ESTIMATOR FOR GRAPHICS

CROSS REFERENCE WITH RELATED APPLICATIONS

This application claims the benefit of priority to U.S. patent application Ser. No. 15/477,014 filed Apr. 1, 2017.

TECHNICAL FIELD

Embodiments generally relate to display technology, and more particularly, to block based camera updates and asynchronous displays. More particularly, embodiments relate to one or more of a 360 neighbor-based quality selector, range adjuster, viewport manager, and motion estimator for graphics.

BACKGROUND

In 360 video, which is also known as 360 degree video, immersive video, or spherical video, video recordings may be taken from every direction (i.e., over 360 degrees) simultaneously using an omnidirectional camera or a collection of cameras. In playback, the viewer may select a viewing direction or viewport for viewing among any of the available directions. In compression/decompression (codec) systems, compression efficiency, video quality, and computational efficiency may be important performance criteria. These criteria may also be an important factor in the dissemination of 360 video and the user experience in the viewing of such 360 video.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

In some embodiments, a graphics processing unit (GPU) is communicatively coupled to host/processor cores to accelerate graphics operations, machine-learning operations, pattern analysis operations, and various general purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
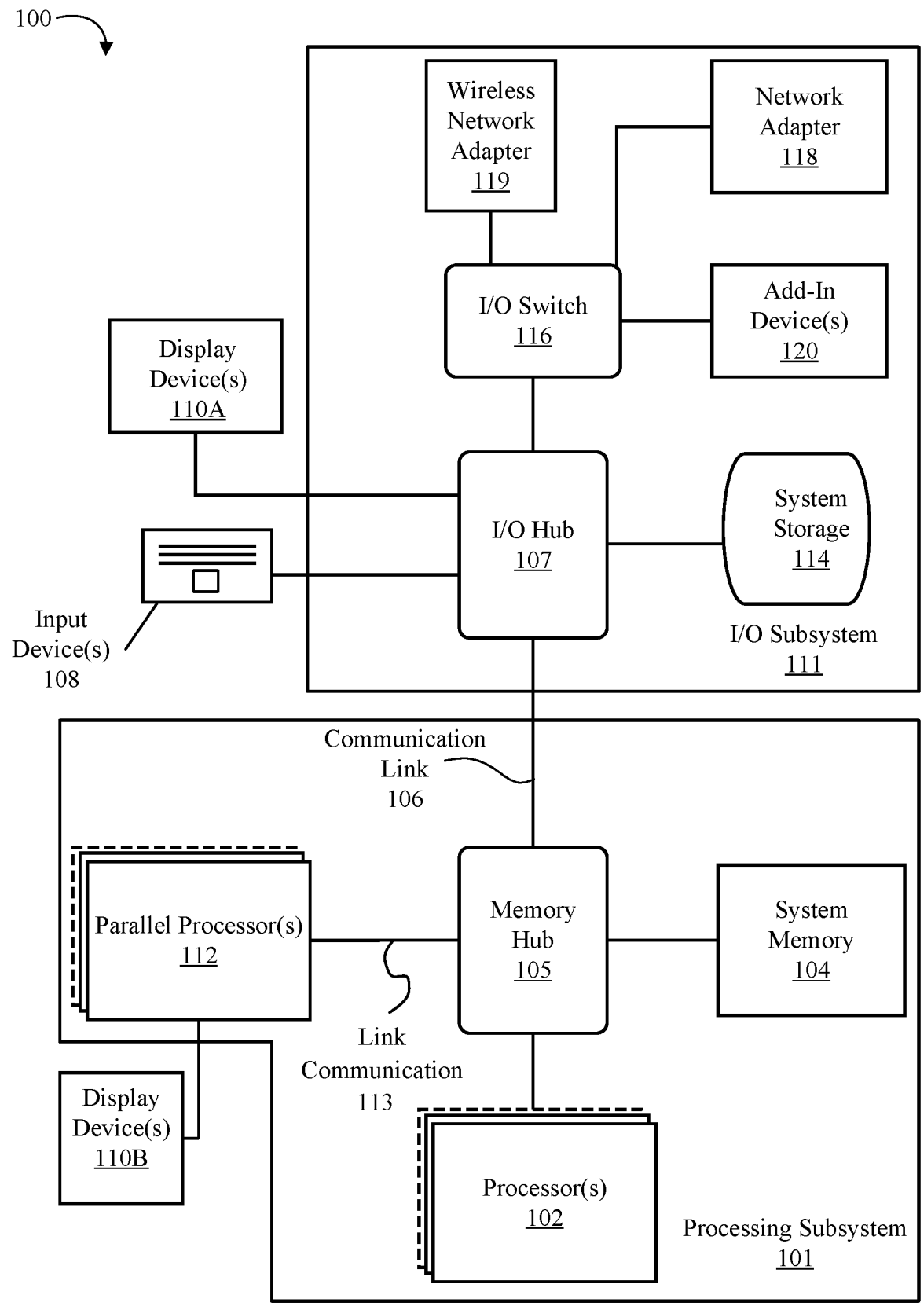
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that an include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s), 112 memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Large embodiments may include two or more sets of processor(s) 102 attached via multiple sockets, which can couple with two or more instances of the parallel processor(s) 112. Some of the particular components shown herein are optional and may not be included in all implementations of the computing system 100. For example, any number of add-in cards or peripherals may be supported, or some components may be eliminated.

Figure 2A:
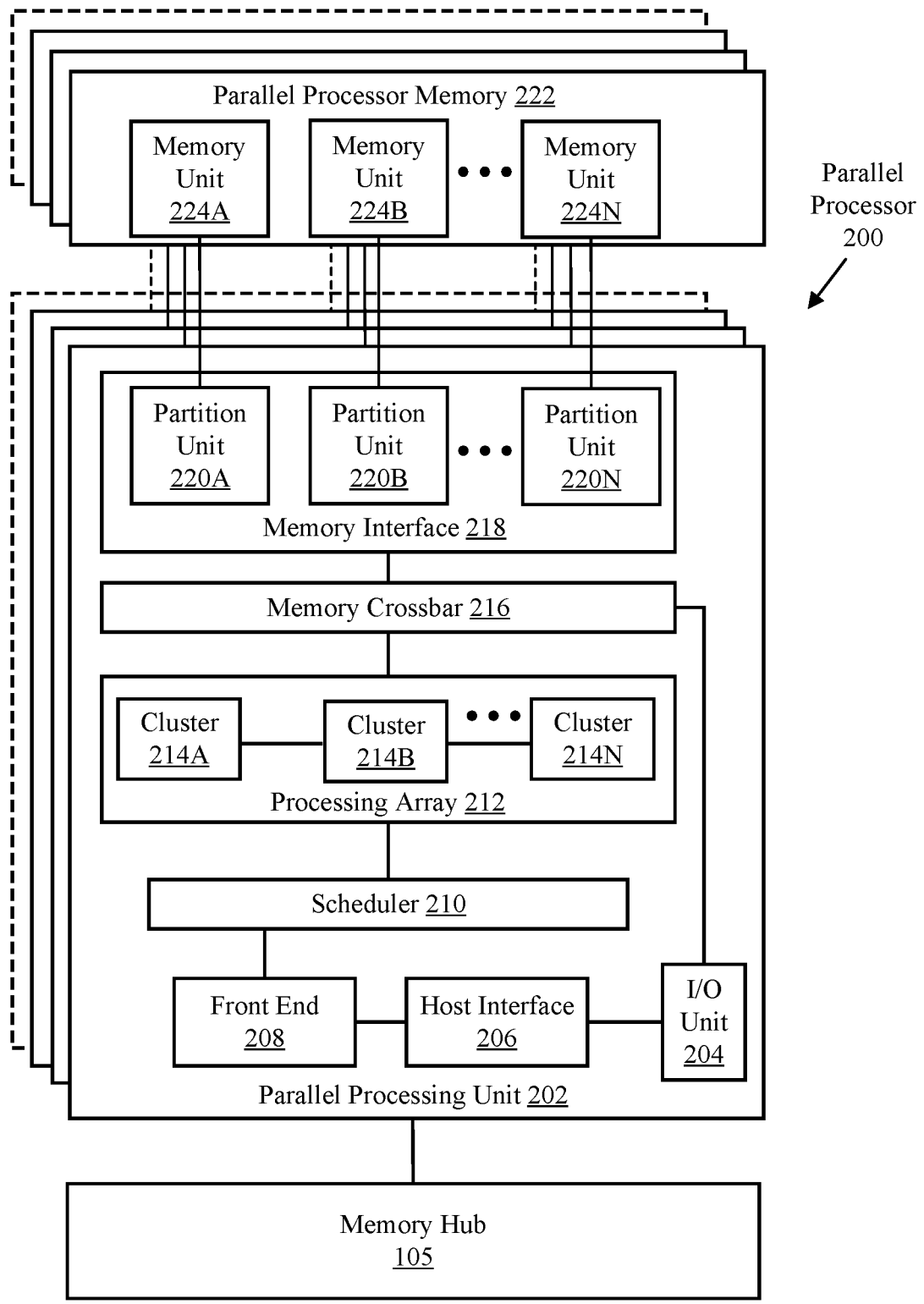
FIGS. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212.

The processing cluster array 212 can include up to "N" processing clusters (e.g., cluster 214A, cluster 214B, through cluster 214N). Each cluster 214A-214N of the processing cluster array 212 is capable of executing a large number (e.g., thousands) of concurrent threads, where each thread is an instance of a program.

In one embodiment, different clusters 214A-214N can be allocated for processing different types of programs or for performing different types of computations. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including but not limited to, linear and nonlinear data transforms, filtering of video and/or audio data, and/or modeling operations (e.g., applying laws of physics to determine position, velocity and other attributes of objects).

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that are each directly coupled to a portion (e.g., memory unit) of parallel processor memory 222. The number of partition units 220A-220N generally equals the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not equal the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-

224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data to be written to any of the memory units 224A-224N within parallel processor memory 222. The memory crossbar 216 can be configured to route the output of each cluster 214A-214N to the input of any partition unit 220A-220N or to another cluster 214A-214N for further processing. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
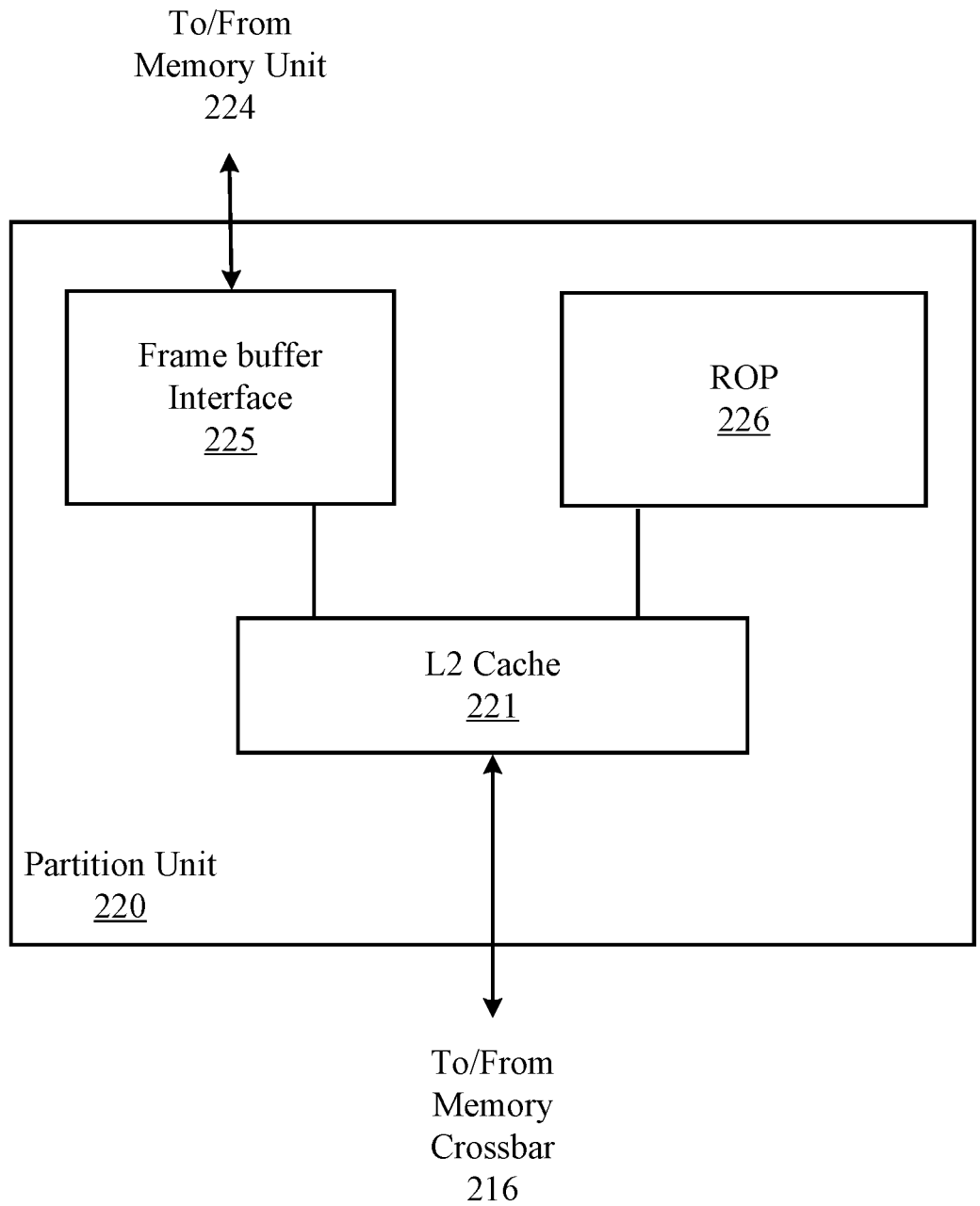

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Dirty updates can also be sent to the frame buffer via the frame buffer interface 225 for opportunistic processing. In one embodiment the frame buffer interface 225 interfaces with one of the memory units in parallel processor memory, such as the memory units 224A-224N of FIG. 2 (e.g., within parallel processor memory 222).

In graphics applications, the ROP 226 is a processing unit that performs raster operations, such as stencil, z test, blending, and the like, and outputs pixel data as processed graphics data for storage in graphics memory. In some embodiments, ROP 226 may be configured to compress z or color data that is written to memory and decompress z or color data that is read from memory. In some embodiments, the ROP 226 is included within each processing cluster (e.g., cluster 214A-214N of FIG. 2) instead of within the partition unit 220. In such embodiment, read and write requests for pixel data are transmitted over the memory crossbar 216 instead of pixel fragment data.

The processed graphics data may be displayed on display device, such as one of the one or more display device(s) 110 of FIG. 1, routed for further processing by the processor(s) 102, or routed for further processing by one of the processing entities within the parallel processor 200 of FIG. 2A.

Figure 2C:
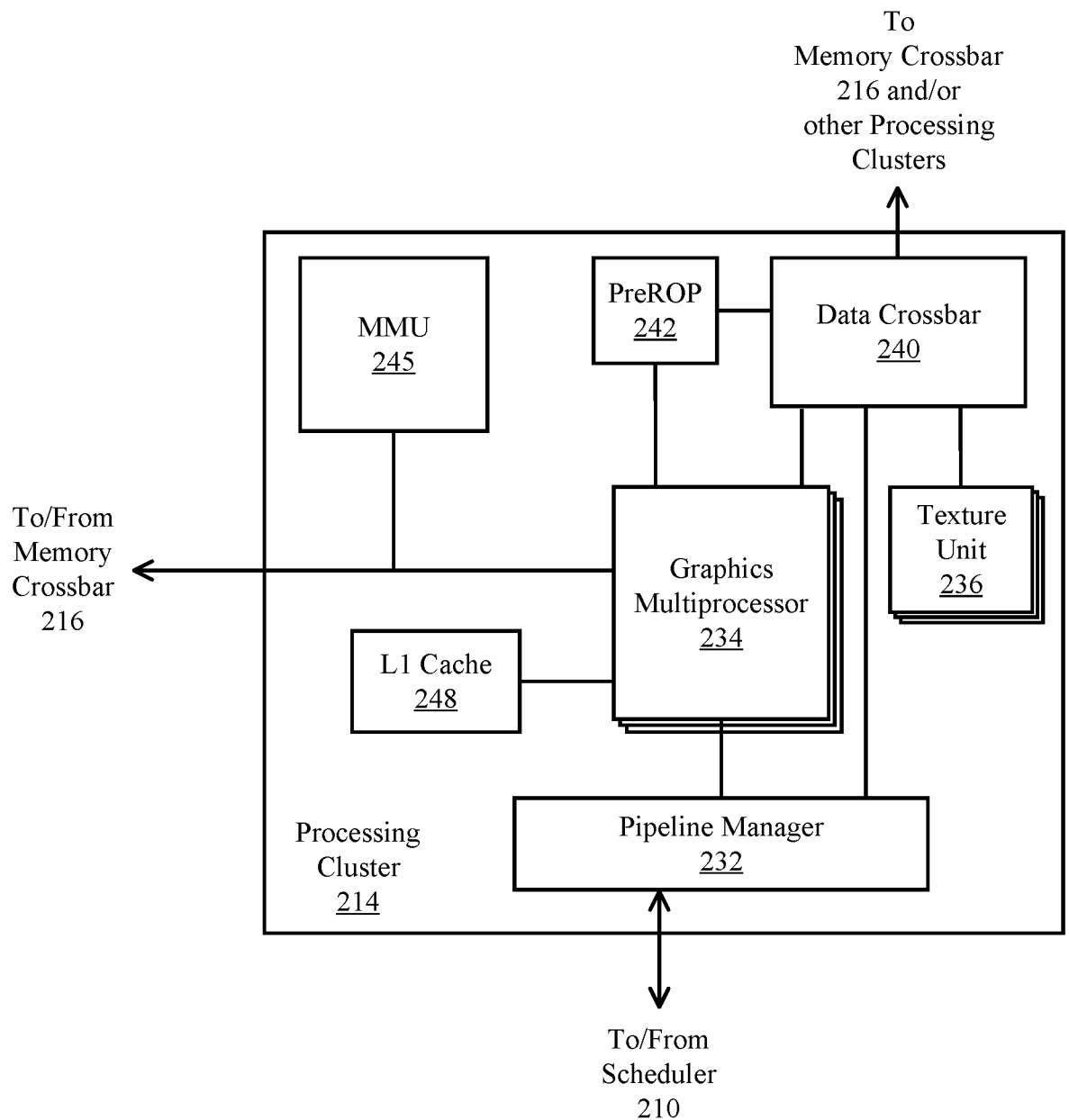

FIG. 2C is a block diagram of a processing cluster 214 within a parallel processing unit, according to an embodiment. In one embodiment the processing cluster is an instance of one of the processing clusters 214A-214N of FIG. 2. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2 and manages execution of those instructions via a graphics multiprocessor 234 and/or a texture unit 236. The illustrated graphics multiprocessor 234 is an exemplary instance of an SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed vis the data crossbar 240.

Each graphics multiprocessor 234 within the processing cluster 214 can include an identical set of functional execution logic (e.g., arithmetic logic units, load-store units, etc.), which may be pipelined, allowing a new instruction to be issued before a previous instruction has finished. Any combination of functional execution logic may be provided. In one embodiment, the functional logic supports a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to the processing cluster 214 constitutes a thread, as previously defined herein, and the collection of a certain number of concurrently executing threads across the parallel processing engines (not shown) within an graphics multiprocessor 234 is referred to herein as a thread group. As used herein, a thread group refers to a group of threads concurrently executing the same program on different input data, with one thread of the group being assigned to a different processing engine within a graphics multiprocessor 234. A thread group may include fewer threads than the number of processing engines within the graphics multiprocessor 234, in which case some processing engines will be idle during cycles when that thread group is being processed. A thread group may also include more threads than the number of processing engines within the graphics multiprocessor 234, in which case processing will take place over consecutive clock cycles. Each graphics multiprocessor 234 can support up to G thread groups concurrently. Additionally, a plurality of related thread groups may be active (in different phases of execution) at the same time within a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 308) within the processing cluster 214. Each graphics multiprocessor 234 also has access to L2 caches within the partition units (e.g., partition units 220A-220N of FIG. 2) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 308.

Each processing cluster 214 may include an MMU 245 (memory management unit) that is configured to map virtual addresses into physical addresses. In other embodiments, one or more instances of the MMU 245 may reside within the memory interface 218 of FIG. 2. The MMU 245 includes a set of page table entries (PTEs) used to map a virtual address to a physical address of a tile (talk more about tiling) and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether or not a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
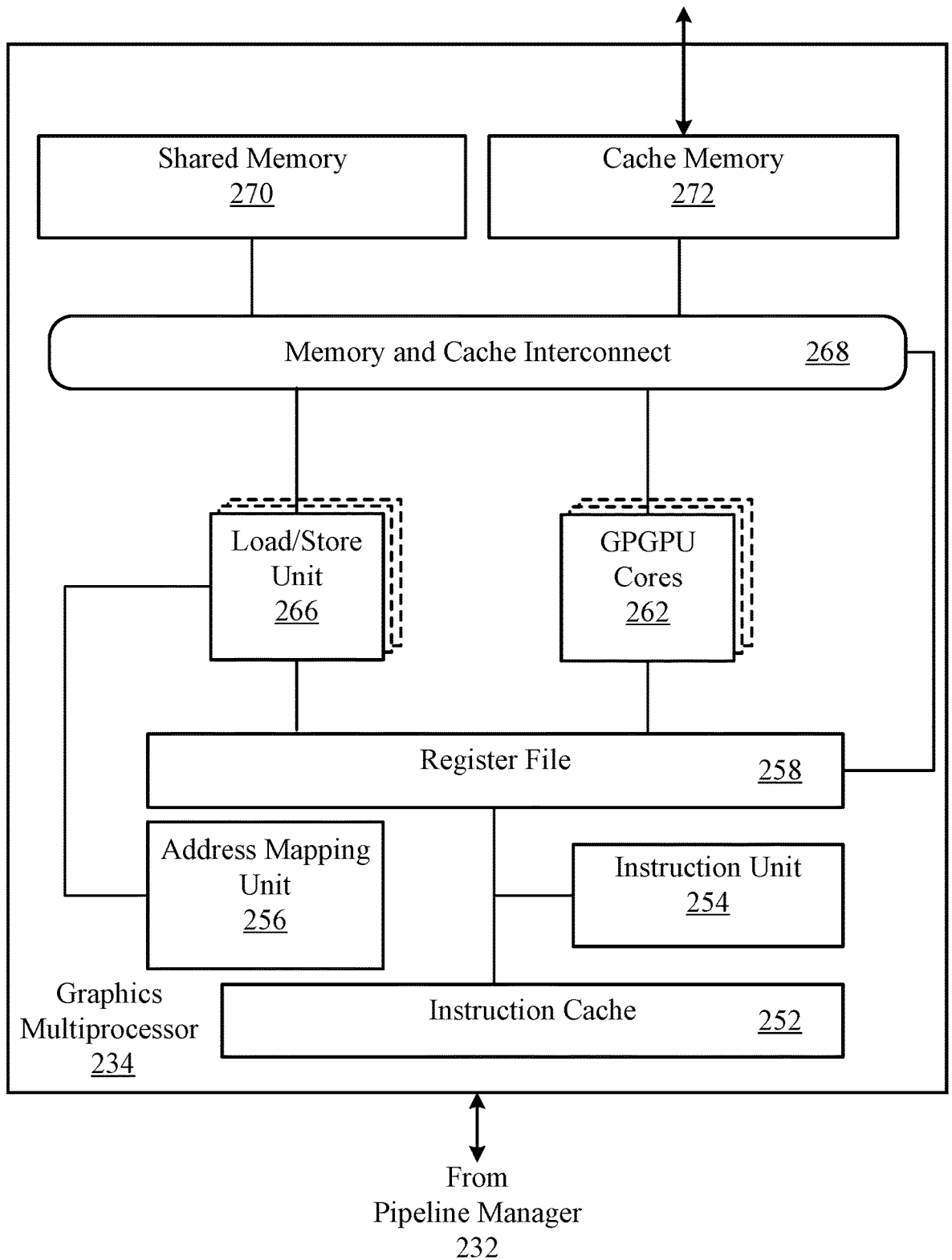

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 324. The register file 258 provides temporary storage for operands connected to the data paths of the functional units (e.g., GPGPU cores 262, load/store units 266) of the graphics multiprocessor 324. In one embodiment, the register file 258 is divided between each of the functional units such that each functional unit is allocated a dedicated portion of the register file 258. In one embodiment, the register file 258 is divided between the different warps being executed by the graphics multiprocessor 324.

The GPGPU cores 262 can each include floating point units (FPUs) and/or integer arithmetic logic units (ALUs) that are used to execute instructions of the graphics multiprocessor 324. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 324 can additionally include one or more fixed function or special function units to perform specific functions such as copy rectangle or pixel blending operations. In one embodiment one or more of the GPGPU cores can also include fixed or special function logic, The memory and cache interconnect 268 is an interconnect network that connects each of the functional units of the graphics multiprocessor 324 to the register file 258 and to the shared memory 270. In one embodiment, the memory and cache interconnect 268 is a crossbar interconnect that allows the load/store unit 266 to implement load and store operations between the shared memory 270 and the register file 258. In one embodiment the shared memory 270 can be used to enable communication between threads that execute on the functional units. The cache memory 272 can be used as a data cache for example, to cache texture data communicated between the functional units and the texture unit 236.

Figure 3A:
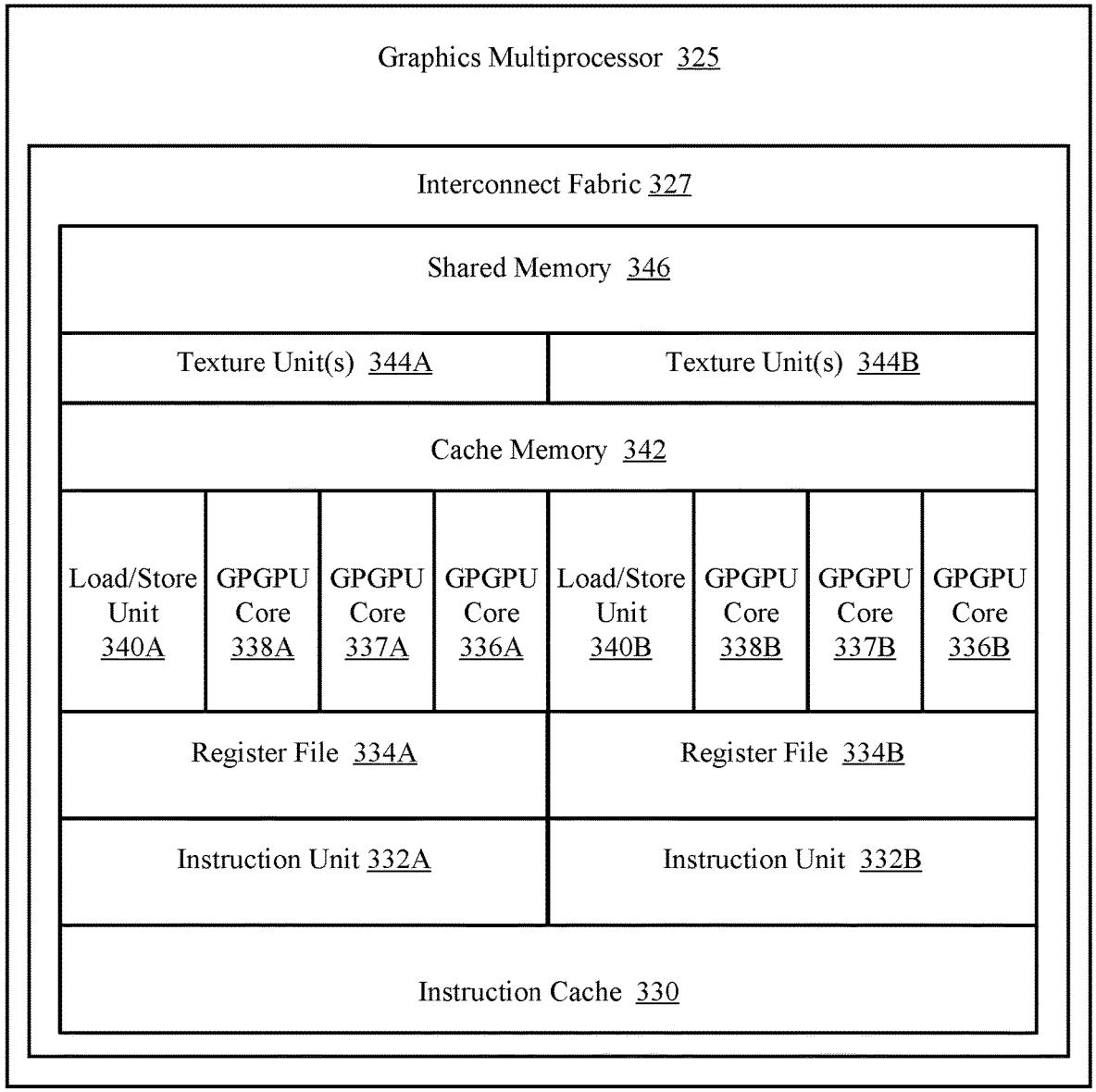
FIGS. 3A-3B are block diagrams of graphics multiprocessors, according to embodiments.
Figure 3B:
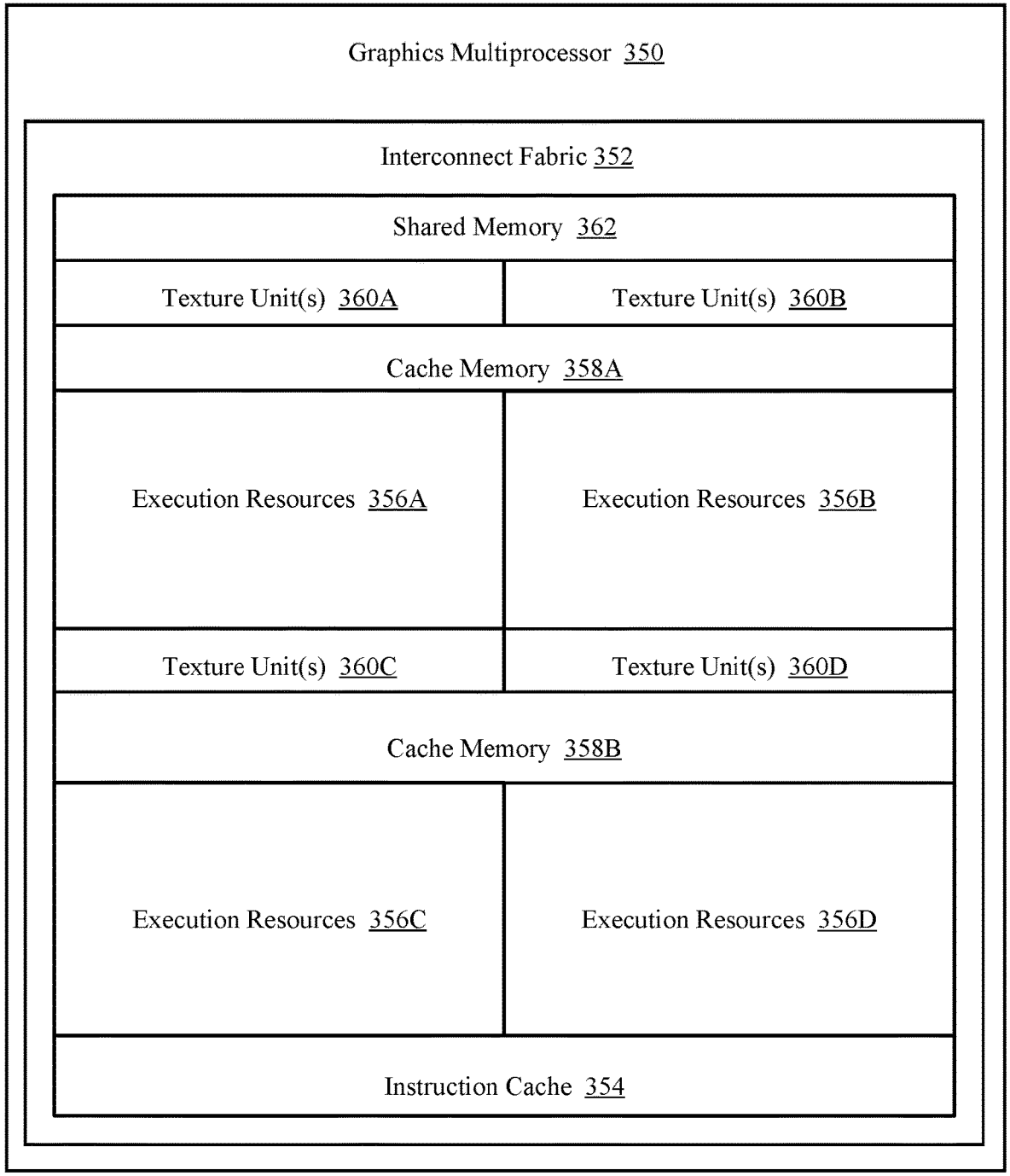

FIGS. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346. The various components can communicate via an interconnect fabric 327. In one embodiment the interconnect fabric 327 includes one or more crossbar switches to enable communication between the various components of the graphics multiprocessor 325.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
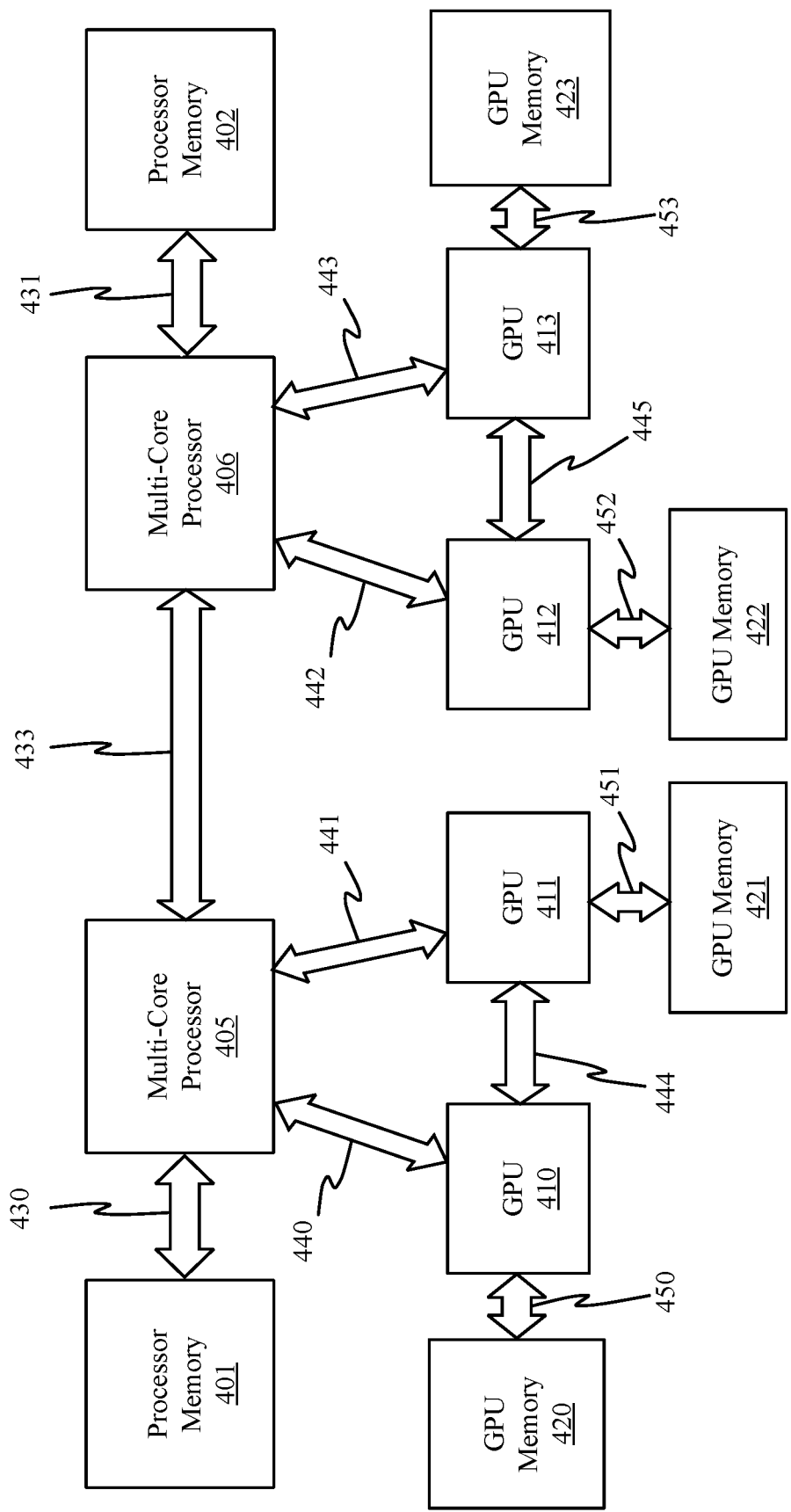
FIGS. 4A-4F illustrate an exemplary architecture in which a plurality of GPUs are communicatively coupled to a plurality of multi-core processors.

FIG. 4A illustrates an exemplary architecture in which a plurality of GPUs 410-413 are communicatively coupled to a plurality of multi-core processors 405-406 over high-speed links 440-443 (e.g., buses, point-to-point interconnects, etc.). In one embodiment, the high-speed links 440-443 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 444-445, which may be implemented using the same or different protocols/links than those used for high-speed links 440-443. Similarly, two or more of the multi-core processors 405-406 may be connected over high speed link 433 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430-431, respectively, and each GPU 410-413 is communicatively coupled to GPU memory 420-423 over GPU memory interconnects 450-453, respectively. The memory interconnects 430-431 and 450-453 may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D) XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
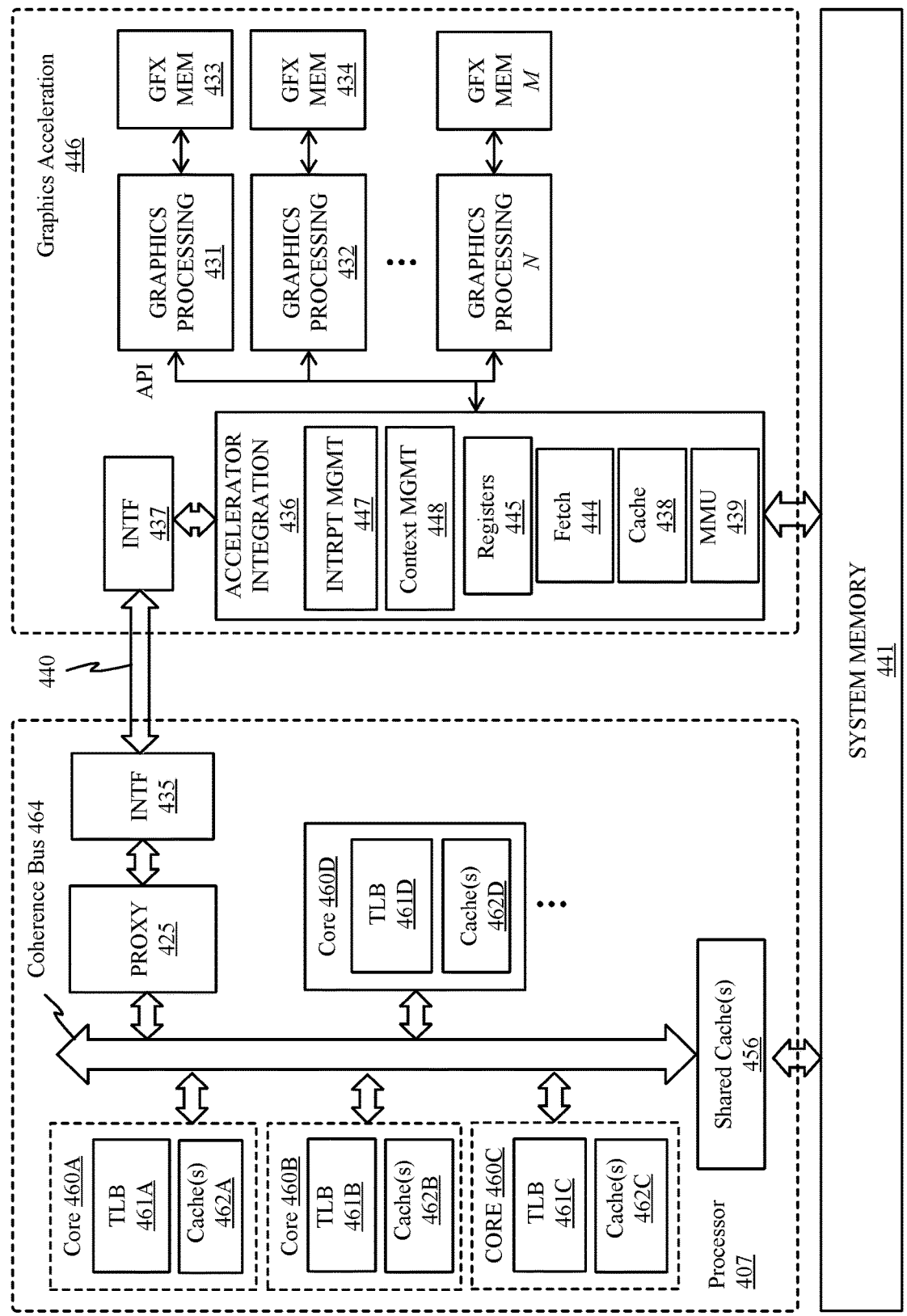

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 426 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, N is kept coherent with the core caches 462A-462D, 456 and system memory 411. As mentioned, this may be accomplished via proxy circuit 425 which takes part in the cache coherency mechanism on behalf of cache 438 and memories 433-434, N (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 411.

Figure 4C:
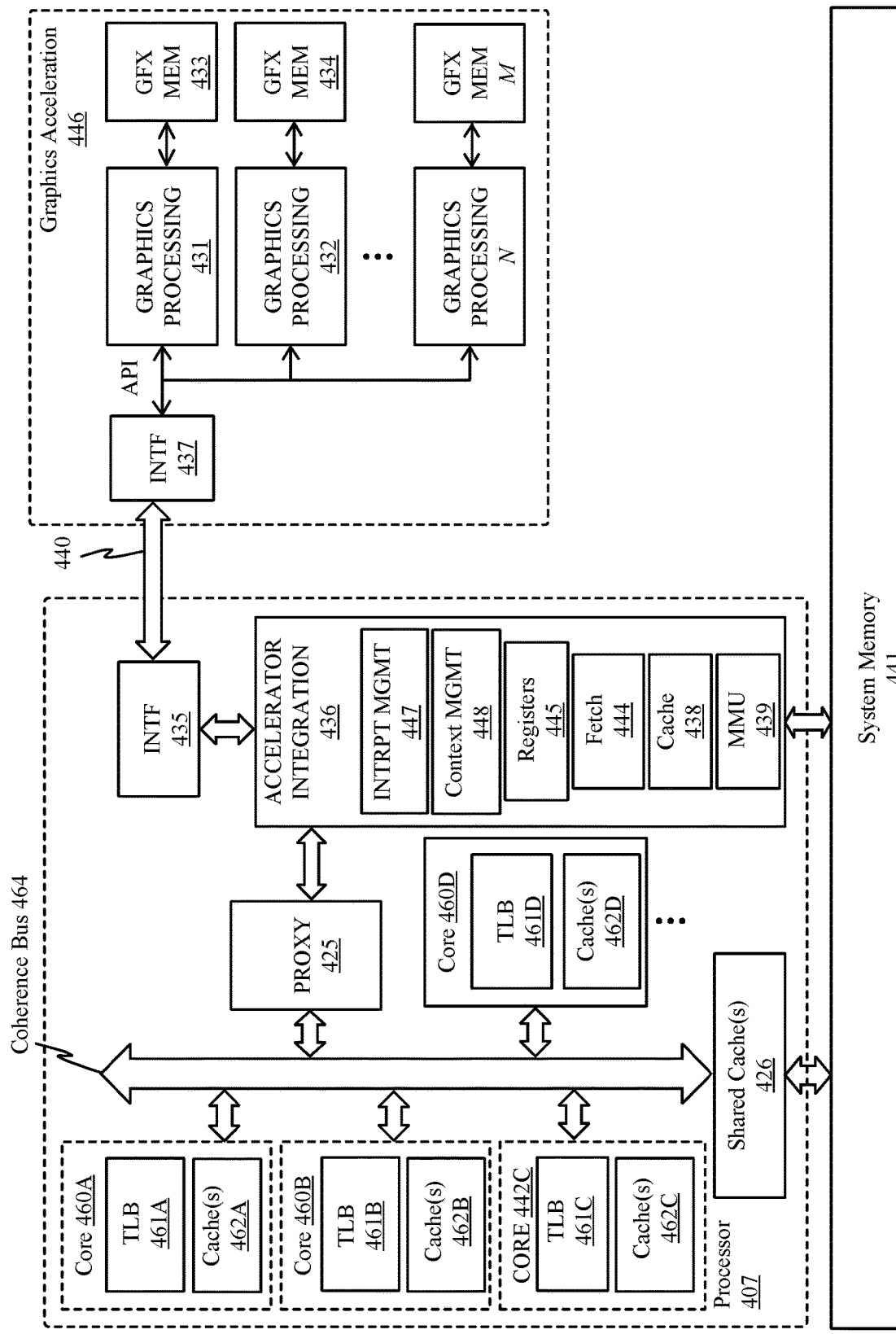

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 462 and caches 462A-462D, 426.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 411 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
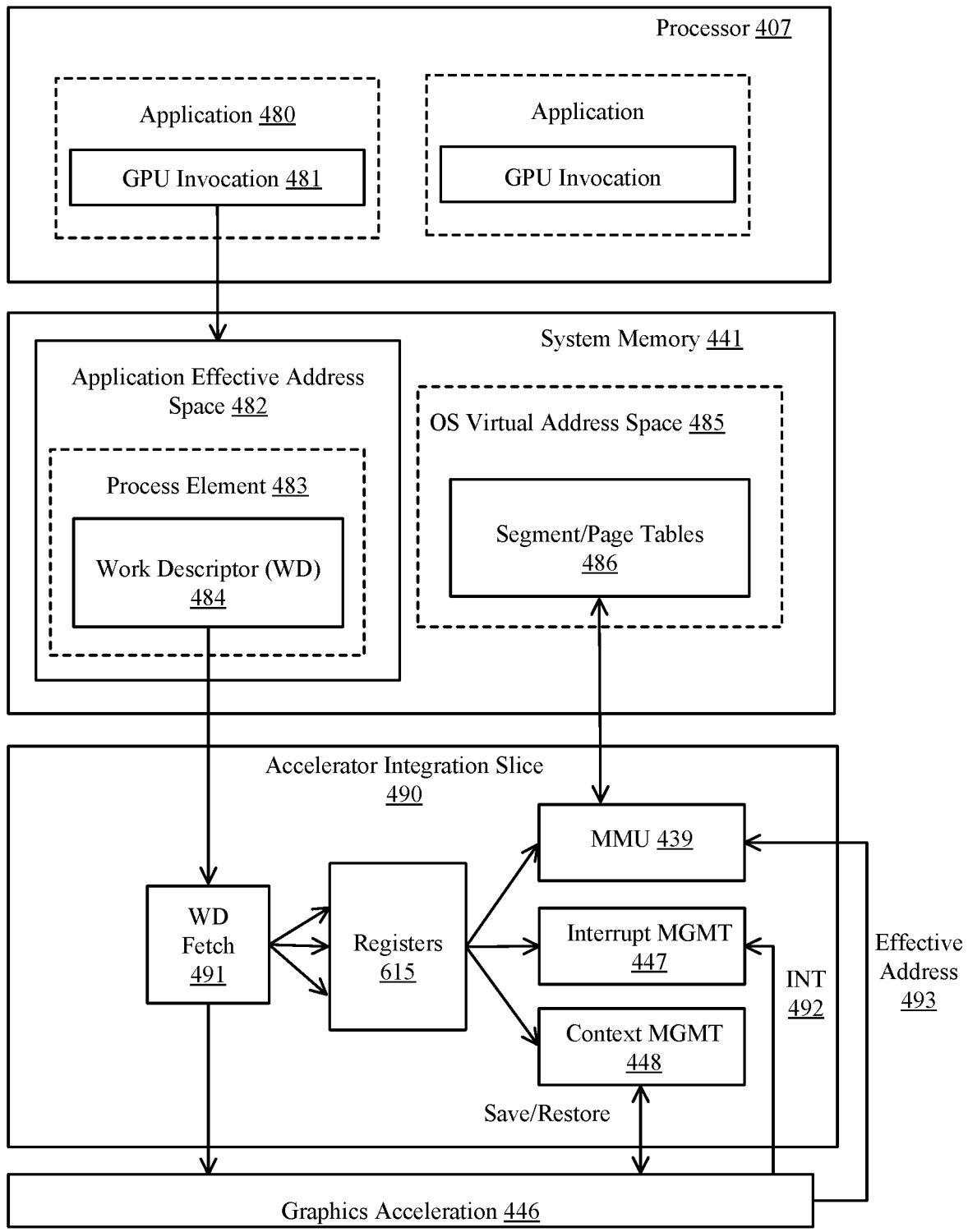

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 446 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

| Hypervisor Initialized Registers |
|---|
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by the operating system are shown in Table 2.

TABLE 2

Operating System Initialized Registers

1  Process and Thread Identification
2  Effective Address (EA) Context Save/Restore Pointer
3  Virtual Address (VA) Accelerator Utilization Record Pointer
4  Virtual Address (VA) Storage Segment Table Pointer
5  Authority Mask
6  Work descriptor In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
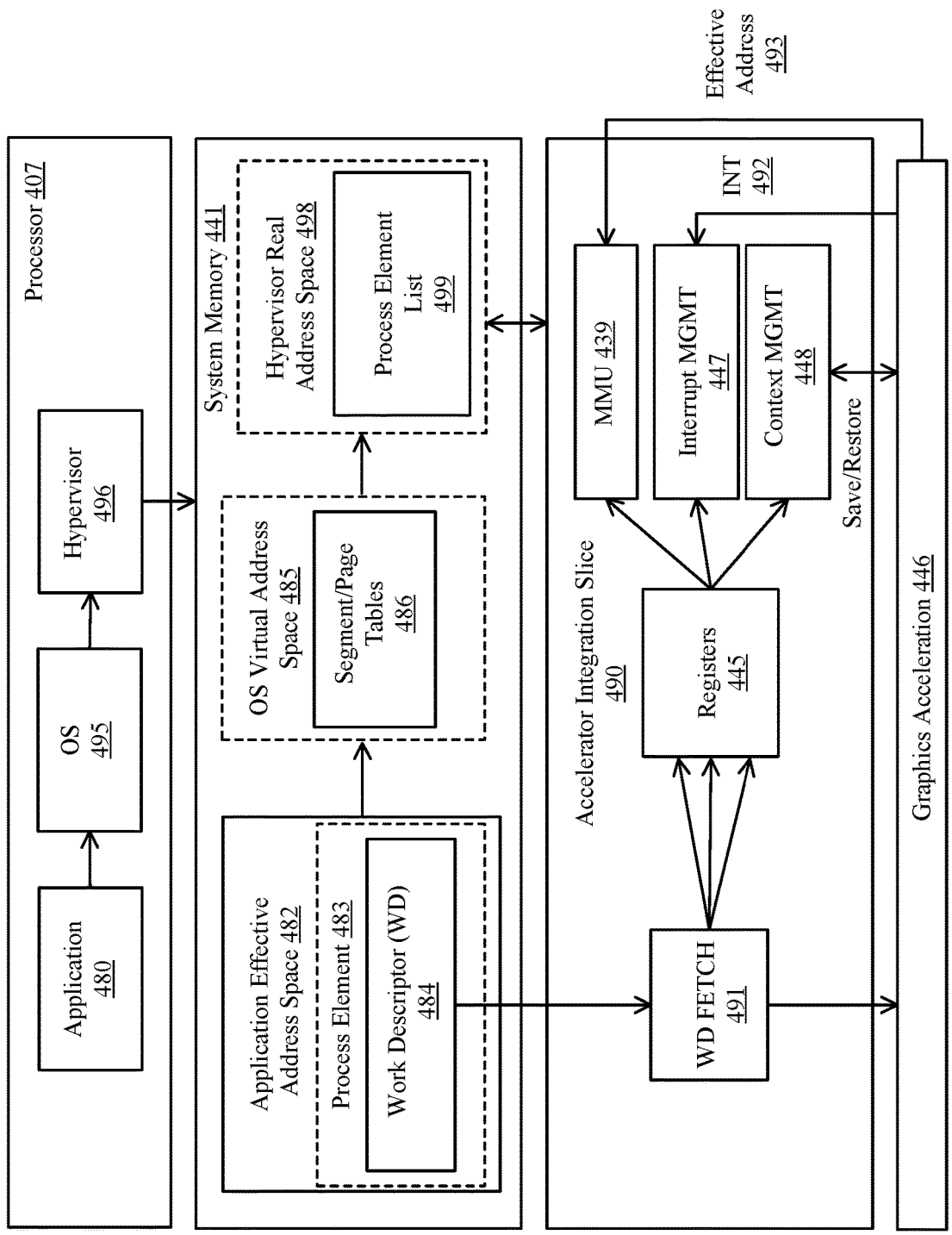

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)
8  Interrupt vector table, derived from the hypervisor call parameters.
9  A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 490 registers 445.

Figure 4F:
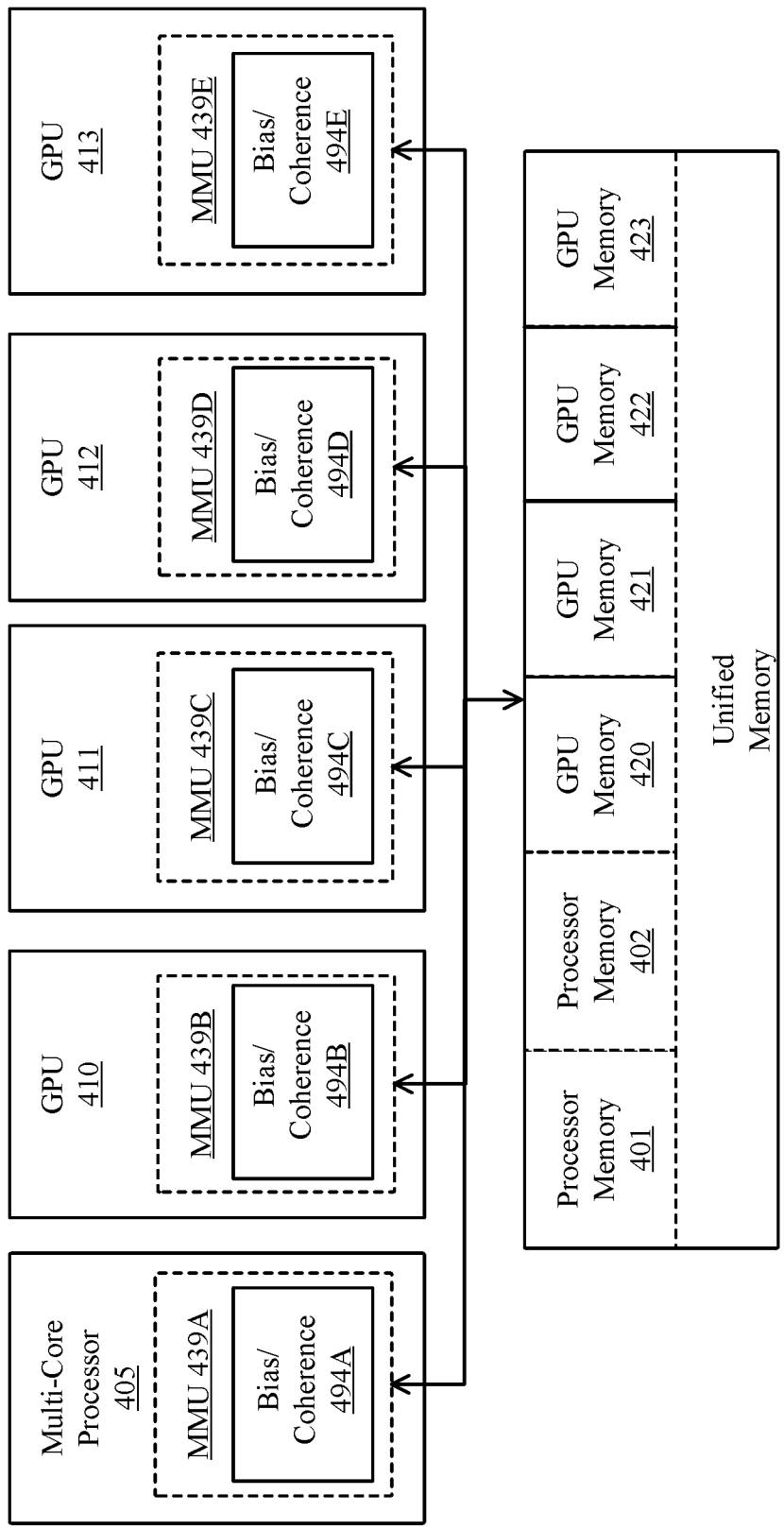

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and also implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. In order to access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
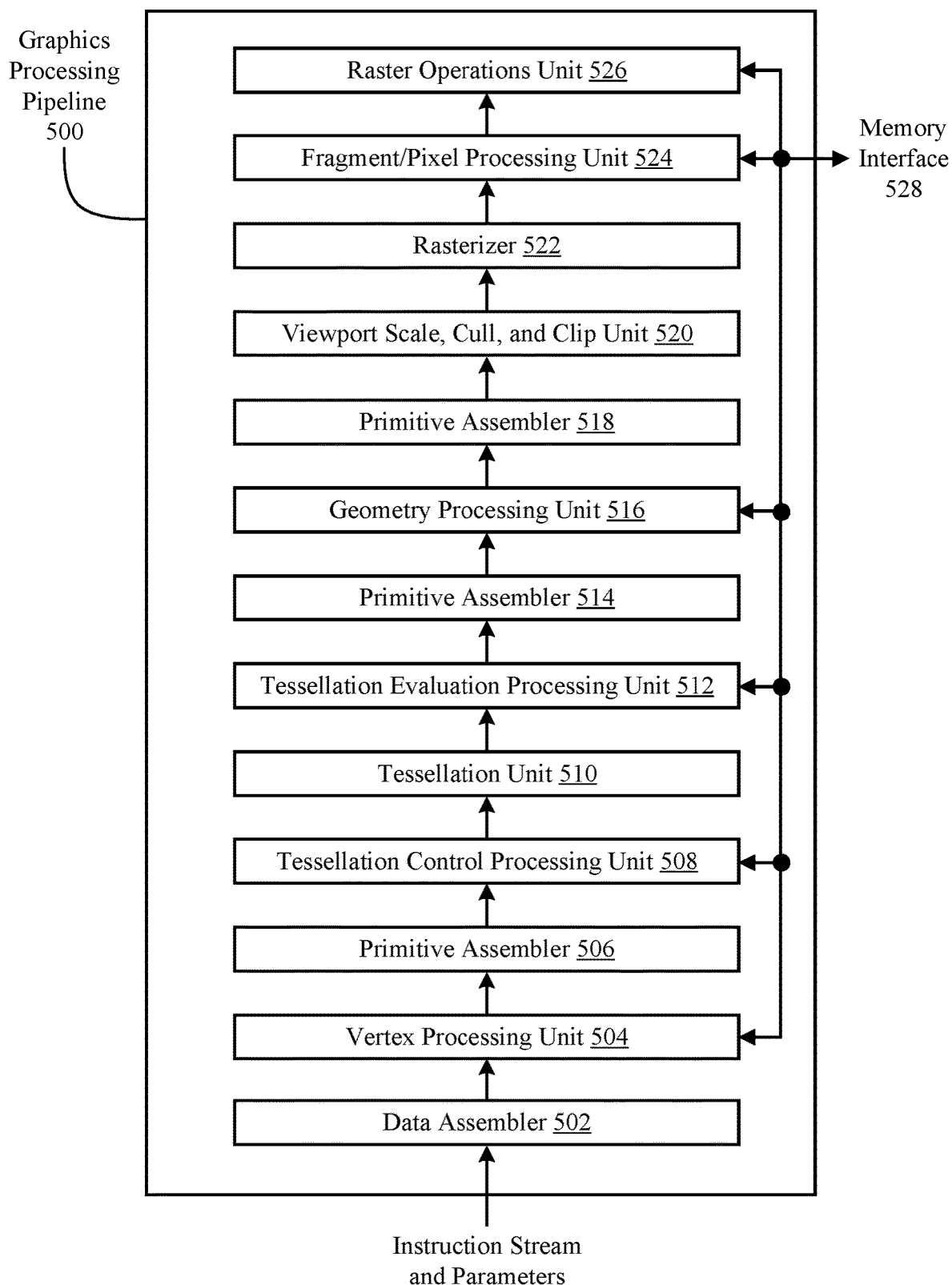
FIG. 5 is a conceptual diagram of a graphics processing pipeline, according to an embodiment.

FIG. 5 is a conceptual diagram of a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2) as described herein. For example, a shader unit (e.g., graphics multiprocessor 234 of FIG. 3) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 3) and a corresponding partition unit (e.g., partition unit 220A-220N of FIG. 2). Alternately, the graphics processing pipeline 500 may be implemented using dedicated processing units for one or more functions. In one embodiment, one or more portions of the graphics processing pipeline 500 can be performed in by a parallel processing logic within a general purpose processor (e.g., CPU). In one embodiment, one or more portions of the graphics processing pipeline 500 can access on-chip memory (e.g., parallel processor memory 222 as in FIG. 2) via a memory interface 528, which may be an instance of the memory interface 218 of FIG. 2.

In one embodiment the data assembler 502 is a processing unit that collects vertex data for high-order surfaces, primitives, etc., and outputs the vertex data, including the vertex attributes, to the vertex processing unit 504. The vertex processing unit 504 is a programmable execution unit that is configured to execute vertex shader programs, lighting and transforming vertex data as specified by the vertex shader programs. For example, vertex processing unit 504 may be programmed to transform the vertex data from an object-based coordinate representation (object space) to an alternatively based coordinate system such as world space or normalized device coordinates (NDC) space. Vertex processing unit 504 may read data that is stored in cache, local or system memory for use in processing the vertex data.

A first instance of a primitive assembler 506 receives vertex attributes from the vertex processing unit 504, reading stored vertex attributes as needed, and constructs graphics primitives for processing by tessellation control processing unit 508, where the graphics primitives include triangles, line segments, points, patches, and so forth, as supported by various graphics processing application programming interfaces (APIs).

The tessellation control processing unit 508 treats the input vertices as control points for a geometric patch and transforms these control points from the patch's input representation, often called the patch's basis, into a representation suitable for efficient surface evaluation by the tessellation evaluation processing unit 512. The tessellation control processing unit 508 also computes tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that is configured to execute geometry shader programs, transforming graphics primitives received from primitive assembler 514 as specified by the geometry shader programs. For example, the geometry processing unit 516 may be programmed to subdivide the graphics primitives into one or more new graphics primitives and calculate parameters, such as plane equation coefficients, that are used to rasterize the new graphics primitives.

In some embodiments the geometry processing unit 516 may also add or delete elements in the geometry stream. Geometry processing unit 516 outputs the parameters and vertices specifying new graphics primitives to primitive assembler 518, which receives the parameters and vertices from the geometry processing unit 516, reading stored vertex attributes, as needed, and constructs graphics primitives for processing by a viewport scale, cull, and clip unit 520. The geometry processing unit 516 may read data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 scan converts the new graphics primitives and outputs fragment and coverage data to the fragment/pixel processing unit 524. Additionally, the rasterizer 522 may be configured to perform z culling and other z-based optimizations.

The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations such as perspective correction, texture mapping, shading, blending, and the like, to produce shaded fragments or pixels that are output to raster operations unit 526. The fragment/pixel processing unit 524 may read data that is stored in parallel processor memory or system memory for use in processing the fragment data. Fragment or pixel shader programs may be configured to shade at the sample, pixel, tile, or other granularity, depending on the programmed sampling rate.

The raster operations unit 526 is a processing unit that performs raster operations, such as stencil, z test, blending, and the like, and outputs pixel data as processed graphics data for storage in graphics memory. The processed graphics data may be stored in graphics memory, e.g., parallel processor memory 222 as in FIG. 2, and/or system memory 104 as in FIG. 1, for display on one of the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Figure 6:
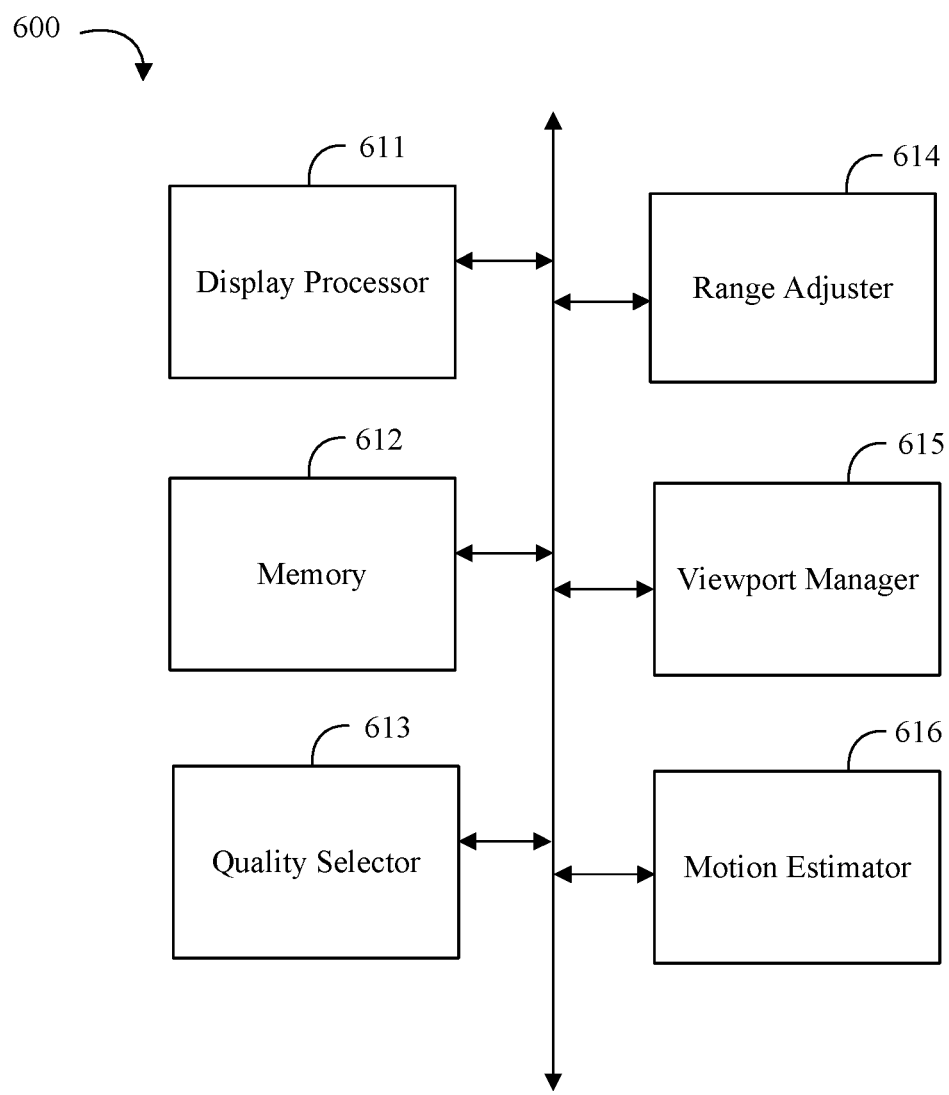
FIG. 6 is a block diagram of an example of an electronic processing system according to an embodiment.

360 Neighbor-Based Quality Selector, Range Adjuster, Viewport Manager, And Motion Estimator Examples Turning now to FIG. 6, an embodiment of an electronic processing system 600 may include a display processor 611 to generate image data for a display, and a memory 612 communicatively coupled to the display processor 611 to store a two-dimensional (2D) frame which corresponds to a projection from a 360 video space. The system 600 may further include a quality selector 613 communicatively coupled to the display processor 611 to select a quality factor for a first block of the 2D frame based on quality information from one or more neighboring blocks of the 2D frame, where the one or more neighboring blocks of the 2D frame may include one or more blocks which are neighboring to the first block of the 2D frame only in the 360 video space (e.g. as described in more detail below). For example, the quality selector 613 may be configured to select a quantization parameter (QP) value for the second block based on QP information for the first block if the first block is determined to be the neighbor of the second block in the 360 video space.

In some embodiments, the system 600 may further include a range adjuster 614 communicatively coupled to the display processor 611 to adjust a search range for the 2D frame based on a search area of the 2D frame (e.g. as described in more detail below). For example, the 2D frame may correspond to an ERP format frame for the 360 video space and the range adjuster 614 may be configured to adjust a first search range for a pole area of the 2D frame to be relatively larger than a second search range for a central area of the 2D frame. Some embodiments of the system 600 may also include a viewport manager 615 communicatively coupled to the display processor 611 to determine if a request for a viewport of the 2D frame extends beyond a first edge of the 2D frame and to fill the requested viewport with wrap-around image information (e.g. as described in more detail below). For example, the viewport manager 615 may be configured to fill the requested viewport with image information starting from a second edge of the frame which is contiguous with the first edge in 360 video space. Some embodiments of the system 600 may further include a motion estimator 616 communicatively coupled to the display processor 611 to estimate motion information based on both color information and depth information (e.g. as described in more detail below). For example, the motion estimator 616 may be configured to determine a first motion estimate based on the depth information, and to determine a second motion estimate based on the first motion estimate and the color information.

Embodiments of each of the above display processor 611, memory 612, quality selector 613, range adjuster 614, viewport manager 615, motion estimator 616, and other system components may be implemented in hardware, software, or any suitable combination thereof. For example, hardware implementations may include configurable logic such as, for example, programmable logic arrays (PLAs), FPGAs, complex programmable logic devices (CPLDs), or in fixed-functionality logic hardware using circuit technology such as, for example, ASIC, complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Quality Selector Examples

Figure 7A:
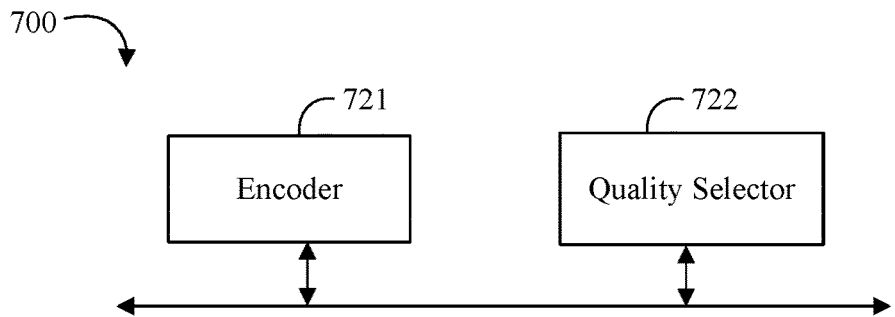
FIG. 7A is a block diagram of an example of a graphics apparatus according to an embodiment.

Turning now to FIG. 7A, an embodiment of a graphics apparatus 700 may include an encoder 721 to encode a first block of a two-dimensional (2D) frame, where the 2D frame corresponds to a projection of a 360 video space, and a quality selector 722 communicatively coupled to the encoder 721 to determine if the first block is a neighbor of a second block of the 2D frame in the 360 video space, and to select a quality factor for the second block based on quality information for the first block if the first block is determined to be the neighbor of the second block in the 360 video space. For example, the quality selector 722 may be configured to select a QP value for the second block based on QP information for the first block if the first block is determined to be the neighbor of the second block in the 360 video space. In some embodiments, the quality selector 722 may also be configured to determine a difference between a first quality factor for the first block and the selected quality factor, and to adjust the selected quality factor to keep the difference within a difference threshold. The encoder 721 may be configured to encode the second block of the 2D frame based on the selected quality factor. The size of a block may vary in various embodiments. For example, a block may refer to an individual pixel, a group of pixels, or a set of pixels.

Some embodiments of the apparatus 700 may further include any of a range adjuster communicatively coupled to the encoder to adjust a search range for the 2D frame based on a search area of the 2D frame, a viewport manager communicatively coupled to the encoder to determine if a request for a viewport of the 2D frame extends beyond a first edge of the 2D frame and to fill the requested viewport with wrap-around image information, and/or a motion estimator communicatively coupled to the display processor to estimate motion information based on both color information and depth information.

Embodiments of each of the above encoder 721, quality selector 722, and other components of the apparatus 700 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 7B:
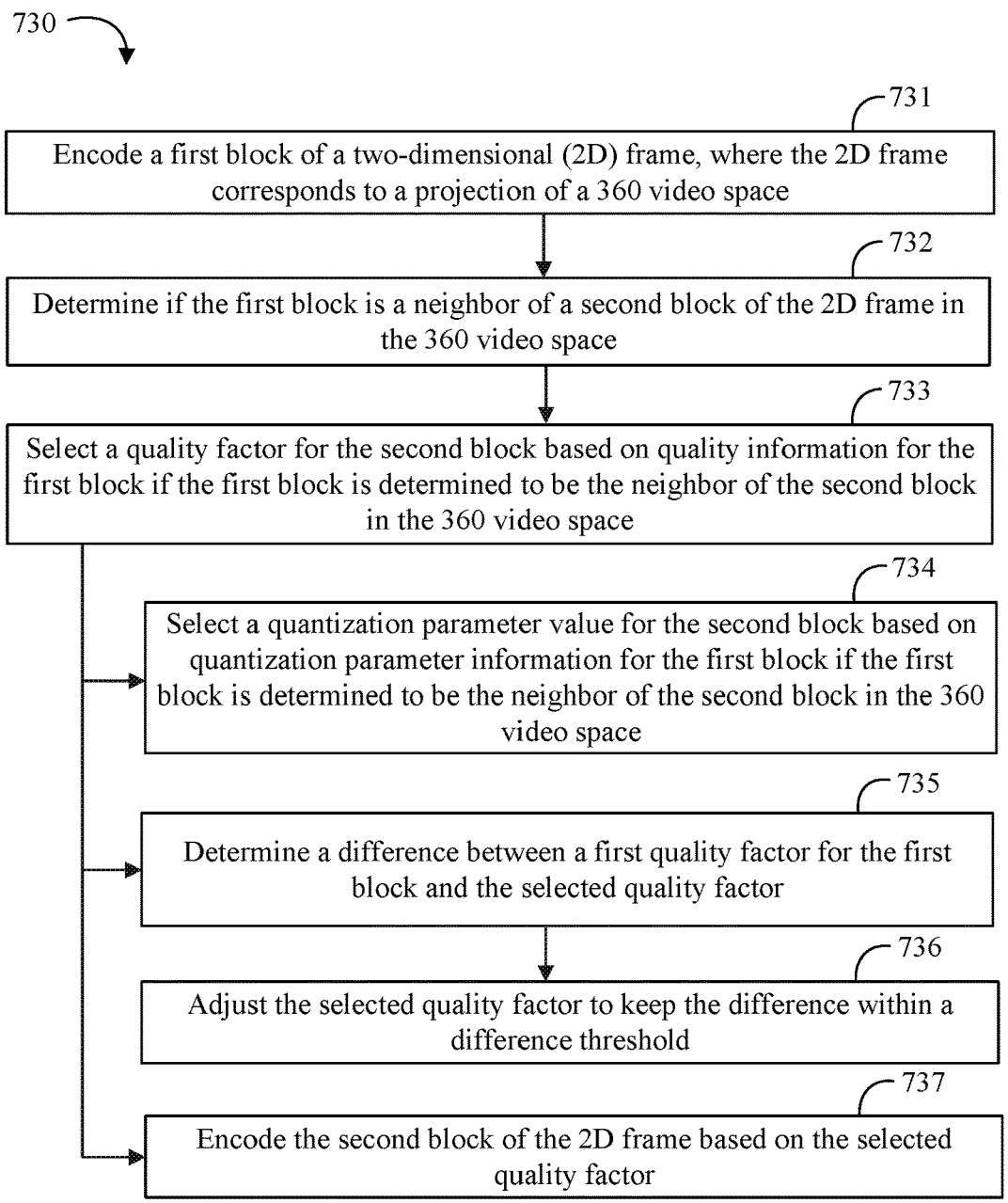
FIG. 7B is a flowchart of an example of a method of processing 360 video according to an embodiment.

Turning now to FIG. 7B, an embodiment of a method 730 of processing a 360 video may include encoding a first block of a two-dimensional (2D) frame, where the 2D frame corresponds to a projection of a 360 video space at block 731, determining if the first block is a neighbor of a second block of the 2D frame in the 360 video space at block 732, and selecting a quality factor for the second block based on quality information for the first block if the first block is determined to be the neighbor of the second block in the 360 video space at block 733. For example, the method 730 may include selecting a QP value for the second block based on QP information for the first block if the first block is determined to be the neighbor of the second block in the 360 video space at block 734. The method 730 may additionally, or alternatively, also include determining a difference between a first quality factor for the first block and the selected quality factor at block 735, and adjusting the selected quality factor to keep the difference within a difference threshold at block 736. In some embodiments, the method 730 may further include encoding the second block of the 2D frame based on the selected quality factor at block 737.

Embodiments of the method 730 may be implemented in a system, apparatus, GPU, or parallel processing unit (PPU) such as, for example, those described herein. More particularly, hardware implementations of the method 730 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 730 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 730 may be implemented on a computer readable medium as described in connection with Examples 18 to 21 below.

For example, embodiments or portions of the method 730 may be implemented in applications or driver software (e.g. through an API). Other embodiments or portions of the method 730 may be implemented in specialized code (e.g. shaders) to be executed on a GPU. Other embodiments or portions of the method 730 may be implemented in fixed function logic or specialized hardware (e.g. in the GPU).

Some embodiments may advantageously constrain QP changes across an image or face boundaries of 360 video. For example, certain neighboring blocks in the original 360 sphere may be projected as discontinuous blocks in 2D formats due to multiple discontinuous 2D surfaces (e.g. cube-map format) or 2D frame boundaries (e.g. ERP format). Some embodiments may ensure that QP changes across such blocks that are originally neighbors in the 360 sphere may be constrained so that visible artifacts (e.g. an apparent long vertical or horizontal line discontinuity) may be reduced or eliminated when a viewport is extracted from the encoded projected 2D map (e.g. that might otherwise be caused by abrupt QP changes).

Without being limited to theory of operation, a goal of block-based rate control may be to support a target bit-rate. Encode for each block may have its own QP value. In some systems, block-based rate control may change QP values on-the-fly. The system may assign a budget for a current frame, an initial QP value may be selected, and encoding may proceed using that QP value. For every block, after encode the system may determine the budget amount spent and how the encode is trending to meet the assigned budget. If the encode is determined to be trending to exceed the budget, the system may need to decrease quality to meet the budget. The system may increase the QP value to decrease the encode quality. If the QP value adjusts too much between neighboring blocks, however, the difference in quality between adjacent blocks may be more noticeable to the viewer as an artifact. The system may make more gradual changes to the QP value between neighboring blocks. With 360 video, however, neighboring blocks may span edges of the 2D frame. In other systems, block-based rate control may result in visible artifacts when the viewport crosses an edge of the 2D frame projected from the 360 video space.

Advantageously, some embodiments may provide block-based rate control for neighboring blocks which includes neighboring blocks from the 360 video space, even if those blocks are not neighbors in the 2D frame. Some embodiments may increase the number of neighboring blocks available for the encode quality selection, thereby improving the selection made and reducing or eliminating visible artifacts.

In some embodiments, the QP value selected may be constrained based on a difference between the QP factor selected based on a budget calculation and the QP values from the neighboring blocks (e.g. including neighbors from the 360 video space). Some embodiments may include a difference threshold, which may be an absolute value (e.g. no QP value change differences >10) or may be a percentage (e.g. no QP value changes greater than 10%). For example, a budget driven calculation may request a QP value increase of 20%, which exceeds the difference threshold of 10%. The selected QP value for the current block may be adjusted to stay within 10% of the neighboring blocks (e.g. an average of each previously encoded neighbor block, including 360 neighbors). For the next block (or row of blocks), the budget driven calculation may still indicate that a reduction in quality is needed, so the QP value may again be increased (e.g. up to another 10% based on the difference threshold). This may continue until the QP value has been increased enough to meet the budget.

When a 3D video is mapped to 2D, in the 2D map there may be no connection between the edges of the map. But in the 3D space, the left and right edges may be connected. There may be a correlation between various edges, and the edges may be neighbors in the 3D sphere. Some embodiments may extend the neighboring blocks used for encode-quality selection to include neighboring blocks from the 3D space, in addition to neighboring blocks in the 2D space. For example, even if some pixels are not neighbors in the 2D space, if the pixels are neighbors in the 3D space they may be treated as neighbors in the 2D space and may be added to the group of neighbors available for quality selection (e.g. in addition to pixels already adjacent or neighbors in the 2D space). The definition of neighbor may vary based on the type of encoding, the type of processing, and/or other factors.

Some embodiments may advantageously provide improved block-based quality selection for 360 video. For example, as explained in more detail below, for 360 video in a 2D projected plane, the neighbor blocks in the original 3D space are not necessarily adjacent in the 2D space. If a current block has neighbor blocks in the original 3D space that are already encoded, some embodiments may use that neighbor information for quality selection for the current block. Some embodiments may utilize the neighbors from the 3D space to improve quality selection for all or most encoding that may be affected by any discontiguity caused by 2D mapping (e.g. surfaces, boundaries, etc.).

Some embodiments may advantageously provide improved encode quality selection for 360 video. For example, encode quality selection may be enabled along boundaries of 2D video frames and faces of such 2D video frames that are discontiguous in the projected 2D plane when such boundaries are contiguous in the corresponding 360 video (e.g., in the corresponding 360 video sphere). In particular, in some 360 video coding contexts, 2D video frames that are projections from a 360 video space (e.g., projections from 360 video to a 2D plane based on a predetermined format) may be provided to an encoder for encoding into a bitstream such as a standards compliant bitstream. The bitstream may be stored or transmitted or the like and processed by a decoder. The decoder, such as a standards compliant decoder, may decode the bitstream to reconstruct the 2D video frames (e.g., the projections from the 360 video). The reconstructed 2D video frames may be processed for presentation to a user. For example, a selected viewport may be used to determine a portion or portions of the reconstructed 2D video frames, which may be assembled as needed and provided to a display device for presentation to a user.

In such techniques, the standards compliant codec (encode/decode) techniques may include in-frame encode quality selection for adjacent or neighboring blocks/pixels in video frames that cross frame/block (e.g., macroblock, coding unit, etc.) boundaries. However, in projecting from the 360 video space to 2D video frames, some blocks that are neighbors in the 360 video space are presented or formatted as non-neighboring blocks in the 2D video frames. In some embodiments, the term non-neighboring may indicate blocks that are not spatially adjacent (e.g., in a 2D video frame) and that sets of blocks have no neighboring pixels between them (e.g., that no pixel of a first block spatially neighbors any pixel of a second block in a 2D video frame). For example, such neighboring blocks in the 3D video space may be on opposite boundaries of the corresponding 2D video frame, on non-adjacent boundaries of face projections within the corresponding 2D video frame, or the like, as is discussed further herein.

In some embodiments, a group of blocks for encode quality selection may be identified within a 2D video frame that is a projection from a 360 video space such that the group of blocks includes a first block and a second block that are non-neighboring blocks in the 2D video frame and such that they have a first individual pixel of the first block and a second individual pixel of the second block that are neighboring pixels in the 360 video space. The identified group of blocks may be encoded based on encode information from the neighboring blocks. Such techniques may be repeated on a line by line or block-by-block basis for any or all blocks that are non-neighboring in the 2D video frame but are neighboring blocks in the 360 video space to generate an encoded video frame based on the individual 2D video frame.

Such block selection, matching, and/or encode quality selection techniques may be implemented in any suitable encode, decode, video pre-processing, or video post-processing context. For example, such techniques may be applied within a local encode loop of a video encoder, as pre-processing prior to providing video frames to an encoder, as post decoder processing, or the like, as is discussed further herein. Furthermore, the discussed techniques may be used in any suitable coding context such as in the implementation of H.264/MPEG-4 advanced video coding (AVC) standards based codecs, high efficiency video coding (H.265/HEVC) standards based codecs, proposed video coding (H.266) codecs, Alliance for Open Media (AOM) standards based codecs such as the AV1 standard, MPEG standards based codecs such as the MPEG-4 standard, VP9 standards based codecs, or any other suitable codec or extension or profile thereof. The discussed techniques reduce blocky artifacts of coded video displayed to users and provide an improved 360 video experience.

Figure 7C:
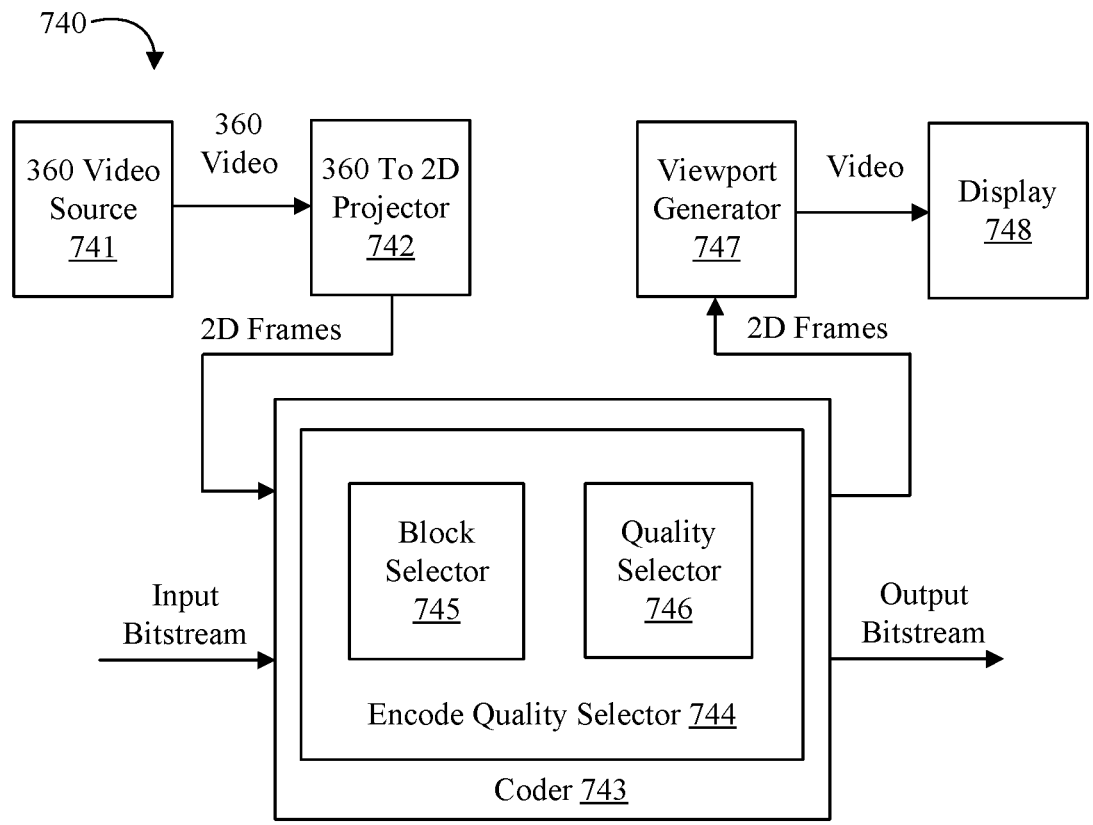
FIG. 7C is a block diagram of another example of an electronic processing system according to an embodiment.

FIG. 7C is an illustrative diagram of an embodiment of a system 740 for processing 2D video frames that are projected from a 360 video space. The system 740 may include a 360 video source 741, a 360-to-2D projector 742, a coder 743, a viewport generator 747, and a display 748. For example, the coder 743 may include an encode quality selector 744, which may further include a block selector 745 and a quality selector 746.

In some embodiments, the coder 743 may receive 2D video frames (e.g. 2D video frames that are projected from a 360 or spherical space) from the 360-to-2D projector 742, and the coder 743 may generate a corresponding output bitstream. Although illustrated with respect to the coder 743 receiving 2D video frames from the 360-to-2D projector 742, the coder 743 may receive 2D video frames from any suitable source such as memory, another device, or the like. In some embodiments, the coder 743 may provide an encoder capability for the system 740. The 360 video source 741 may include a suitable camera or group of cameras that may attain 360 video or spherical video or the like. Furthermore, the 360-to-2D projector 742 may receive 360 video and the 360-to-2D projector 742 may generate 2D video frames using any suitable technique or techniques. For example, the 360-to-2D projector 742 may project 360 video to 2D video frames in any suitable 2D format that represents the projection from 360 video.

Other modules or components of the system 740 may also receive 2D video frames or portions thereof as needed. The system 740 may provide, for example, video compression and the system 740 may be a video encoder implemented via a computer or computing device or the like. For example, the system 740 may generate an output bitstream that is compatible with a video compression-decompression (codec) standard such as the H.264/MPEG-4 advanced video coding (AVC) standard, the high efficiency video coding (H.265/HEVC) standard, proposed video coding (H.266) standards, the VP8 standard, the VP9 standard, or the like.

In some embodiments, the coder 743 may receive an input bitstream corresponding to or representing 2D frames that are projected from a 360 or spherical space and the coder 743 may generate corresponding 2D video frames (e.g. such that 2D frames are projected from a 360 or spherical space). An input bitstream may also be received from memory, another device, or the like. In some embodiments, the coder 743 may provide a decoder capability for the system 740. In some embodiments, the input bitstream may be decoded to 2D video frames, which may be displayed to a user via the display 748 based on a selected viewport within the 2D video frames. The display 748 may be any suitable display such as a virtual reality (VR) display, a head mounted VR display, or the like.

Furthermore, although illustrated with all of the 360 video source 741, the 360-to-2D projector 742, the coder 743, the viewport generator 747, and the display 748, the system 740 may include only some of these components. Various combinations of these components as well as other components may be provided for the system 740 depending on the nature of the device(s) which implement the system 740. The system 740 may be implemented via any suitable device(s) such as, for example, a server, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

As discussed, the coder 743 may receive 2D video frames. The 2D video frames (as well as other video frames discussed herein) may include any suitable video data such as pixels or pixel values or data, video sequence, pictures of a video sequence, video frames, video pictures, sequence of video frames, group of pictures, groups of pictures, video data, or the like in any suitable resolution. The 2D video frames may be characterized as video, input video data, video data, raw video, or the like. For example, 2D video frames may be video graphics array (VGA), high definition (HD), Full-HD (e.g., 1080p), or 4K resolution video, or the like. Furthermore, the 2D video frames may include any number of video frames, sequences of video frames, pictures, groups of pictures, or the like. Techniques discussed herein are discussed with respect to pixels and pixel values of video frames for the sake of clarity of presentation. However, such video frames and/or video data may be characterized as pictures, video pictures, frames, sequences of frames, video sequences, or the like. As used herein, the term pixel or pixel value may include a value representing a pixel of a video frame such as a luminance value for the pixel, a color channel value for the pixel, or the like. In various examples, 2D video frames may include raw video or decoded video. Furthermore, as discussed herein, the coder 743 may provide both encode and decode functionality.

In some embodiments, the encode quality selector 744 may receive 2D video frames that include projections from a 360 video space. As used herein, the term projected from a 360 video space may indicate that the format of 2D video frames may include picture or video information corresponding to a 360 space, spherical space, or the like. For example, 360 video may be formatted or projected to a 2D image or video frame plane or the like using known techniques. Such projections (and their various advantages and disadvantages) may be analogous, for example, to generating 2D maps from a globe. The format of such 2D video frames may include any suitable format such as, for example, an equirectangular projection (ERP) format, a cube map format, a compact cube map format, or the like.

The block selector 745 may select groups of blocks for encode quality selection (e.g. for some or all of the 2D video frames). The block selector 745 may select such groups of blocks for encode quality selection using any suitable technique or techniques. In some embodiments, the block selector 745 may receive an indicator or indicators indicative of a format type of the 2D video frames (e.g., equirectangular format, cube map format, compact cube map format, or the like) and the block selector 745 may determine which groups of blocks to select for encode quality selection responsive to the format type indicator or indicators. Each of such group of blocks selected for encode quality selection may include a first set of blocks and a second set of blocks such that the first and second set of blocks are non-neighboring in the 2D video frame but are neighboring in the 360 video space. Furthermore, such first and second sets of blocks may be separated by a boundary across which encode quality selection may be applied. The boundary may be provided by a frame boundary of the 2D video frame, a face boundary of a projection portion of the 2D video frame, or the like. For example, the two sets of blocks may be selected and oriented/aligned for encode quality selection. As shown in FIG. 7C, such encode quality selection may be applied by the quality selector 746 of the encode quality selector 744. The selected quality may be used by the coder 743 as a part of encode, decode, pre-processing, or post-processing as is discussed further herein.

Figure 7D:
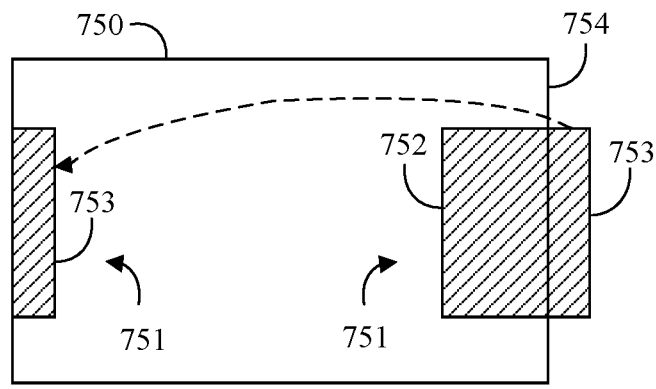
FIG. 7D is an illustrative diagram of an example of a two-dimensional (2D) frame with an equirectangular projection (ERP) 360 video format according to an embodiment.

FIG. 7D illustrates an example 2D video frame 750 including a projection from a 360 video space in an ERP format and a viewport 751 overlaying the 2D video frame 750, arranged in accordance with at least some embodiments. The 2D video frame 750 may include a projection of 360 video in the ERP format. For example, the ERP format may project a spherical 3D image or frame onto orthogonal coordinates of a 2D image or frame. The viewport 751 may be applied with respect to the 2D video frame 750 (e.g. by the viewport generator 747) such that a user may desire to view video corresponding to the viewport 751. The viewport 751 may wrap around the 2D video frame 750 such that a portion 752 of the viewport 751 is on a right side of the 2D video frame 750 and another portion 753 of the viewport 751 is on a left side of the 2D video frame 750. For example, to attain the video data of the viewport 751 for presentation, the portion 753 of the viewport 751, which overextends a frame boundary 754 of the 2D video frame 750, must be attained from the left side of the 2D video frame 750. An assembled viewport 751 including the portions 752, 753 may be presented to a user for example.

Figure 7E:
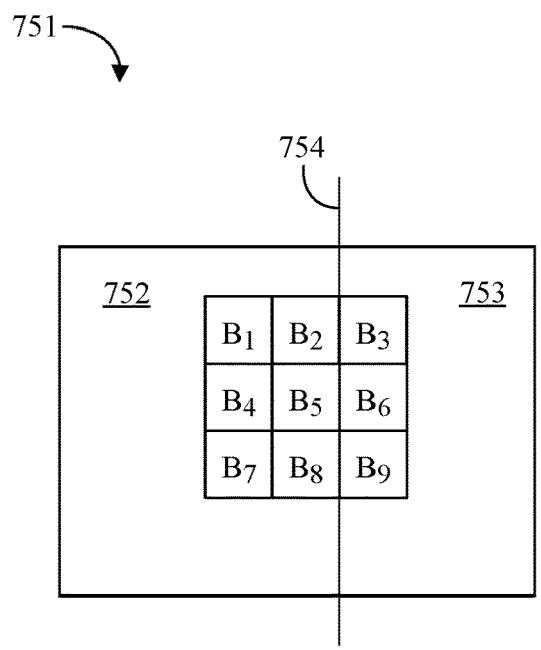
FIG. 7E is an illustrative diagram of an example of a viewport according to an embodiment.

FIG. 7E illustrates an embodiment of an encode quality selection arrangement within the viewport 751. To perform an encode quality selection for a block $B_5$, a group of blocks $B_1$ through $B_4$ and $B_6$ through $B_9$ may be identified as neighbors of the block $B_5$. For example, the blocks $B_3$, $B_6$, and $B_9$ may be neighbors to the block $B_5$ in the 360 video space but not in the corresponding 2D video frame projection. For example, viewport 751 provides a contiguous view in the 360 video space. Furthermore, the blocks $B_5$ and $B_6$ may include discontiguous non-neighboring pixels in the 2D video frame 750 because the block $B_5$ is from a right side of the 2D video frame 750 and the block $B_6$ is from a left side of the 2D video frame 750 (e.g. see FIG. 7D). For example, the blocks $B_5$ and $B_6$ may be separated by the boundary 754 such that the boundary 754 separates blocks that are non-neighboring in the 2D video frame space but that are neighboring in the 360 or spherical space.

In a left to right and top to bottom processing order, the blocks $B_1$ through $B_4$ may get encoded before the block $B_5$. For other processing orders, other subsets of the neighboring blocks may be processed before the block currently being processed. The block selector 745 may select the subset of the neighboring blocks that has prior encode/processing information available and provide those blocks or that information to the quality selector 746. Advantageously, the subset of neighboring blocks provided to the quality selector 746 may provide more encode information to the quality selector 746 for an improved selection (e.g. and/or for improved video coding efficiency, etc.). In this example, the subset of neighbors with useful encode information for the block $B_5$ may include the 2D frame neighbor blocks $B_1$, $B_2$, and $B_4$ and also the neighbor block $B_3$ from the 360 space. The quality selector 746 may align the blocks (e.g. put them in a row or column order) or otherwise rotate and/or re-order the blocks such that the 3D video space neighboring blocks are positioned next to or near one another, as may be needed for performing the encode quality selection.

As discussed with respect to system 740, the group of group of blocks $B_1$ through $B_4$ may be selected by the block selector 745, aligned relative to block $B_5$ for encode quality selection by the block selector 745, and have a quality value selected for the block $B_5$ by the quality selector 746. The encode quality selection may be performed for any suitable encode/processing information, including QP value selection, and the like. For QP value selection, the selected neighbor blocks may include blocks that have already been encoded along the raster direction. For a left to right and top to bottom scan, the QP value selection for a current block may use QP value information from the previously encoded neighbor blocks above and to the left of the current blocks. Advantageously, some embodiments may increase the number of selected neighbor blocks by including neighbor blocks from the 3D space.

With reference to FIG. 7D, additional groups of blocks may be selected across the boundary 754 such that the group of blocks includes blocks from a right side of the 2D video frame 750 (e.g., adjacent to a right boundary or edge of the 2D video frame 750) and blocks from a left side of the 2D video frame 750 (e.g., adjacent to a left boundary or edge of the 2D video frame 750), respectively. For example, in the equirectangular format, all leftmost and corresponding rightmost pixels of the 2D video frame 750 are neighboring in the 360 video space while being non-neighboring (non-contiguous) in the 2D video frame 750. Encode quality selection may be extended for some or all groups of blocks that include blocks from the left and right sides of the 2D video frame 750.

Figure 7F:
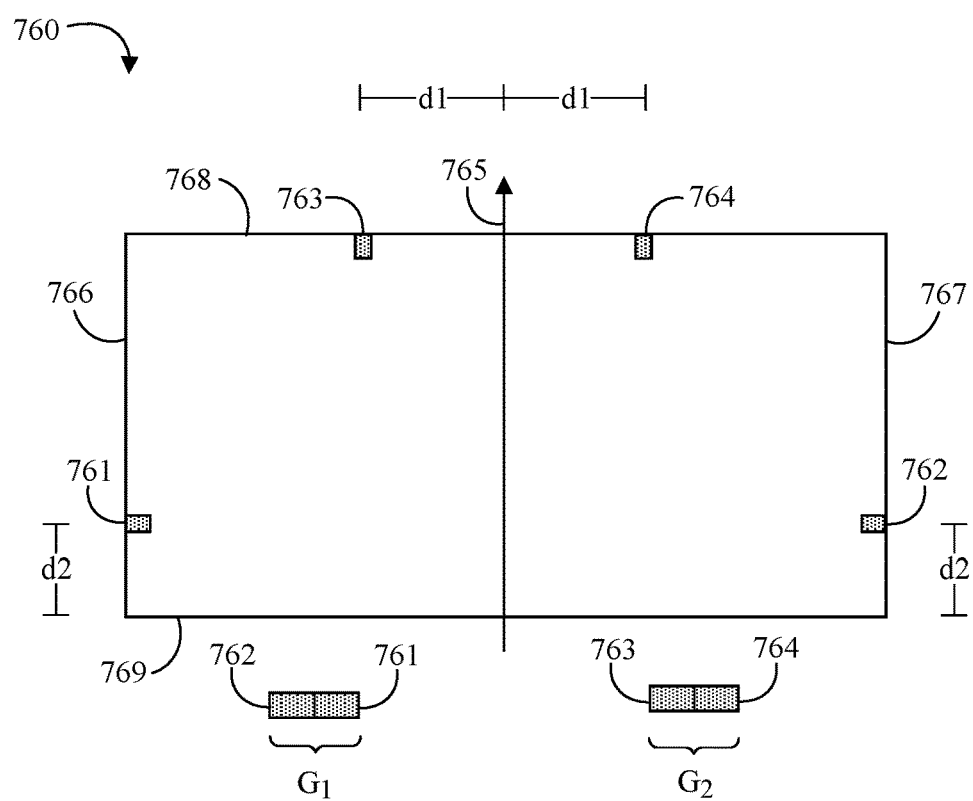
FIG. 7F is an illustrative diagram of an example of a viewport super-imposed on an equirectangular format 2D frame according to an embodiment.

FIG. 7F illustrates an embodiment of a 2D video frame 760 including selected blocks arranged for encode quality selection. The 2D video frame 760 may include a projection of 360 video in the equirectangular format. The selected blocks may include a first group of blocks $G_1$, and a second group of blocks $G_2$, which may be selected for encode quality selection. For encode quality selection, for example, the block 761 may be aligned to the right of the block 762 and the encode quality selection may be performed. The group $G_2$ may include a block 763 and a block 764 such that, for encode quality selection, the block 763 may be inverted and aligned to the top of the block 764 (or vice versa) and the encode quality selection may be performed.

The block 761 and the block 762 are non-neighboring in the 2D video frame 760 (e.g., no pixel of the block 761 is contiguous with or adjacent to any pixel of the block 762 in the 2D video frame 760). However, in the 360 video space, a pixel of the block 761 at a frame boundary 766 is a neighbor of a pixel of the block 762 at a frame boundary 767. Furthermore, blocks 761, 762 may be the same distance (d2) from a bottom frame boundary 769 (and a top frame boundary 768). With reference to FIG. 7F, in the equirectangular format, for any block adjacent to the left frame boundary 766, a corresponding block adjacent to right frame boundary 767 (at the same distance from bottom frame boundary 769 or top frame boundary 768) may be found such that the groups of blocks are non-neighboring in 2D video frame 760 but neighboring in the 360 video space. Similar determinations may be made to identify a group of neighbor blocks corresponding to the group of neighbor blocks $B_1$ through $B_9$ in FIG. 7E. The identified neighbor blocks may also be used for encode quality selection.

The group $G_2$ may include the block 763 and the block 764 for encode quality selection. For example, for encode quality selection, the block 763 may be inverted and aligned to the top of the block 764 (or block 764 may be inverted and aligned to the top of the block 763) and encode quality selection may be performed. The block 763 and the block 764 are non-neighboring in 2D video frame 760, may be neighbors in the 360 video space. For example, the blocks 763, 764 may be equidistant (i.e., both at distance d1) from a centerline 765 of the 2D video frame 760. For any block adjacent to the top frame boundary 768 (except for pixels exactly at the centerline 765, if any), a corresponding block also adjacent to the top frame boundary 768 and equidistant to the centerline 765 may be found such that the blocks are non-neighboring in the 2D video frame 760 but neighboring in the 360 video space. Similarly, for any block adjacent to the bottom frame boundary 769, a corresponding block also adjacent to the bottom frame boundary 769 and equidistant to the centerline 765 may be found such that the blocks are non-neighboring in the 2D video frame 760 but neighboring in the 360 video space. Similar determinations may be made to identify a group of neighbor blocks corresponding to the group of neighbor blocks $B_1$ through $B_9$ in FIG. 7E. The identified neighbor blocks may also be used for encode quality selection.

The described block selection and encode quality selection techniques for 2D video frame that are projections from a 360 video space may be performed for any format of projection. For example, the 2D video frame may be an equirectangular frame projected from the 360 video space (as discussed with respect to FIGS. 7D to 7F and elsewhere herein), a cube map format frame projected from the 360 video space (as discussed with respect to FIG. 7G and elsewhere herein), a compact cube map format frame projected from the 360 video space (as discussed with respect to FIG. 7I and elsewhere herein), an environment mapping to any shape, a geometric net of any 3D shape, or the like. For example, a cube map format may project the 360 video space onto the sides of a cube, which may be unfolded or arranged within the 2D video frame.

Figure 7G:
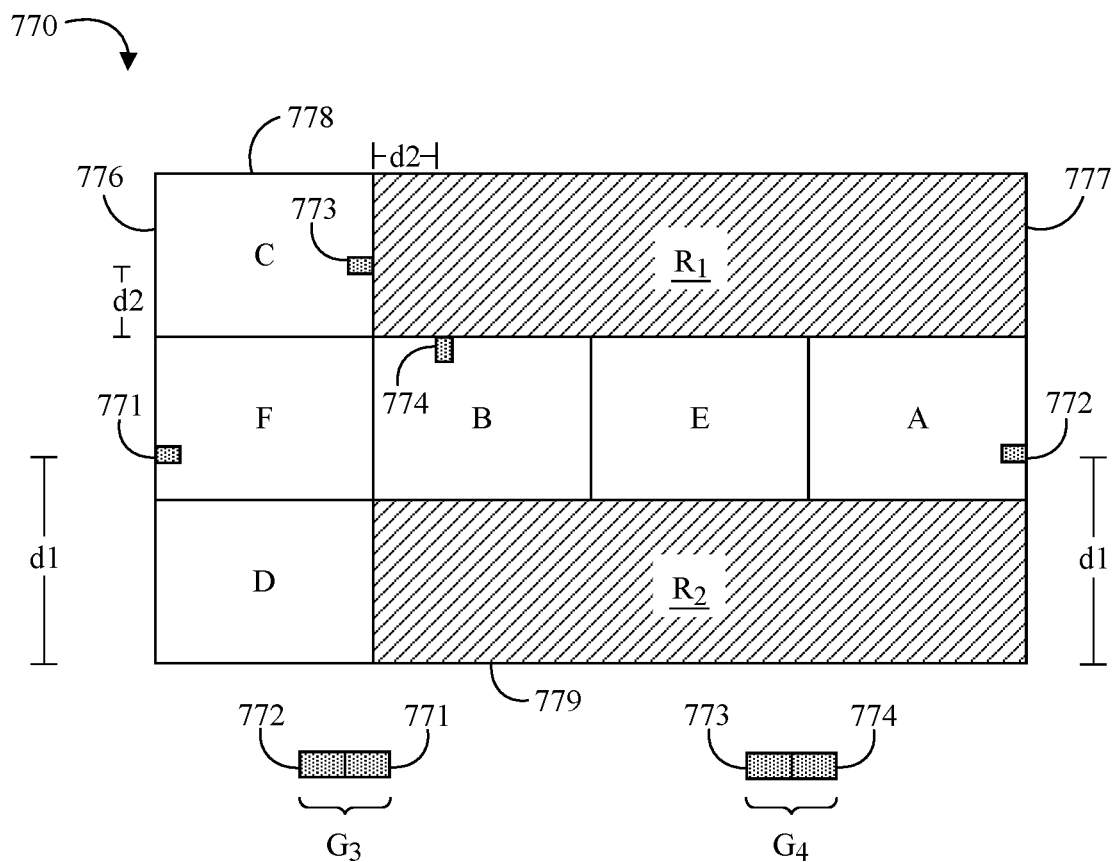
FIG. 7G is an illustrative diagram of an example of a 2D frame with a cube map 360 video format according to an embodiment.

FIG. 7G illustrates an embodiment of a 2D video frame 770 including a projection from a 360 video space in a cube map format and selected blocks for encode quality selection. For example, a group of blocks $G_3$ may include a block 771 and a block 772 that may be aligned for encode quality selection. The group of blocks $G_4$ may include a block 773 and a block 774 that may be rotated and aligned as needed for encode quality selection. As discussed herein, other combinations of blocks may be identified as neighbors and aligned into groups of blocks for encode quality selection. The 2D video frame 770 may include a left frame boundary 776, a right frame boundary 777, a top frame boundary 778, and a bottom frame boundary 779. Furthermore, the 2D video frame 770 may include blank pixel regions R1, R2, which are illustrated as hatched in the 2D video frame 770 but may include any suitable color or pixel values (e.g. black). The block 771 and the block 772 may be identified as neighbors in the 360 video space because they may the same distance (d1) from a bottom frame boundary 779 (and a top frame boundary 778). The block 773 and the block 774 may be identified as neighbors in the 360 video space because they may be equidistant (e.g. both at distance d2) from the corner of the face C and the face B. Similar determinations may be made to identify a group of neighbor blocks corresponding to the group of neighbor blocks $B_1$ through $B_9$ in FIG. 7E. The identified neighbor blocks may also be used for encode quality selection.

Figure 7H:
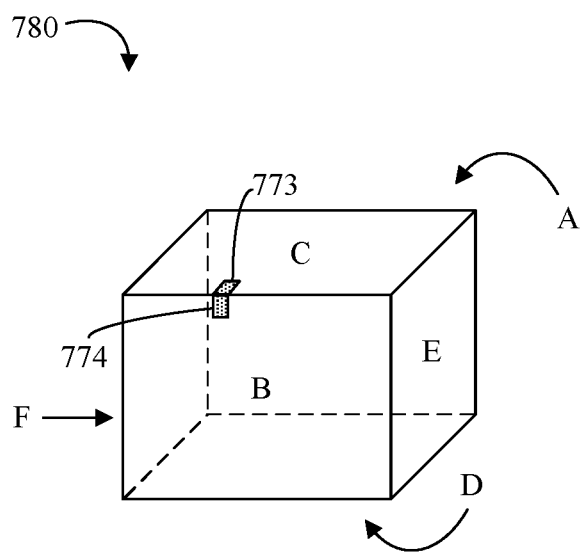
FIG. 7H is an illustrative perspective diagram of an example of a cube according to an embodiment.

FIG. 7H illustrates an embodiment of a cube 780 for receiving projections from a 3D video space. The cube 780 may have 6 faces (labeled A-F such that A is the back, B is the front, C is the top, D is the bottom, E is the right side, and F is the left side). For example, 3D video (e.g., frames or pictures) may be projected onto the cube 780 such that each face of the cube 780 includes a portion of the 3D video or sphere. With reference to FIG. 7G, each face of the cube 780, in the cube map format, may be laid open in an edge-join fashion across the 2D video frame 770. For example, the 2D video frame 770 may include a geometric net of the cube 780. Although shown with the faces in a sideways T format, any suitable format may be used such as a compact cube format as discussed further below with respect to FIG. 7I.

As shown in FIG. 7H, the block 773 and the block 774 may join at the boundary between faces B and C with respect to the cube 780. For example, a pixel of the block 773 at the boundary and a pixel of the block 774 also at the boundary are neighboring pixels in the 3D video space projected onto the cube 780. As is discussed further below, the group $G_4$ including the block 773 and the block 774 may be selected for encode quality selection. Similarly, corresponding groups of blocks sharing a boundary between adjacent faces may be selected for encode quality selection. For example, such groups of blocks may be formed between a shared boundary between face C and face B, a shared boundary between face C and face E, a shared boundary between face A and face F (e.g. as shown with respect to the block 771 and the block 772 in FIG. 7G), and so on.

With respect to faces A-F, each face may have a left face boundary, right, face boundary, top face boundary, and bottom face boundary. Such boundaries may be shared with another face, a blank pixel region, or a frame boundary as shown. As discussed with respect to FIG. 7H, sets of blocks at right angles to the following face boundaries may be selected/matched and rotated/aligned for encode quality selection: top boundary of face B with right boundary of face C, bottom boundary of face B with right boundary of face D, top boundary of face E with top boundary of face C, bottom boundary of face E with bottom boundary of face D, top boundary of face A with left boundary of face C, right boundary of face A with left boundary of face F, bottom boundary of face A with left boundary of face D.

Figure 7I:
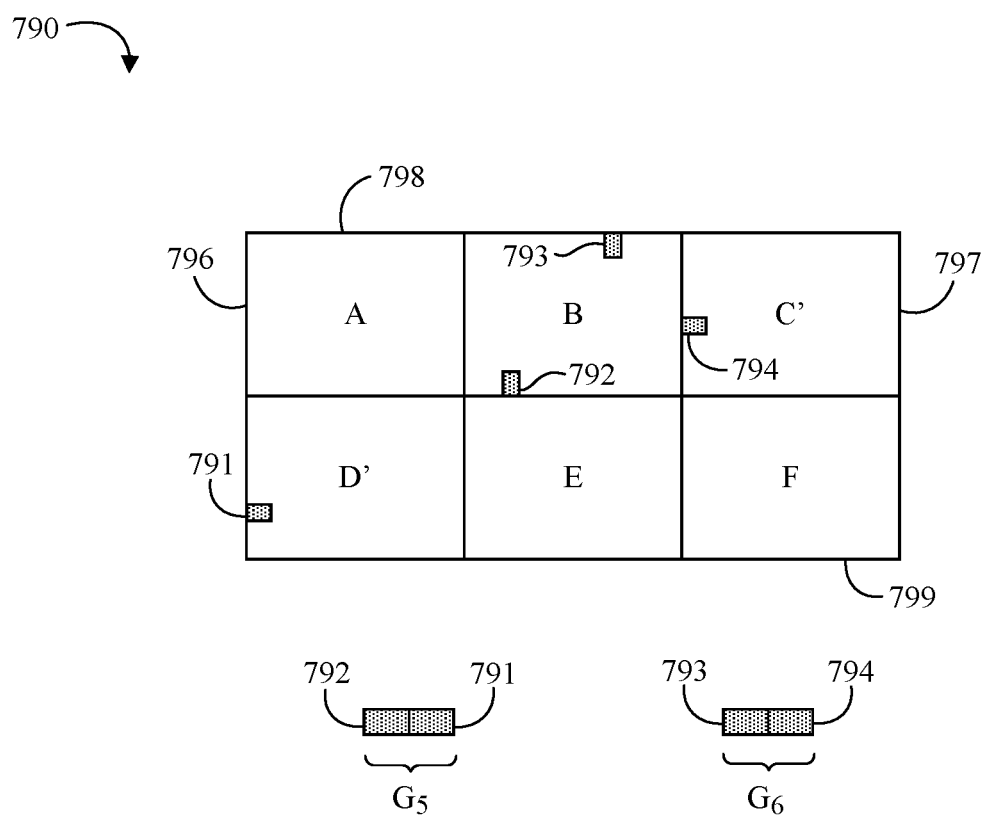
FIG. 7I is an illustrative diagram of an example of a 2D frame with a compact cube map 360 video format according to an embodiment.

FIG. 7I illustrates an embodiment of a 2D video frame 790 that may include a projection from a 360 video space in a compact cube map format and groups of blocks groups of blocks $G_5$, $G_6$ selected for encode quality selection. For example, the group $G_5$ may include a block 791 and a block 792 that may be rotated and/or aligned for encode quality selection. The group $G_6$ may include a block 793 and a block 794 that may also be rotated and/or aligned for encode quality selection. Other combinations of blocks may be aligned into groups of blocks for encode quality selection. For example, any group of blocks having blocks that share a boundary between adjacent faces may be selected for encode quality selection.

With reference to FIGS. 7H and 7I, each face of the cube 780, in the compact cube map format, may be provided within the 2D video frame 790 as shown. With respect to the alignment of the cube faces provided in FIG. 7G, faces A, B, E, and F may have the same alignment while faces C' and D' may be rotated 180°. Although illustrated in a particular compact cube format, any suitable format may be used for the projection from the 360 video space.

The 2D video frame 790 includes a left frame boundary 796, a right frame boundary 797, a top frame boundary 798, and a bottom frame boundary 799. Also, as shown with respect to faces A, B, C', D', E, F, each face may have a left face boundary, right face boundary, top face boundary, and bottom face boundary. Such boundaries may be shared with another face or a frame boundary as shown. For example, blocks at right angles to the following face boundaries may be selected/matched and rotated/aligned for encode quality selection: top boundary of face B with left boundary of face C', bottom boundary of face B with left boundary of face D', top boundary of face E with bottom boundary of face C', bottom boundary of face E with top boundary of face D', top boundary of face A with right boundary of face C', right boundary of face A with left boundary of face F, bottom boundary of face A with right boundary of face D'.

The block 791 and the block 792 are non-neighboring in 2D video frame 790, but are neighboring in the 360 video space (e.g. based on a left boundary of the face D' being shared with a bottom boundary of the face B). The block 793 and the block 794 are non-neighboring in 2D video frame 790, but are neighboring in the 360 video space (e.g. based on a top boundary of the face B being shared with a left boundary of the face C'). Similar determinations may be made to identify a group of neighbor blocks corresponding to the group of neighbor blocks $B_1$ through $B_9$ in FIG. 7E. The identified neighbor blocks may also be used for encode quality selection.

As discussed, the block selection and encode quality selection techniques discussed herein may be used in any suitable 3D video encode, decode, pre-processing, or post-processing context.

Range Adjuster Examples

Figure 8A:
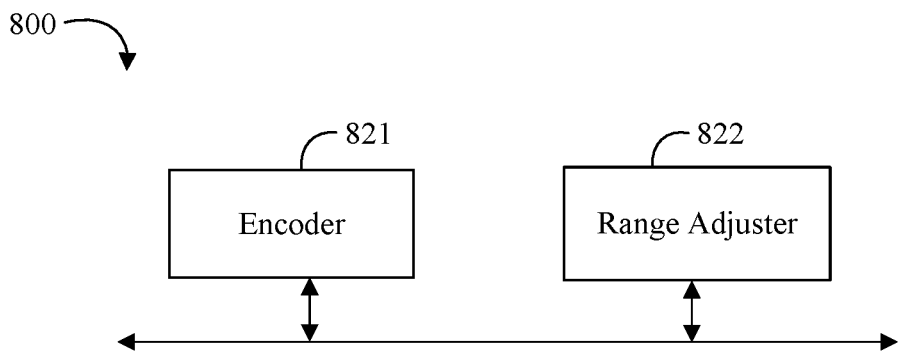
FIG. 8A is a block diagram of another example of a graphics apparatus according to an embodiment.

Turning now to FIG. 8A, an embodiment of a graphics apparatus 800 may include an encoder 821 to encode a first block of a two-dimensional (2D) frame, where the 2D frame corresponds to a projection of a 360 video space, and a range adjuster 822 communicatively coupled to the encoder 821 to adjust a search range for the 2D frame based on a search area of the 2D frame. For example, the range adjuster 822 may be configured to adjust a first search range for a first search area of the 2D frame to be relatively larger than a second search range for a second search area of the 2D frame based on the first search area having relatively more geometric distortion as compared to the second search area. In some embodiments, the 2D frame may correspond to an equirectangular projection of the 360 video space, and the range adjuster 822 may be configured to adjust a first search range for a pole area of the 2D frame to be relatively larger than a second search range for a central area of the 2D frame. The encoder 821 may be configured to perform a motion estimation for the 2D frame based on the first and second search ranges.

Some embodiments of the apparatus 800 may further include any of a viewport manager communicatively coupled to the encoder to determine if a request for a viewport of the 2D frame extends beyond a first edge of the 2D frame and to fill the requested viewport with wrap-around image information, and/or a motion estimator communicatively coupled to the display processor to estimate motion information based on both color information and depth information.

Embodiments of each of the above encoder 821, range adjuster 822, and other components of the apparatus 800 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 8B:
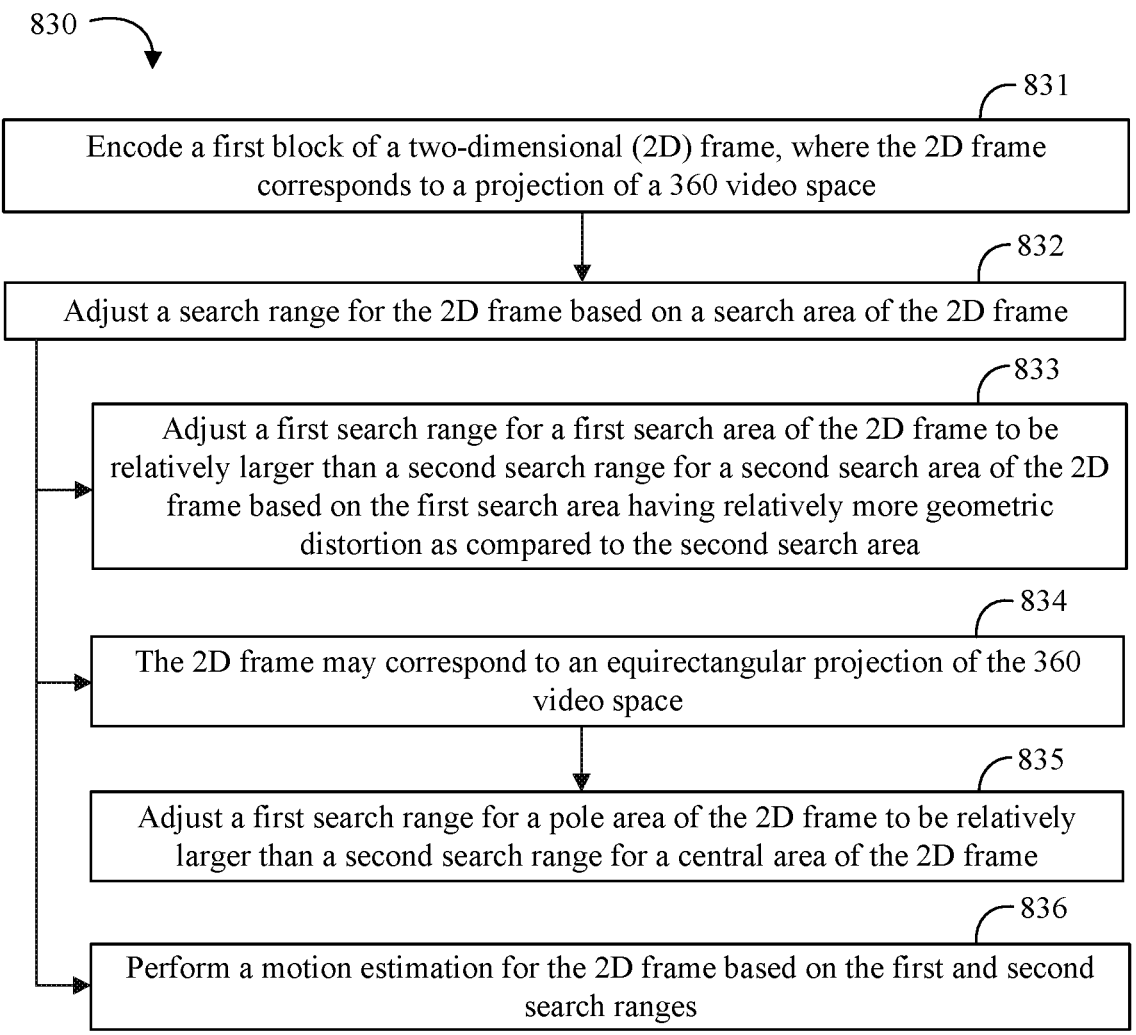
FIG. 8B is a flowchart of another example of a method of processing 360 video according to an embodiment.

Turning now to FIG. 8B, an embodiment of a method 830 of processing a 360 video may include encoding a first block of a two-dimensional (2D) frame, where the 2D frame corresponds to a projection of a 360 video space at block 831, and adjusting a search range for the 2D frame based on a search area of the 2D frame at block 832. For example, the method 830 may include adjusting a first search range for a first search area of the 2D frame to be relatively larger than a second search range for a second search area of the 2D frame based on the first search area having relatively more geometric distortion as compared to the second search area at block 833. In some embodiments, the 2D frame may correspond to an equirectangular projection of the 360 video space at block 834, and the method 830 may include adjusting a first search range for a pole area of the 2D frame to be relatively larger than a second search range for a central area of the 2D frame at block 835. The method 830 may also include performing a motion estimation for the 2D frame based on the first and second search ranges at block 836.

Embodiments of the method 830 may be implemented in a system, apparatus, GPU, or parallel processing unit (PPU) such as, for example, those described herein. More particularly, hardware implementations of the method 830 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 830 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 830 may be implemented on a computer readable medium as described in connection with Examples 36 to 39 below.

For example, embodiments or portions of the method 830 may be implemented in applications or driver software (e.g. through an API). Other embodiments or portions of the method 830 may be implemented in specialized code (e.g. shaders) to be executed on a GPU. Other embodiments or portions of the method 830 may be implemented in fixed function logic or specialized hardware (e.g. in the GPU).

Some embodiments may advantageously provide improved motion search for 360 video in ERP format. For example, an x-direction and/or y-direction search range for motion estimation may be adjusted based on the geometric distortion introduced when converting from the original sphere to ERP format. Specifically, some embodiments may increase an x-search range and/or reduce a y-search range for north/south pole areas of the ERP formatted 2D frame when a motion search compute is performed.

Figure 8C:
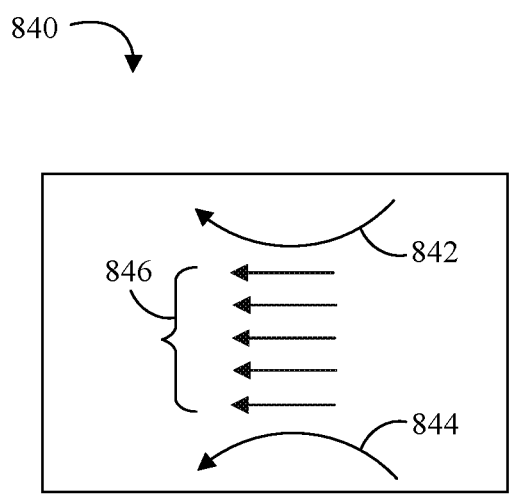
FIG. 8C is an illustrative diagram of another example of a 2D frame with an ERP 360 video format according to an embodiment.

Turning now to FIG. 8C, an ERP formatted 2D frame 840 may include geometric distortion, which may be more pronounced for a north pole area 842 and a south pole area 844 of the 2D frame 840 (e.g. portions of the frame 840 may be warped). Some embodiments may increase a search range in the north and south pole areas 842, 844 as compared to a central area 846 area (e.g. away from poles). In addition, or alternatively, some embodiments may decrease a search range in the central area 846. For a motion search, for example, providing relatively larger motion search ranges in the pole areas 842, 844 as compared to the central area 846 may improve the image quality and/or may improve coding efficiency for processing ERP format images. The size of each search range and the amount of relative difference between ranges may vary, for example, based on the amount of geometric distortion in an area of the search. In some embodiments, a smallest search range may be provided at the center point of the frame, a largest search range may be provided at poles (e.g. where motion may be amplified), with gradual changes in the size of the search ranges between those areas. The search range for each area may be determined from a discrete map of search ranges, or may be determined by formula (e.g. corresponding to the geometric distortion).

Other systems may apply uniform motion search ranges across the entire 2D frame, which may result in disproportionate resources dedicated to the poles relative to other portions of the image area. By increasing the search range proportional to the original image area (e.g. instead of the distorted image), some embodiments may assign fewer resources to the poles and more resources to the central area. Advantageously, the encoded image quality may improve and resources may be more appropriately utilized.

Viewport Manager Examples

Figure 9A:
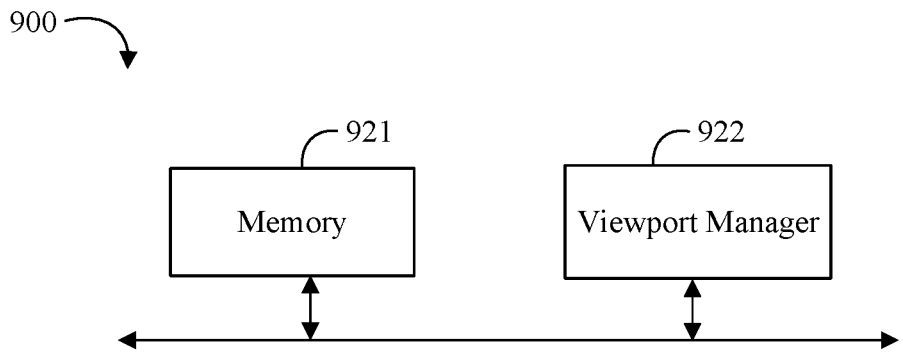
FIG. 9A is a block diagram of another example of a graphics apparatus according to an embodiment.

Turning now to FIG. 9A, an embodiment of a graphics apparatus 900 may include a memory 921 communicatively coupled to the display processor to store a frame of a video, and a viewport manager 922 communicatively coupled to the memory 921. The viewport manager 922 may be configured to determine if a request for a viewport of the frame extends beyond a first edge of the frame, determine if the video is identified as 360 video, and fill the requested viewport with wrap-around image information if the video is identified as 360 video. For example, the viewport manager 922 may be configured to fill the requested viewport with image information starting from a second edge of the frame which is contiguous with the first edge in 360 video space. The viewport manager may also be configured to identify the request as out-of-bounds, and/or to return a partial viewport, if the video is not identified as 360 video. In some embodiments, a graphics processor may include logic to implement the viewport manager in hardware. Some embodiments of the apparatus 900 may further include a motion estimator communicatively coupled to the graphics processor to estimate motion information based on both color information and depth information.

Embodiments of each of the above memory 921, viewport manager 922, and other components of the apparatus 900 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 9B:
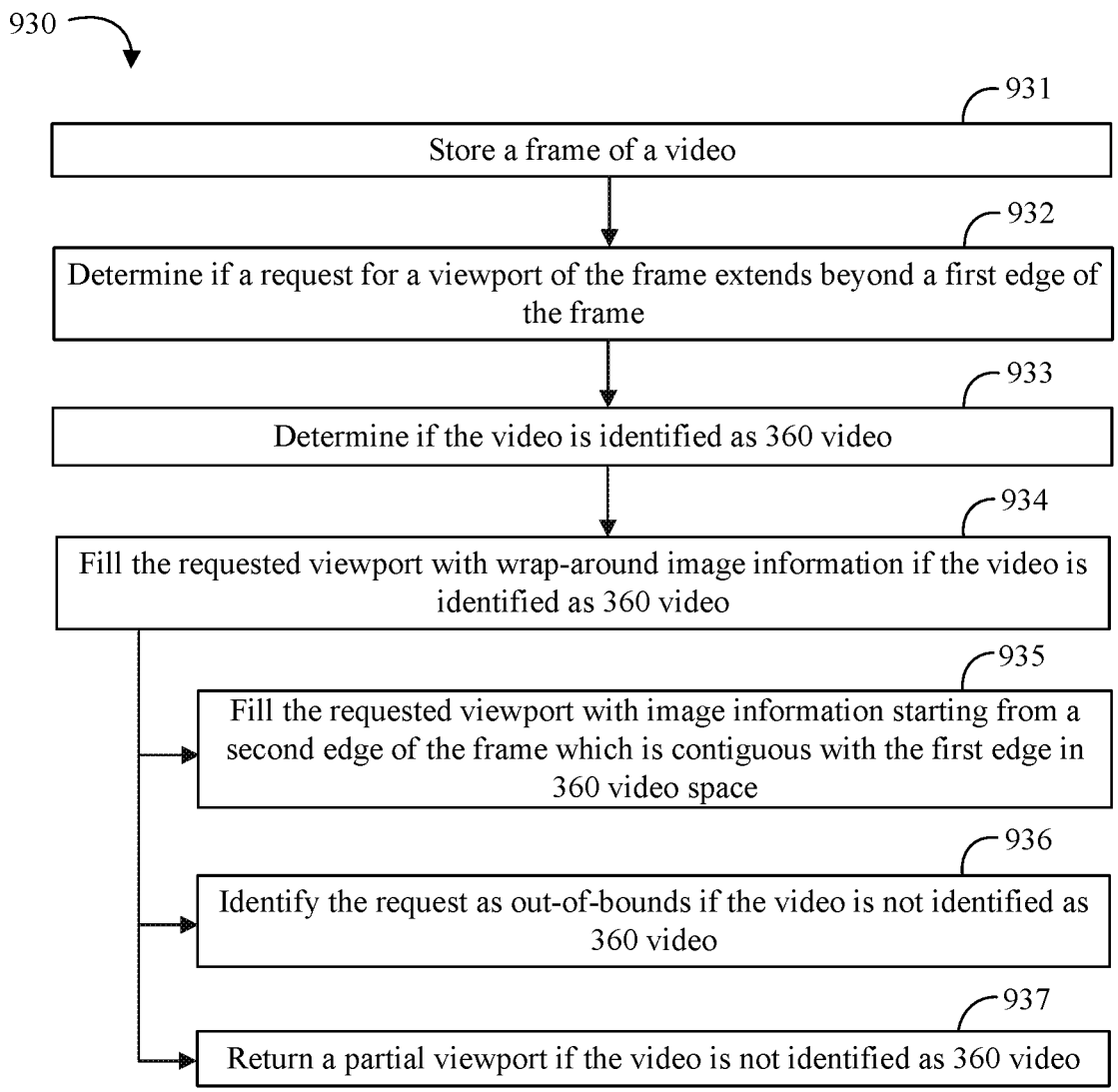
FIG. 9B is a flowchart of another example of a method of processing 360 video according to an embodiment.

Turning now to FIG. 9B, an embodiment of a method 930 of processing a 360 video may include storing a frame of a video at block 931, determining if a request for a viewport of the frame extends beyond a first edge of the frame at block 932, determining if the video is identified as 360 video at block 933, and filling the requested viewport with wrap-around image information if the video is identified as 360 video at block 934. The method 930 may include filling the requested viewport with image information starting from a second edge of the frame which is contiguous with the first edge in 360 video space at block 935. The method 930 may additionally, or alternatively, also include identifying the request as out-of-bounds if the video is not identified as 360 video at block 936, and returning a partial viewport if the video is not identified as 360 video at block 937.

Embodiments of the method 930 may be implemented in a system, apparatus, GPU, or parallel processing unit (PPU) such as, for example, those described herein. More particularly, hardware implementations of the method 930 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 930 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 930 may be implemented on a computer readable medium as described in connection with Examples 53 to 56 below.

For example, embodiments or portions of the method 930 may be implemented in applications or driver software (e.g. through an API). Other embodiments or portions of the method 930 may be implemented in specialized code (e.g. shaders) to be executed on a GPU. Other embodiments or portions of the method 930 may be implemented in fixed function logic or specialized hardware (e.g. in the GPU).

Some embodiments may advantageously provide hardware media block instructions for 360 image. For example, some embodiments may provide hardware support for viewport wrap-around for 360 video. In the hardware module, a request for a viewport of a frame of a video which goes out-of-bounds on the left side of the frame, for example, may automatically go in-bounds on the right side of the frame if the video is identified as a 360 video.

Figure 9C:
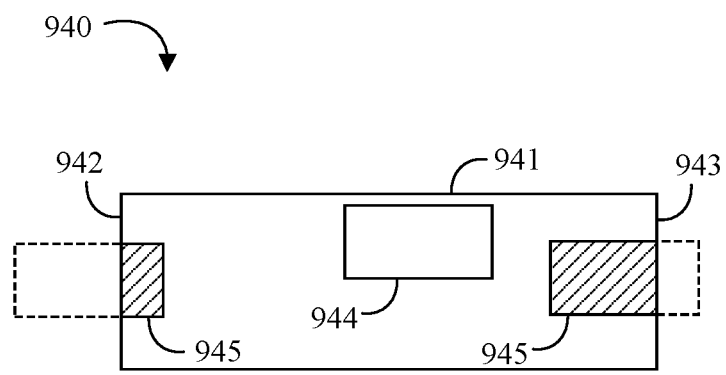
FIG. 9C is an illustrative diagram of an example of viewports super-imposed on a 360 video according to an embodiment.

Turning now to FIG. 9C, a 360 video 940 may be represented as a flat frame 941. Images in the frame 941 may wrap-around from a left edge 942 of the frame 941 to a right edge 943 of the frame 941. A first viewport 944 may be completely within the frame 941, while a second viewport 945 may cross the left and right edges 942, 943 of the frame.

Some embodiments may include instructions or an API for accelerated media encoding while also accounting for the wrap-around image characteristic of 360 video. For example, an instruction may specify a window, and all the pixels for that window may be returned, even if the image wraps around. If the requested window slides off an edge, the instruction unit may automatically continue filling the pixels of the window from the edge of the frame which would be contiguous in 360 space. For example, some embodiments may include a logical-to-physical memory map which maps memory address requests that exceed the rightmost frame memory address to the corresponding addresses from the leftmost frame memory addresses.

To speed up 360 media encoding/decoding on a shader core, for example, new block instructions may be added in the GPU data port unit. A block instruction may either return a block of pixels from an image in memory, or may write a block of pixels to the image. The instruction may specify the block's location, width and height. If a part of the specified block falls outside of the image's left, right, top or bottom boundary, the hardware will wrap the block to the mirrored side of the image and return pixels (or write to pixels) from the mirrored side. The wraparound may be done either in a 2D surface (e.g. see FIG. 7D, where the wraparound happens from a right side frame boundary to a left side frame boundary), or in a 2D projection from 3D space (e.g. see FIGS. 7G and 7H, where the wraparound happens between various faces of a cube).

Advantageously, an application or driver which uses the instruction may make a single request for pixels from a viewport, without regard to whether the viewport spans an edge of the 360 video. Some embodiments may simplify software for working with 360 video by managing the viewport requests across edges of the 360 video in firmware and/or hardware. For example, the image may be identified to the hardware as a 360 image or the hardware may detect that the image is a 360 image. For example, the instruction which requests the window may include a bit that indicates that the hardware should treat the image as a 360 image. When the bit is set, the hardware may treat an out-of-bounds request as a wrap-around request. When the bit is set, instead of truncating the returned pixel data, the hardware may fill the pixel data with pixels from the other edge of the image. The hardware for managing viewport wrap-arounds may be integrated with a GPU, PPU, and/or other graphics unit as described herein.

In some embodiments, an API call may include an input variable which specifies that the image should be treated as a 360 image. Advantageously, software applications for 360 video may be simplified and performance may be improved by hardware management of viewport requests in accordance with some embodiments.

Motion Estimator Examples

Figure 10A:
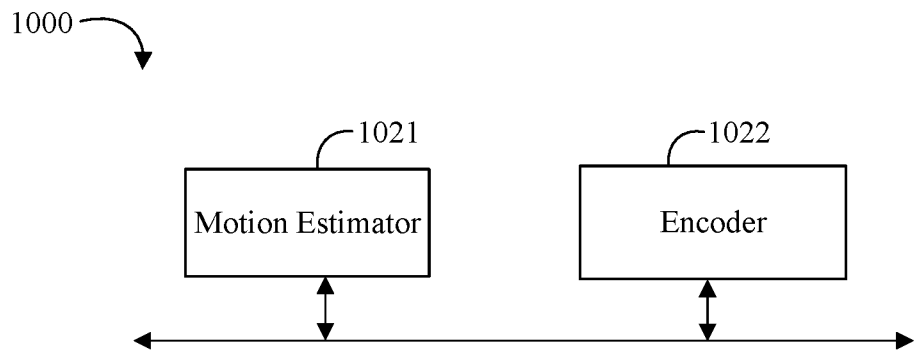
FIG. 10A is a block diagram of another example of a graphics apparatus according to an embodiment.

Turning now to FIG. 10A, an embodiment of a graphics apparatus 1000 may include a motion estimator 1021 to estimate motion information for a frame based on both color information from a frame and depth information, and an encoder 1022 communicatively coupled to the motion estimator 1021 to encode the frame based on the estimated motion information. For example, the motion estimator 1021 may be configured to determine a first motion estimate based on the depth information, and to determine a second motion estimate based on the first motion estimate and the color information. The motion estimator 1021 may be further configured to determine an estimated motion vector based on the first motion estimate and the second motion estimate. In some embodiments, the motion estimator 1021 may be configured to determine one of segmentation information and depth discontinuity information based on the depth information.

Embodiments of each of the above motion estimator 1021, encoder 1022, and other components of the apparatus 1000 may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 10B:
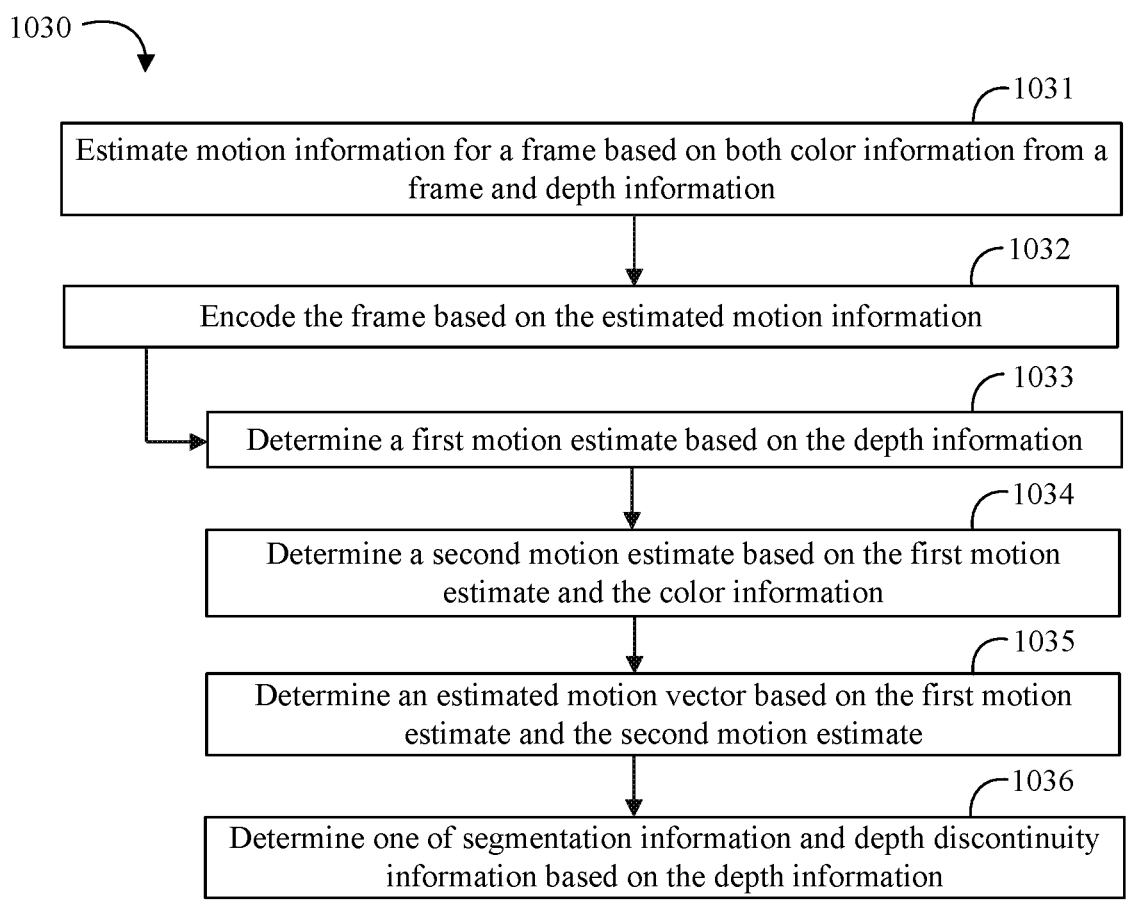
FIG. 10B is a flowchart of a example of a method of processing a frame according to an embodiment.

Turning now to FIG. 10B, an embodiment of a method 1030 of processing a 360 video may include estimating motion information for a frame based on both color information from a frame and depth information at block 1031, and encoding the frame based on the estimated motion information at block 1032. For example, the method 1030 may include determining a first motion estimate based on the depth information at block 1033, and determining a second motion estimate based on the first motion estimate and the color information at block 1034. The method 1030 may include determining an estimated motion vector based on the first motion estimate and the second motion estimate at block 1035. The method 1030 may additionally, or alternatively, also include determining one of segmentation information and depth discontinuity information based on the depth information at block 1036.

Embodiments of the method 1030 may be implemented in a system, apparatus, GPU, or parallel processing unit (PPU) such as, for example, those described herein. More particularly, hardware implementations of the method 1030 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 1030 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 1030 may be implemented on a computer readable medium as described in connection with Examples 69 to 72 below.

For example, embodiments or portions of the method 1030 may be implemented in applications or driver software (e.g. through an API). Other embodiments or portions of the method 1030 may be implemented in specialized code (e.g. shaders) to be executed on a GPU. Other embodiments or portions of the method 1030 may be implemented in fixed function logic or specialized hardware (e.g. in the GPU).

Some embodiments may advantageously provide depth and color image motion estimation. For example, some embodiments may utilize 3D contents depth image as segmentation information (e.g. based on a pyramid or hierarchical search). In other systems, motion estimation may be performed based on only the color image. The color image may be a flat image with no depth information. With 3D graphics content, however, depth information may be available. Some embodiments may provide better motion estimation based on both the color image and the depth information. For example, some embodiments may provide a more accurate motion vector.

The depth information may be used, for example, as segmentation information. For some images, color information may be different between foreground and background portions of the image. But sometimes the color may not be significantly different between the foreground and the background, and segmentation may be difficult or inaccurate based only on color. Depth information between foreground and background may be different even if the color is not significantly different, and some embodiments may more readily separate the foreground from the background based on the depth information.

Some embodiments may use the depth information to determine segmentation and a first motion estimate. The color information may then be used to determine a second motion estimate. For example, the first and second motion estimates may be combined to determine a more accurate predicted motion vector.

Figure 10C:
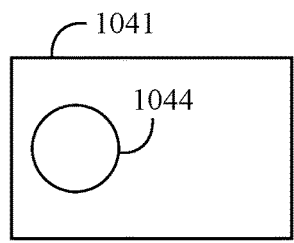
FIGS. 10C to 10E are illustrative diagrams of successive frames according to an embodiment.
Figure 10D:
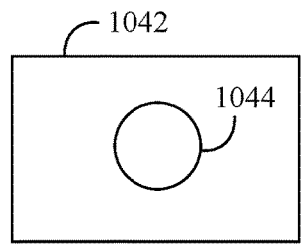
Figure 10E:
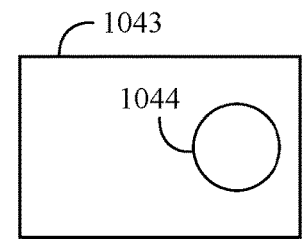

Turning now to FIGS. 10C to 10E, some embodiments may improve frame rate for a 3D game or application. The frame rate up conversion may improve the performance of a graphics system and may allow an increased frame rate in a gaming context (e.g. such that a lower end device may have apparently better performance). A 3D game may create a first frame 1041 at time t, and a second frame 1042 at time t+1. Frame rate up conversion may extrapolate a new frame 1043 at time t+1.5 (e.g. before the 3D game creates the next frame at time t+2). Frame rate up conversion may continue to create extra frames for time t+2.5, t+3.5, etc. The extra frames may increase an apparent frame rate with the predicted/estimated interstitial frames. Frame rate up conversion may extrapolate the extra frame 1043, and further extra frames, based on a predicted motion vector. In accordance with some embodiments, the predicted motion vector for the extra frame 1043 may be predicted more accurately by utilizing depth information from the 3D game together with color information from the previous frame 1042 (e.g. or prior frames 1041 and 1042). In some embodiments, some types of frame rate up conversion may be referred to as asynchronous space warp (ASW).

For example, some embodiments may perform a parameter search to determine a multi-level motion vector estimation. For example, level 0 may correspond to the original image. Level 1 may be scaled down by half in the horizontal direction and half in the vertical direction (e.g. a quarter of the size of level 0). Level 2 may be scaled down to 1/16th the size of the original image, and so on. The depth information may be used as a predictor for the starting point of the motion vector.

In a two-level example, some embodiments may first use only the depth information for the motion vector estimation at a lower level (e.g. level 1). There may be a depth discontinuity between the foreground and the background, and some embodiments may use the depth image for a motion vector estimation around the depth discontinuity area 1044. The depth discontinuity may correspond to a boundary between the foreground and the background. At a higher level (e.g. level 0), some embodiments may use the level 1 information as a predictor. For example, the starting point of the motion vector search in level 0 may come the depth-based motion vector estimate from level 1. If there no depth discontinuity at level 1, level 0 may use just the color image for the motion vector estimation. The motion vector search in level 0 may advantageously result in a more accurate predicted motion vector because the starting point is based on the depth information.

Display Technology

Figure 11:
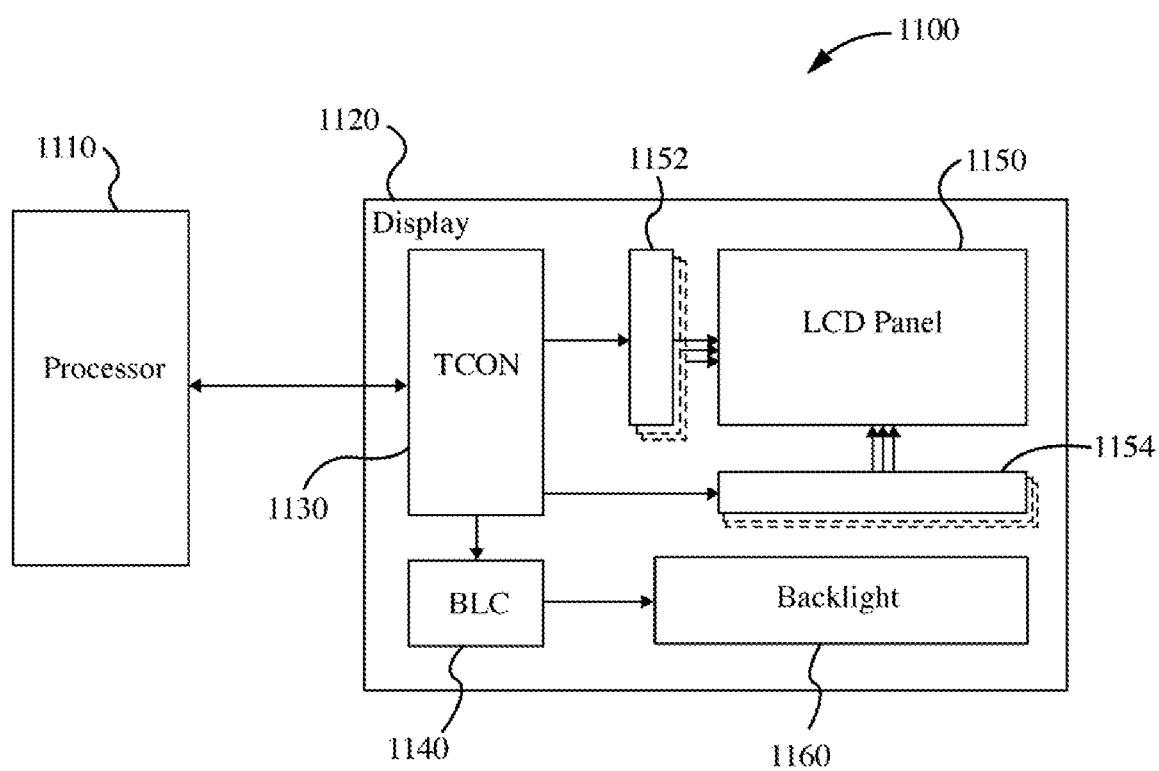
FIG. 11 is a block diagram of an example of a display with a localized backlight capability according to an embodiment.

FIG. 11 illustrates a system 1100 including a display 1120 with a localized backlight control capability, in accordance with one embodiment. As shown in FIG. 11, the display 1120 includes a timing controller (TCON) 1130, a backlight controller (BLC) 1140, a liquid crystal display (LCD) panel 1150, and a backlight 1160. The LCD panel 1150 comprises a plurality of liquid crystal elements (i.e., a liquid crystal and integrated color filter. In one embodiment, each pixel of the LCD panel 1150 includes a trio of liquid crystal elements with red, green, and blue color filters, respectively. The LCD panel 1150 arranges these pixels in a two-dimensional (2D) array that can be controlled via the row drivers 1152 and the column drivers 1154 to update the image being displayed by the LCD panel 1150. The TCON 1130 drives the row drivers 1152 and column drivers 1154 to address specific pixels of the LCD panel 1150 and adjust the voltage provided to the liquid crystal elements in the pixel to change the intensity of the light passing through each of the three liquid crystal elements and, therefore, the color of the pixel displayed on the surface of the LCD panel 1150. The TCON 1130 alternately addresses different pixels in the LCD panel 1150 and updates each individual pixel in the LCD panel 1150 once per refresh cycle.

The display 1120 also includes a backlight 1160 that includes a plurality of light emitting elements. In one embodiment, the light emitting elements are light emitting diodes (LEDs). The LEDs may be arranged at an edge of the LCD panel 1150 and the light generated by the LEDs may be dispersed through the LCD panel 1150 by a diffuser (not explicitly shown). Alternately, the LEDs may be arranged in a 2D array directly behind the LCD panel 1150. This arrangement may be referred to as direct backlighting because each LED may disperse light through one or more corresponding pixels of the LCD panel 1150 positioned in front of the LED.

In another embodiment, the light emitting elements may be CFLs. The CFLs are typically arranged along one or more edges of the LCD panel 1150. In cases where multiple edges are illuminated, the combination of edges may be altered to effect selective illumination of a region wherein less than the total set of lighting elements is used with less power.

In yet another embodiment, the light emitting elements may be a sheet (or sheets) of electroluminescent material. The sheet of electroluminescent material may be placed behind the LCD panel 1150 such that light from the surface of the electroluminescent material is dispersed through the pixels of the LCD panel 1150. The sheet of electroluminescent material may be divided into a plurality of regions (e.g., the sheet may be divided into quadrants, each quadrant corresponding to a quadrant of the LCD panel 1150). Each region may be individually controlled to illuminate only a portion of the LCD panel 1150. It will be appreciated that the type of backlight 1160 implemented in the system 1100 is not limited to these particular lighting technologies and that any backlight 1160 that can be divided into subsets of light emitting elements, each subset, when activated, capable of illuminating at least a portion of the LCD panel may be included in the system 1100.

The backlight 1160 is controlled by the BLC 1140. The BLC 1140 may include a driver that is configured to provide a voltage to the light emitting elements of the backlight 1160. In one embodiment, the BLC 1140 includes a pulse width modulation (PWM) driver that generates a PWM signal that activates (i.e., turns on) at least a portion of the light emitting elements of the backlight 1160. The PWM signal may have a duty cycle and frequency that cause the light generated by the light emitting elements to be dimmed. A 0% duty cycle may correspond to the light emitting elements being fully off and a 100% duty cycle may correspond to the light emitting elements being fully on. Intermediate duty cycles (e.g., 50%, 75%) cause the light emitting elements to be turned on for a portion of a cycle period and then turned off for a portion of a cycle period. The cycle period is fast enough that the "blinking" of the light emitting elements is not noticeable and the effect to a user is that the level of the light emitted by the backlight 1160 is lower than if the backlight 1160 were fully activated. Although the BLC 1140 is shown as an external component of the TCON 1130, in one embodiment, the functionality of the BLC 1140 may be included in the TCON 1130.

The display 1120 is connected to a processor 1110 that generates images for display on the LCD panel 1150. The processor 1110 may implement an interface for communicating with the display such as, but not limited to, a Video Graphics Array (VGA) interface, a High-Definition Multimedia Interface (HMDI), a DisplayPort (DP) or embedded DisplayPort (eDP) interface, a Digital Visual Interface (DVI), and the like. In one embodiment, the processor 1110 is a graphics processing unit (GPU) configured to process graphics data to generate images for display on the LCD panel 1150. The GPU may be configured to implement an image processing pipeline that generates pixel data for display on the LCD panel 1150. The image processing pipeline may correspond with a programmable image processing pipeline defined by the OPENGL architecture. The GPU may also be connected to a host processor, such as a CPU, that executes a device driver configured to control the operation of the GPU.

Alternatively, an emissive display system may be used where the LCD panel 1150 would be replaced by an emissive display panel (e.g., Organic Light Emitting Diode/OLED), the backlight 1160 would be omitted, and the row and column drivers 1152 and 1154 may be used to directly modulate pixel color and brightness.

Distance Based Display Resolution

Figure 12A:
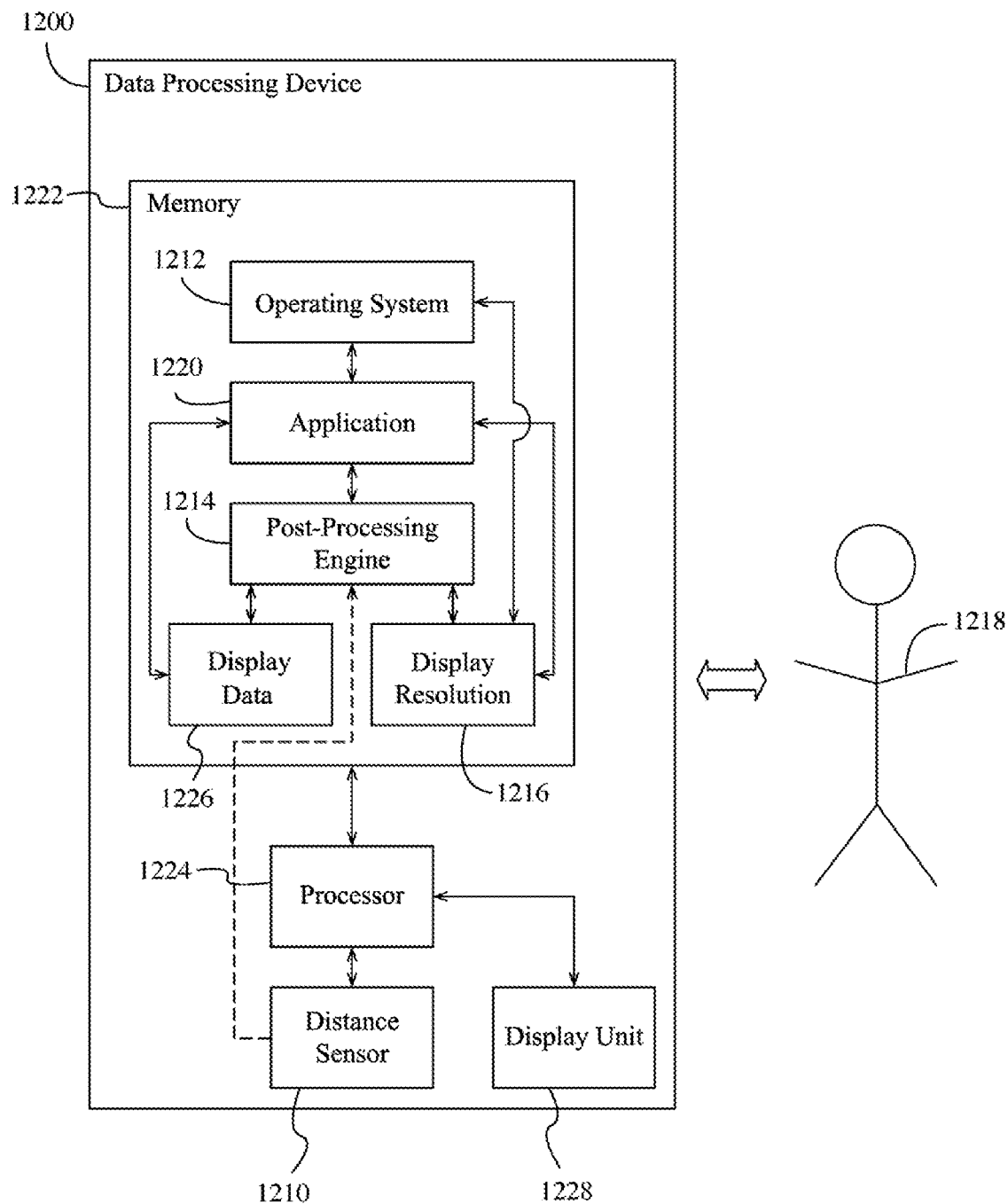
FIG. 12A is a block diagram of an example of a data processing device according to an embodiment.

FIG. 12A shows a data processing device 1200, according to one or more embodiments. In one or more embodiments, the data processing device 1200 may be a laptop computer, a desktop computer, a smart television, a smart display, a notebook computer, a netbook, a mobile phone, a tablet or a wearable device such as a head mounted display (HMD). Other form factors of the data processing device 1200 are within the scope of the exemplary embodiments discussed herein. In one or more embodiments, the data processing device 1200 may include a processor 1224 (e.g., a Central Processing Unit (CPU), a Graphics Processing Unit (GPU) and/or another processor such as a microcontroller) communicatively coupled to a memory 1222 (e.g., a volatile memory and/or a nonvolatile memory). The memory 1222 may include storage locations configured to be addressable through the processor 1224.

In one or more embodiments, the memory 1222 of the data processing device 1200 may include display data 1226 configured to be rendered on a display unit 1228 associated with the data processing device 1200. For example, the processor 1224 may perform appropriate processing (e.g., data conversion) on the display data 1226 prior to rendering thereof on display unit 1228. The display unit 1228 may be interfaced with the processor 1224. In one or more embodiments, a post-processing engine 1214 (e.g., a set of instructions, configurable logic and/or fixed-functionality hardware logic) may execute on the processor 1224. The post-processing engine 1214 may be configured to receive the display data 1226 and an output of a distance sensor 1210, which may be interfaced with the processor 1224. The post-processing engine 1214 may perform appropriate processing on the display data 1226 prior to rendering thereof on display unit 1228. The aforementioned processing may enhance readability of a screen content of the display unit 1228 and/or reduce power consumption through the data processing device 1200, as will be discussed below.

FIG. 12A also shows a display resolution setting 1216 being stored in the memory 1222. The display resolution setting 1216 may be understood as a number of pixels of the display data 1226 to be displayed on the display unit 1228 along each dimension (e.g., length, width perpendicular to the length) thereof. In one or more embodiments, with regard to input display data 1226 of a format incompatible with the display unit 1228, the processor 1224 may be configured to scale the display data 1226 to match the input display data 1226 to display unit 1228. It should be noted that the display resolution setting 1216 may be part of configuration data (not shown) related to other settings associated with the display unit 1228.

Also, the display resolution setting 1216 may be understood as the number of pixels of the display data 1226 per unit distance or area (e.g., pixels per inch/PPI of a display dimension). Other reasonable and feasible interpretations of the display resolution setting 1216 are within the scope of the exemplary embodiments discussed herein.

In one or more embodiments, the data processing device 1200 may execute an application 1220 thereon to configure the display unit 1228. In one or more embodiments, the application 1220 may provide a user interface for the aforementioned configuration. A user 1218 of the data processing device 1200 may be provided with a capability to select the display resolution setting 1216 from multiple options provided through the user interface. Alternately, the user 1218 may input a desired value for the display resolution setting 1216 through the user interface. The display data 1226 may be fit into the display resolution setting 1216 prior to rendering thereof on display unit 1228.

In one or more embodiments, as mentioned above, the data processing device 1200 may include the distance sensor 1210 associated therewith to track a distance between the user 1218 and the display unit 1228/data processing device 1200. In one or more embodiments, the user 1218 may be provided a capability to trigger the process of distance sensing. The triggering may be possible through a physical button associated with the data processing device 1200 or display unit 1228, through the user interface provided by application 1220 and/or loading of an operating system 1212 to be executed on the data processing device 1200. FIG. 12A shows the operating system 1212 as being stored in the memory 1222.

In the case of loading of the operating system 1212, the triggering may be an automatic process going on in the background or foreground. Other forms of triggering are within the scope of the exemplary embodiments discussed herein. The triggering of the process may cause a distance between the user 1218 and the display unit 1228/data processing device 1200 to be sensed through the distance sensor 1210. In one or more embodiments, the sensing may occur periodically. Alternately, the sensing may be continuous.

Figure 12B:
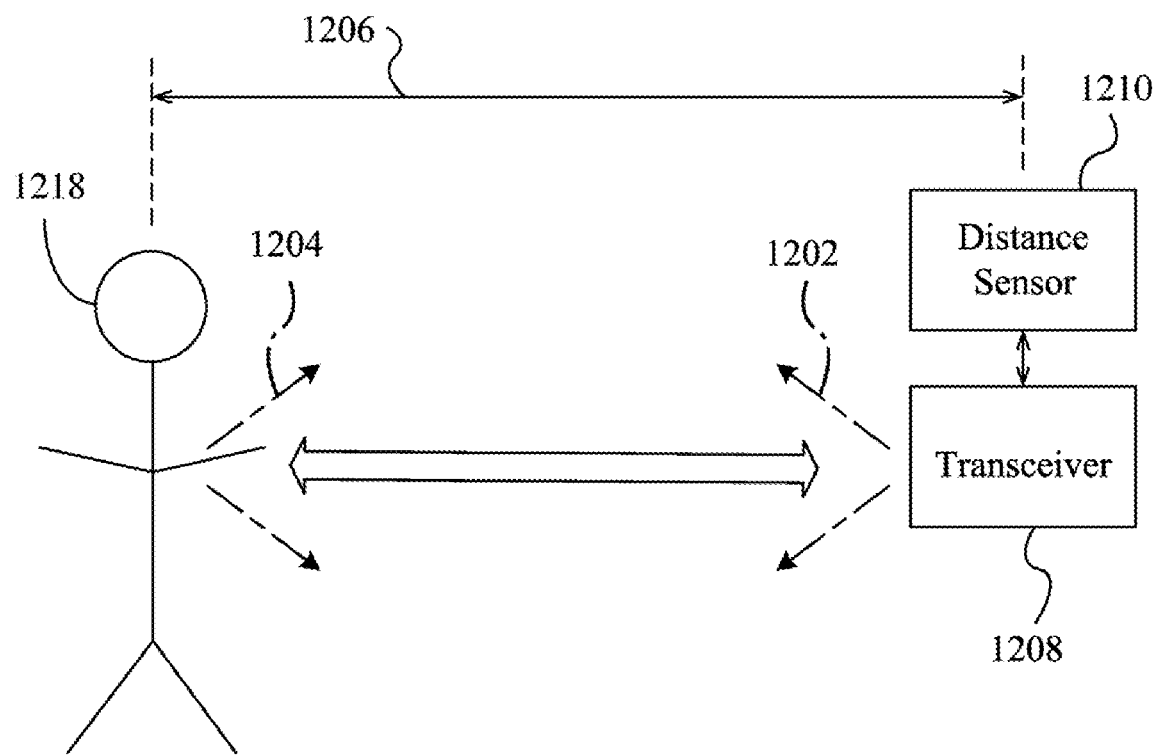
FIG. 12B is an illustration of an example of a distance determination according to an embodiment.

FIG. 12B shows an example distance sensor 1210. In FIG. 12B, the distance sensor 1210 may use a transceiver 1208 to emit an electromagnetic beam 1202 to the user 1218, wherein a return electromagnetic beam 1204 may be reflected/scattered from the user 1218 and analyzed, for example, through the processor 1224 (FIG. 12A) based on execution of the post-processing engine 1214 (FIG. 12A) to determine changes thereto. Accordingly, the distance 1206 between the user 1218 and the display unit 1228/data processing device 1200 may be determined. The distance sensor 1210 may be located in proximity to the display unit 1228 and that position thereof relative to the display unit 1228 may be fixed in order for the distance sensing to be accurate.

Display Layers

Figure 13:
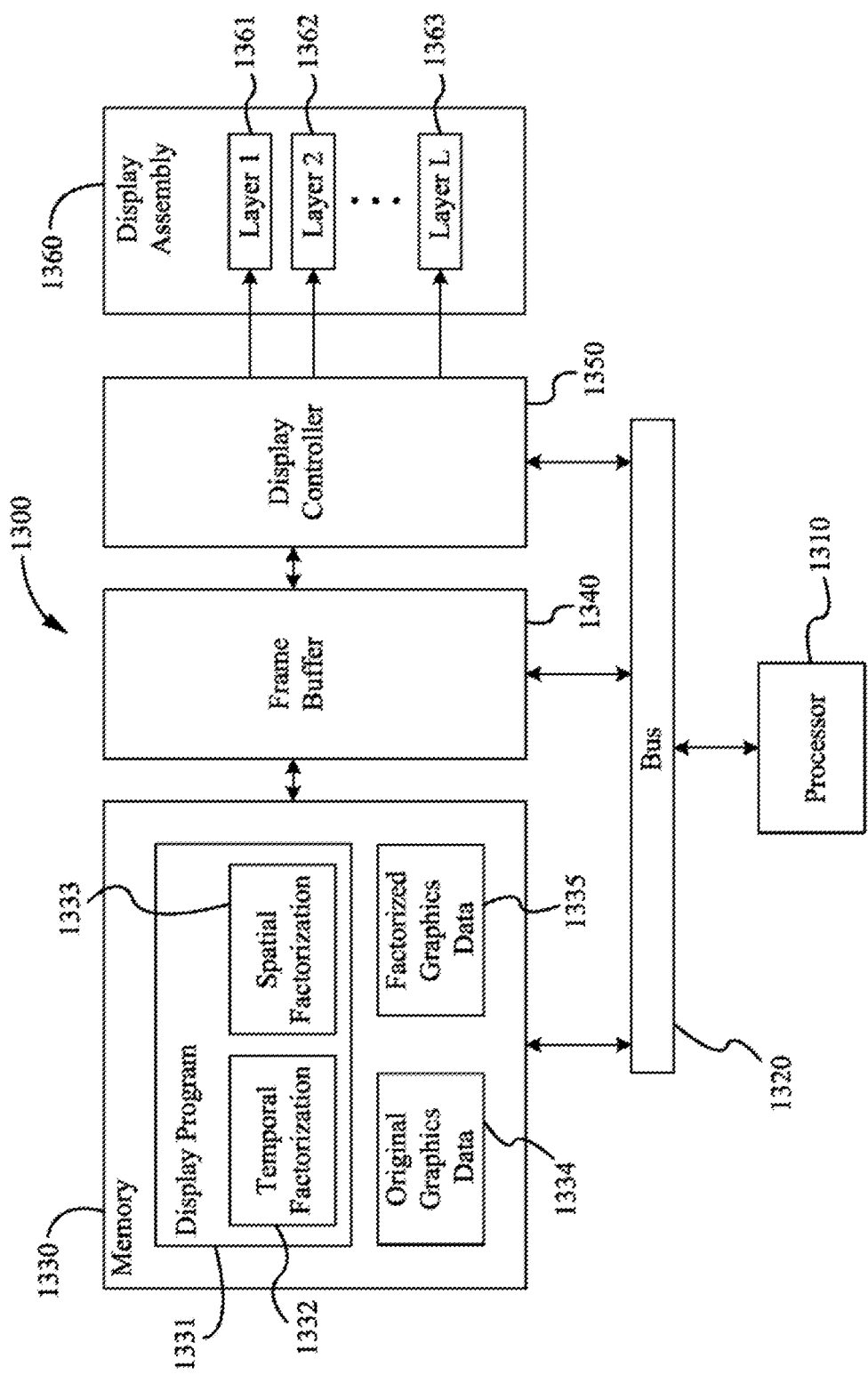
FIG. 13 is a block diagram of an example of a layered display architecture according to an embodiment.

FIG. 13 illustrates an exemplary display system 1300 utilizing cascaded display layers 1361, 1362 and 1363 to achieve spatial/temporal super-resolution in accordance with an embodiment of the present disclosure. The system 1300 includes a processor 1310 (e.g., a graphics processing unit/GPU), a bus 1320, memory 1330, a frame buffer 1340, a display controller 1350 and a display assembly 1360 (e.g., including display panels). It will be appreciated that the system 1300 may also include other components, such as an enclosure, interface electronics, an IMU (inertial measurement unit), magnifying optics, etc.

The illustrated memory 1330 stores a cascaded display program 1331, which may be an integral part of a driver program for the display assembly 1360. The memory 1330 may also store original graphics data 1334 and the factorized graphics data 1335. The cascaded display program 1331 includes a temporal factorization component 1332 to perform temporal factorization computation and a spatial factorization component 1333 to perform spatial factorization computation. Provided with user configurations and original graphics data 1334, the cascaded display program 1331 derives the factorized graphics data 1335 for display on each display layer 1361, 1362 and 1363, as described in greater detail herein.

A cascaded display device according to the present disclosure can be implemented as an LCD used in, for example, a head mounted display (HMD) application. The display device may include a stack of LCD panels, interface boards, a lens attachment (for HMD use), etc. For instance, each panel may be operated at a native resolution of 1280×800 pixels and with a 60 Hz refresh rate. The present disclosure is not limited, however, by the purposes or application utilizing cascaded display. The present disclosure is not limited by the type of display panels or configuration or arrangement of the multiple layers in cascaded display.

In some embodiments, a cascaded display device includes LCD panel(s) and organic light emitting diode (OLED) panel(s), electroluminescent display panel(s) or any other suitable type of display layer(s), or a combination thereof.

Multiple Display Units

Figure 14:
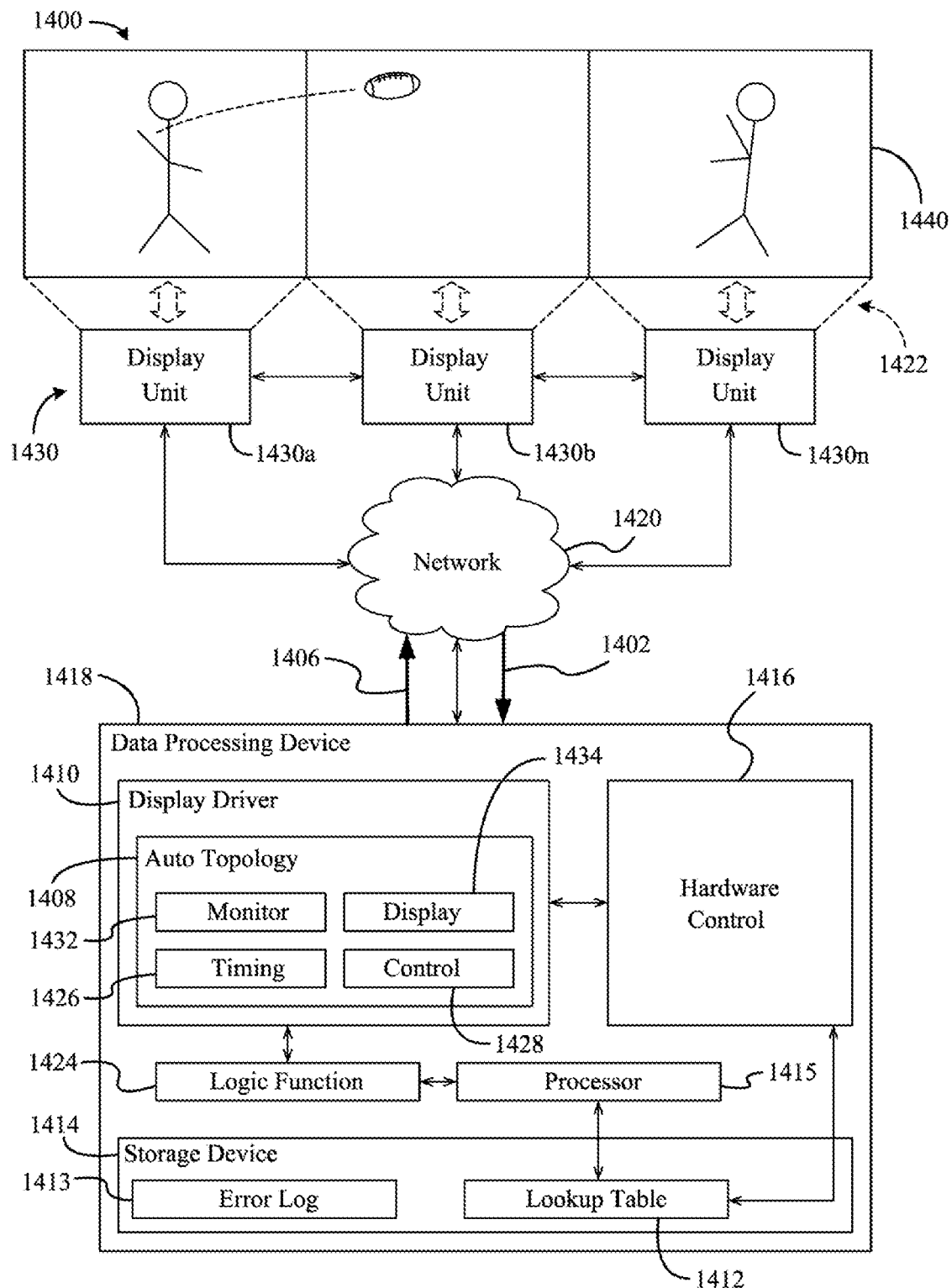
FIG. 14 is a block diagram of an example of a display architecture that includes multiple display units according to an embodiment.

FIG. 14 is a schematic view of a graphics display system 1400, configured to automatically apply a logic function 1424 to hardware profile data 1402 to create a set of automatic topology settings 1406 when a match of the hardware profile data 1402 with a set of settings in a hardware profile lookup table 1412 is not found, according to one embodiment. A data processing device 1418 is illustrated as communicatively coupled to a set of display units 1430 (1430a-1430n) through a network 1420. A presentation 1440 as an output of the display units 1430 may work together in concert to provide coordinated content in a cohesive and structured topological form. The data processing device 1418 may include a display driver 1410, a storage device 1414, a processor 1415, and a hardware control module 1416. The logic function 1424 may be performed and executed by the processor 1415 when communicated from the display driver 1410, according to one embodiment. The illustrated display driver 1410 includes an auto topology module 1408. The auto topology module 1408 automatically configures and structures the topologies of the display units 1430 to create the presentation 1440, according to one embodiment. The display driver 1410 may be a set of instructions that when executed through the processor 1415 of the data processing device 1418 enable the data processing device 1418 to communicate with video cards, display units 1430, and perform the operations of automatic topology generation as described in the various embodiments.

The data processing device 1418 may be a general and/or specific purpose computing system having the processor 1415, a random access memory, a set of controller cards including one or more video controller cards, and the storage device 1414 having an operating system and a set of applications. The display units 1430 may be video projection devices, HMDs and/or flat panel displays (e.g., liquid crystal, active matrix, plasma, etc.) that act in coordination with each other to produce the presentation 1440. The presentation 1440 may be an output of a media file stored in the storage device 1414 (e.g., non-volatile memory) and/or a random access memory (e.g., volatile memory) of the data processing device 1418 accessed from a remote source through the network 1420. For example, the media file may be a movie, an animation, an advertisement, and/or an interactive display. The topology of the display units 1430 may mean the number, shape, and/or scaling of each member of the display units 1430 together, and in concert such that the individual and/or complete whole of the picture is proportionally and physically made compatible with the original dimensions and scope of the media being played through the display units 1430 and projected as the presentation 140. For example, the topology may be geometric properties and/or spatial relations unaffected by the continuous change of shape or size of figures as rendered in the presentation 1440 through the display units 1430.

The auto topology module 1408 may include a number of submodules such as, for example, include a timing module 1426, a control module 1428, a signal monitor module 1432, and a signal display module 1434. The timing module 1426 of the data processing device 1418 may designate one display unit from the set of display units 1430 as a sample display unit, according to one embodiment. The timing module 1426 may also designate all other display units 1430 as additional display units. The timing module 1426 may automatically set a shaping factor to be compatible with the hardware profile data 1402, and automatically initiate the presentation 1440 via a sequence of graphics signals 1422.

The control module 1428 may modify the set of automatic topology settings 1406 that are stored in a storage device 1414 in association with the hardware profile data 1402. The signal monitor module 1432 may automatically monitor the sequence of graphics signals 1422. The signal monitor module 1432 may also trigger the storage device 1414 to associate the set of automatic topology settings 1406 with the hardware profile lookup table 1412. The signal monitor module 1432 may further be configured to automatically detect a change in the set of display units 1430 according to a set of change criteria, automatically generate a new topology profile corresponding to the change the set of display units 1430, and automatically apply the new topology profile to the set of display units 1430.

In addition, the signal monitor module 1432 may trigger the signal display module 1434. The signal display module 1434 may reapply the set of automatic topology settings 1406 if the sequence of graphics signals 1422 fails to meet a set of criteria. The data processing device 1418 may report an error if the hardware profile data 1402 does not support automatic topology display of the sequence of graphics signals 1422, and may also record the error in an error log 1413.

Cloud-Assisted Media Delivery

Figure 15:
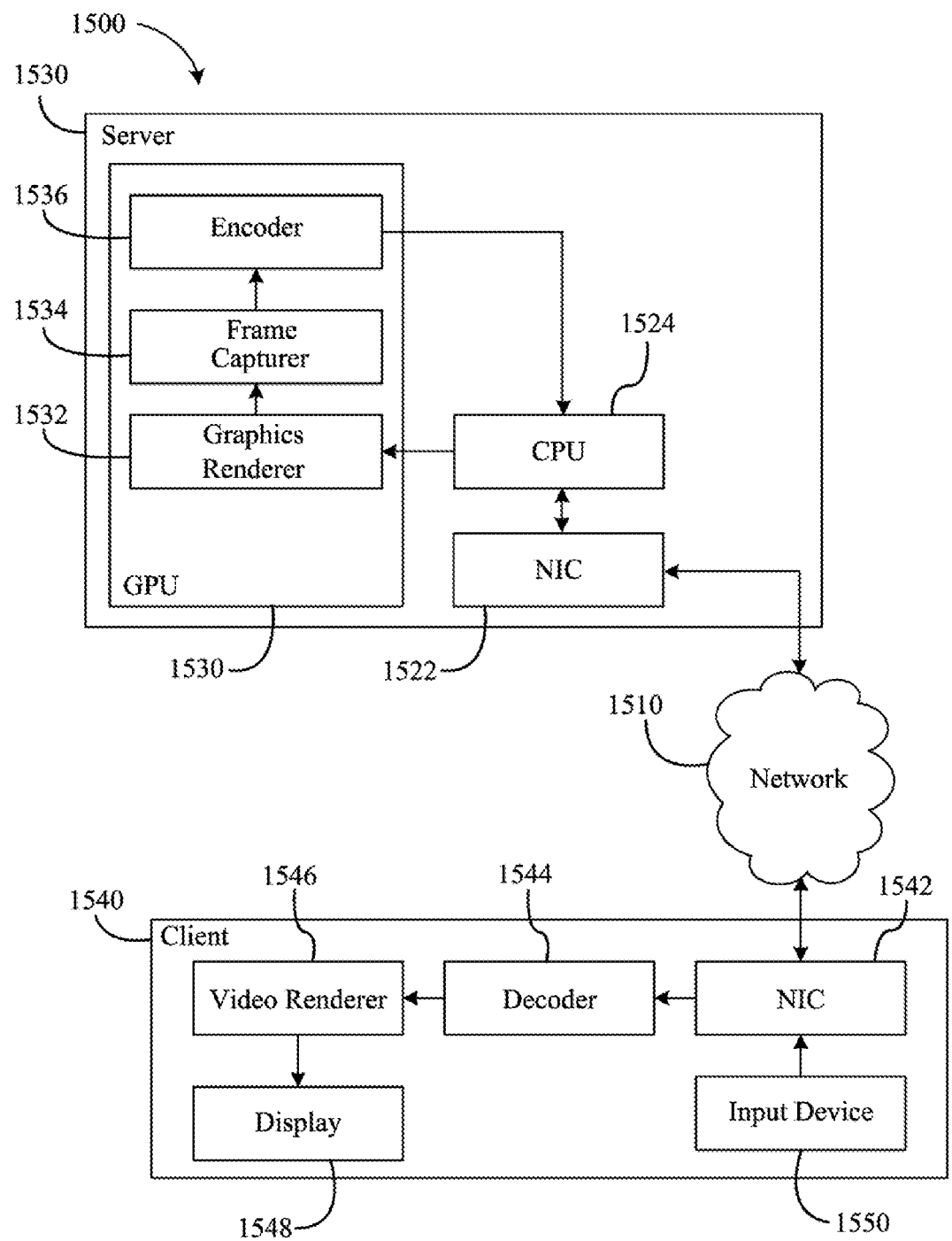
FIG. 15 is a block diagram of an example of a cloud-assisted media delivery architecture according to an embodiment.

FIG. 15 is a block diagram of a cloud gaming system 1500. The cloud gaming system 1500 includes a network 1510 through which a server 1520 and a client 1540 communicate. The server 1520 represents the central repository of gaming content, processing and rendering resources. The client 1540 is a consumer of that content and those resources. The server 1520 is freely scalable and has the capacity to provide that content and those services to many clients simultaneously by leveraging parallel and apportioned processing and rendering resources. The scalability of the server 1520 may be limited by the capacity of network 1510 in that above some threshold of number of clients, scarcity of network bandwidth requires that service to all clients may degrade on average.

The illustrated server 1520 includes a network interface card (NIC) 1522, a central processing unit (CPU) 1524 and a GPU 1530. Upon request from the client 1540, graphics content is recalled from memory via an application executing on the CPU 1524. The CPU 1524 may reserve itself for carrying out high-level operations, such as determining position, motion and collision of objects in a given scene. From these high-level operations, the illustrated CPU 1524 generates rendering commands that, when combined with the scene data, can be carried out by the GPU 1530. For example, rendering commands and data can define scene geometry, lighting, shading, texturing, motion, and camera parameters for a scene.

The illustrated GPU 1530 includes a graphics renderer 1532, a frame capturer 1534 and an encoder 1536. The graphics renderer 1532 may execute rendering procedures according to the rendering commands generated by CPU 1524, yielding a stream of frames of video for the scene. Those raw video frames may be captured by the frame capturer 1534 and encoded by encoder 1536. The encoder 1536 formats the raw video stream for transmission, possibly employing a video compression algorithm such as the H.264 standard arrived at by the International Telecommunication Union Telecommunication Standardization Sector (ITUT) or the MPEG4 Advanced Video Coding (AVC) standard from the International Organization for Standardization/International Electrotechnical Commission (ISO/IEC). Alternatively, the video stream may be encoded into WINDOWS MEDIA VIDEO. (WMV) format, VP8 format, H.265 or any other video encoding format.

The CPU 1524 prepares the encoded video stream for transmission and passes the encoded video stream along to NIC 1522. The NIC 1522 may include circuitry to communicate over the network 1510 via a networking protocol such as Ethernet, WiFi or Internet Protocol (IP). The NIC 1522 provides the physical layer and the basis for the software layer of the network interface in the server 1520.

The client 1540 receives the transmitted video stream for display. The client 1540 can be a variety of personal computing devices, including, for example, a desktop or laptop personal computer, a HMD, a tablet, a smart phone or a television. The illustrated client 1540 includes a NIC 1542, a decoder 1544, a video renderer 1546, a display 1548 and an input device 1550. The NIC 1542, similar to NIC 1522, may include circuitry to communicate over the network 1510 and provides the physical layer and the basis for the software layer of the network interface in the client 1540. The transmitted video stream is received by the client 1540 through the NIC 1542.

The video stream is then decoded by the decoder 1544. The decoder 1544 may match the encoder 1536, in that each employs the same formatting or compression scheme. For instance, if the encoder 1536 employs the ITUT H.264 standard, the decoder 1544 may also employ the ITUT H.264 standard. Decoding may be carried out by either a client CPU or a client GPU (not shown), depending on the physical client device. Once decoded, all that remains in the video stream are the raw rendered frames. The rendered frames may be processed by the video renderer 1546. The rendered video may then be presented on the display 1548.

An aspect of cloud gaming that is distinct from basic media streaming is that gaming may involve real-time interactive streaming. Not only are graphics rendered, captured and encoded on the server 1520 and routed over the network 1510 to the client 1540 for decoding and display, but user inputs to the client 1540 may also be relayed over the network 1510 back to the server 1520 and processed within the graphics application executing on the CPU 1524.

This real-time interactive component of cloud gaming may pose challenges with regard to latency.

Additional System Overview Example

Figure 16:
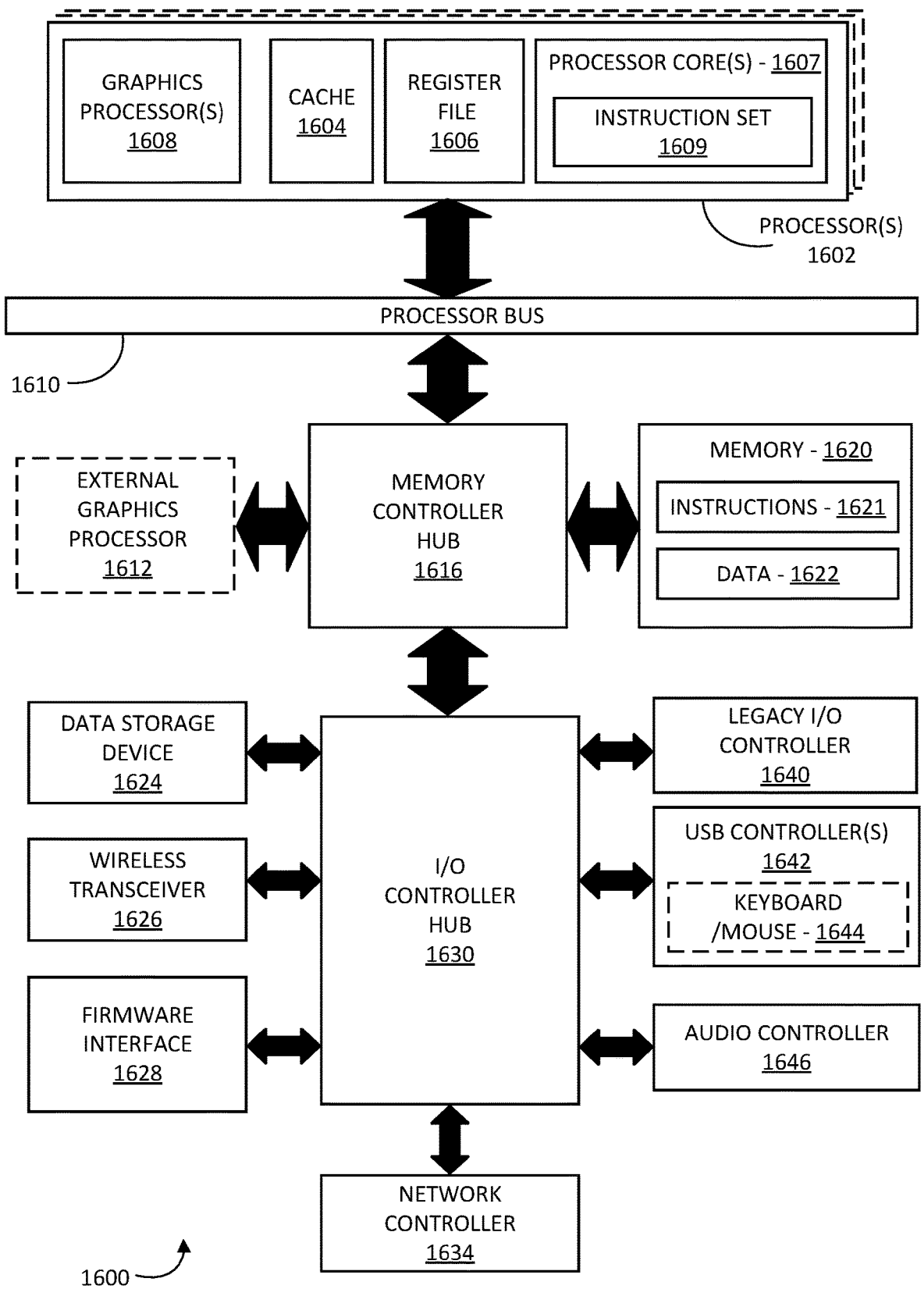
FIGS. 16-18 are block diagrams of an example of an overview of a data processing system according to an embodiment.

FIG. 16 is a block diagram of a processing system 1600, according to an embodiment. In various embodiments the system 1600 includes one or more processors 1602 and one or more graphics processors 1608, and may be a single processor desktop system, a multiprocessor workstation system, or a server system having a large number of processors 1602 or processor cores 1607. In on embodiment, the system 1600 is a processing platform incorporated within a system-on-a-chip (SoC) integrated circuit for use in mobile, handheld, or embedded devices.

An embodiment of system 1600 can include, or be incorporated within a server-based gaming platform, a game console, including a game and media console, a mobile gaming console, a handheld game console, or an online game console. In some embodiments system 1600 is a mobile phone, smart phone, tablet computing device or mobile Internet device. Data processing system 1600 can also include, couple with, or be integrated within a wearable device, such as a smart watch wearable device, smart eyewear device, augmented reality device, or virtual reality device. In some embodiments, data processing system 1600 is a television or set top box device having one or more processors 1602 and a graphical interface generated by one or more graphics processors 1608.

In some embodiments, the one or more processors 1602 each include one or more processor cores 1607 to process instructions which, when executed, perform operations for system and user software. In some embodiments, each of the one or more processor cores 1607 is configured to process a specific instruction set 1609. In some embodiments, instruction set 1609 may facilitate Complex Instruction Set Computing (CISC), Reduced Instruction Set Computing (RISC), or computing via a Very Long Instruction Word (VLIW). Multiple processor cores 1607 may each process a different instruction set 1609, which may include instructions to facilitate the emulation of other instruction sets. Processor core 1607 may also include other processing devices, such a Digital Signal Processor (DSP).

In some embodiments, the processor 1602 includes cache memory 1604. Depending on the architecture, the processor 1602 can have a single internal cache or multiple levels of internal cache. In some embodiments, the cache memory is shared among various components of the processor 1602. In some embodiments, the processor 1602 also uses an external cache (e.g., a Level-3 (L3) cache or Last Level Cache (LLC)) (not shown), which may be shared among processor cores 1607 using known cache coherency techniques. A register file 1606 is additionally included in processor 1602 which may include different types of registers for storing different types of data (e.g., integer registers, floating point registers, status registers, and an instruction pointer register). Some registers may be general-purpose registers, while other registers may be specific to the design of the processor 1602.

In some embodiments, processor 1602 is coupled to a processor bus 1610 to transmit communication signals such as address, data, or control signals between processor 1602 and other components in system 1600. In one embodiment the system 1600 uses an exemplary 'hub' system architecture, including a memory controller hub 1616 and an Input Output (I/O) controller hub 1630. A memory controller hub 1616 facilitates communication between a memory device and other components of system 1600, while an I/O Controller Hub (ICH) 1630 provides connections to I/O devices via a local I/O bus. In one embodiment, the logic of the memory controller hub 1616 is integrated within the processor.

Memory device 1620 can be a dynamic random access memory (DRAM) device, a static random access memory (SRAM) device, flash memory device, phase-change memory device, or some other memory device having suitable performance to serve as process memory. In one embodiment the memory device 1620 can operate as system memory for the system 1600, to store data 1622 and instructions 1621 for use when the one or more processors 1602 executes an application or process. Memory controller hub 1616 also couples with an optional external graphics processor 1612, which may communicate with the one or more graphics processors 1608 in processors 1602 to perform graphics and media operations.

In some embodiments, ICH 1630 enables peripherals to connect to memory device 1620 and processor 1602 via a high-speed I/O bus. The I/O peripherals include, but are not limited to, an audio controller 1646, a firmware interface 1628, a wireless transceiver 1626 (e.g., Wi-Fi, Bluetooth), a data storage device 1624 (e.g., hard disk drive, flash memory, etc.), and a legacy I/O controller 1640 for coupling legacy (e.g., Personal System 2 (PS/2)) devices to the system. One or more Universal Serial Bus (USB) controllers 1642 connect input devices, such as keyboard and mouse 1644 combinations. A network controller 1634 may also couple to ICH 1630. In some embodiments, a high-performance network controller (not shown) couples to processor bus 1610. It will be appreciated that the system 1600 shown is exemplary and not limiting, as other types of data processing systems that are differently configured may also be used. For example, the I/O controller hub 1630 may be integrated within the one or more processor 1602, or the memory controller hub 1616 and I/O controller hub 1630 may be integrated into a discreet external graphics processor, such as the external graphics processor 1612.

Figure 17:
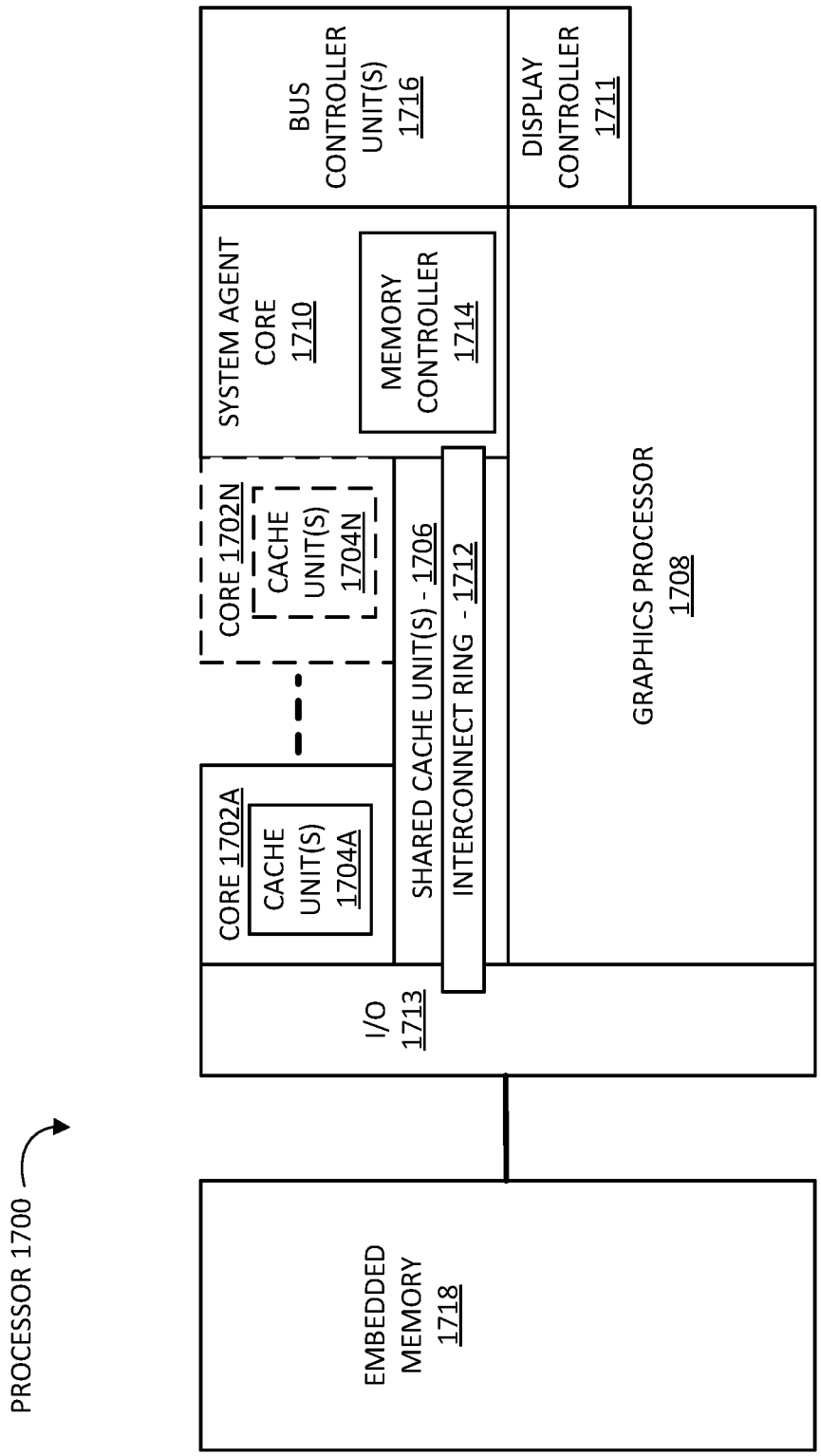

FIG. 17 is a block diagram of an embodiment of a processor 1700 having one or more processor cores 1702A-1702N, an integrated memory controller 1714, and an integrated graphics processor 1708. Those elements of FIG. 17 having the same reference numbers (or names) as the elements of any other figure herein can operate or function in any manner similar to that described elsewhere herein, but are not limited to such. Processor 1700 can include additional cores up to and including additional core 1702N represented by the dashed lined boxes. Each of processor cores 1702A-1702N includes one or more internal cache units 1704A-1704N. In some embodiments each processor core also has access to one or more shared cached units 1706.

The internal cache units 1704A-1704N and shared cache units 1706 represent a cache memory hierarchy within the processor 1700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1706 and 1704A-1704N.

In some embodiments, processor 1700 may also include a set of one or more bus controller units 1716 and a system agent core 1710. The one or more bus controller units 1716 manage a set of peripheral buses, such as one or more Peripheral Component Interconnect buses (e.g., PCI, PCI Express). System agent core 1710 provides management functionality for the various processor components. In some embodiments, system agent core 1710 includes one or more integrated memory controllers 1714 to manage access to various external memory devices (not shown).

In some embodiments, one or more of the processor cores 1702A-1702N include support for simultaneous multi-threading. In such embodiment, the system agent core 1710 includes components for coordinating and operating cores 1702A-1702N during multi-threaded processing. System agent core 1710 may additionally include a power control unit (PCU), which includes logic and components to regulate the power state of processor cores 1702A-1702N and graphics processor 1708.

In some embodiments, processor 1700 additionally includes graphics processor 1708 to execute graphics processing operations. In some embodiments, the graphics processor 1708 couples with the set of shared cache units 1706, and the system agent core 1710, including the one or more integrated memory controllers 1714. In some embodiments, a display controller 1711 is coupled with the graphics processor 1708 to drive graphics processor output to one or more coupled displays. In some embodiments, display controller 1711 may be a separate module coupled with the graphics processor via at least one interconnect, or may be integrated within the graphics processor 1708 or system agent core 1710.

In some embodiments, a ring based interconnect unit 1712 is used to couple the internal components of the processor 1700. However, an alternative interconnect unit may be used, such as a point-to-point interconnect, a switched interconnect, or other techniques, including techniques well known in the art. In some embodiments, graphics processor 1708 couples with the ring interconnect 1712 via an I/O link 1713.

The exemplary I/O link 1713 represents at least one of multiple varieties of I/O interconnects, including an on package I/O interconnect which facilitates communication between various processor components and a high-performance embedded memory module 1718, such as an eDRAM module. In some embodiments, each of the processor cores 1702-1702N and graphics processor 1708 use embedded memory modules 1718 as a shared Last Level Cache.

In some embodiments, processor cores 1702A-1702N are homogenous cores executing the same instruction set architecture. In another embodiment, processor cores 1702A-1702N are heterogeneous in terms of instruction set architecture (ISA), where one or more of processor cores 1702A-N execute a first instruction set, while at least one of the other cores executes a subset of the first instruction set or a different instruction set. In one embodiment processor cores 1702A-1702N are heterogeneous in terms of microarchitecture, where one or more cores having a relatively higher power consumption couple with one or more power cores having a lower power consumption. Additionally, processor 1700 can be implemented on one or more chips or as an SoC integrated circuit having the illustrated components, in addition to other components.

Figure 18:
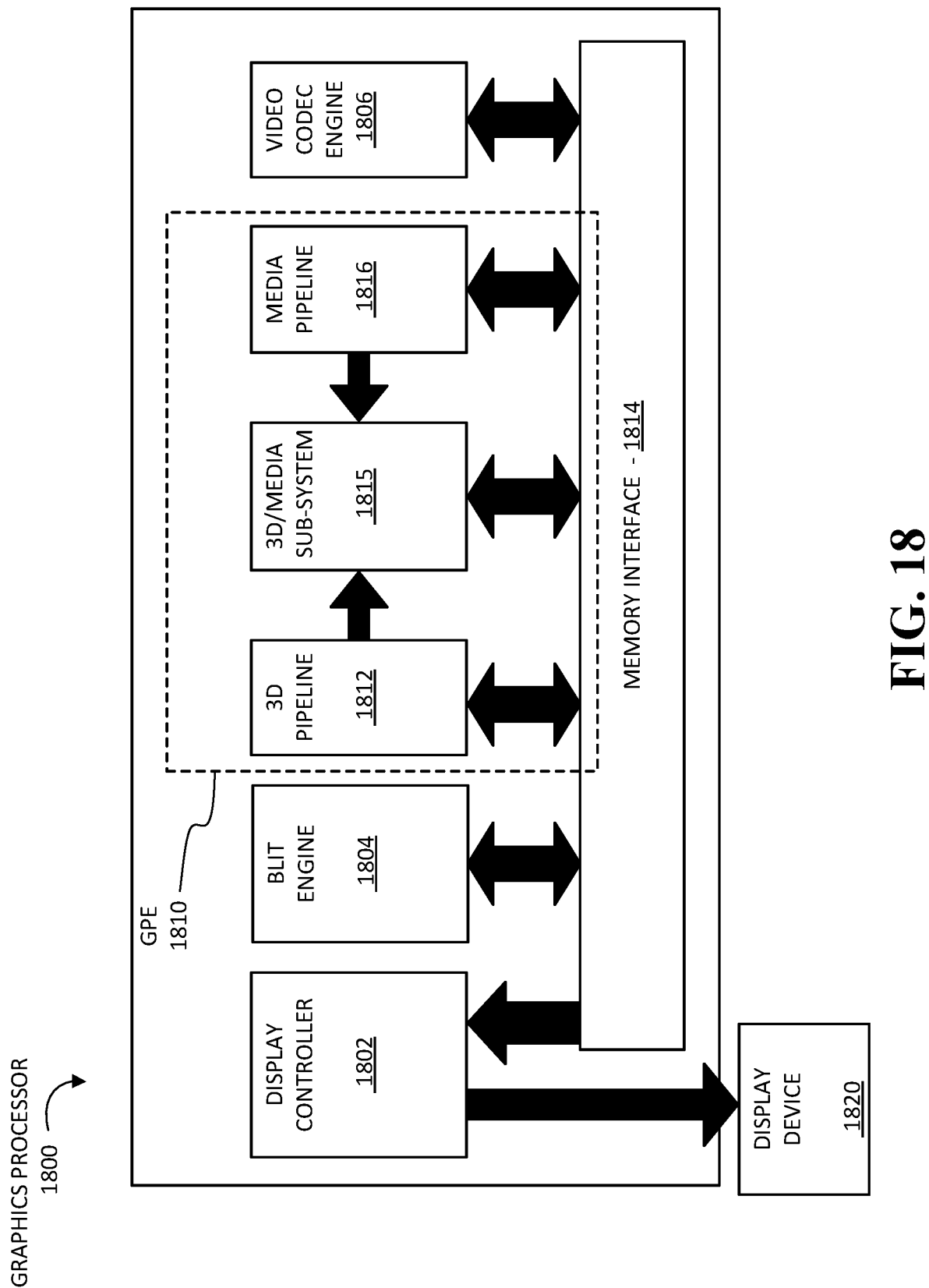

FIG. 18 is a block diagram of a graphics processor 1800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1800 includes a memory interface 1814 to access memory. Memory interface 1814 can be an interface to local memory, one or more internal caches, one or more shared external caches, and/or to system memory.

In some embodiments, graphics processor 1800 also includes a display controller 1802 to drive display output data to a display device 1820. Display controller 1802 includes hardware for one or more overlay planes for the display and composition of multiple layers of video or user interface elements. In some embodiments, graphics processor 1800 includes a video codec engine 1806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1800 includes a block image transfer (BLIT) engine 1804 to perform two-dimensional (2D) rasterizer operations including, for example, bit-boundary block transfers. However, in one embodiment, 2D graphics operations are performed using one or more components of graphics processing engine (GPE) 1810. In some embodiments, graphics processing engine 1810 is a compute engine for performing graphics operations, including three-dimensional (3D) graphics operations and media operations.

In some embodiments, GPE 1810 includes a 3D pipeline 1812 for performing 3D operations, such as rendering three-dimensional images and scenes using processing functions that act upon 3D primitive shapes (e.g., rectangle, triangle, etc.). The 3D pipeline 1812 includes programmable and fixed function elements that perform various tasks within the element and/or spawn execution threads to a 3D/Media sub-system 1815. While 3D pipeline 1812 can be used to perform media operations, an embodiment of GPE 1810 also includes a media pipeline 1816 that is specifically used to perform media operations, such as video post-processing and image enhancement.

In some embodiments, media pipeline 1816 includes fixed function or programmable logic units to perform one or more specialized media operations, such as video decode acceleration, video de-interlacing, and video encode acceleration in place of, or on behalf of video codec engine 1806. In some embodiments, media pipeline 1816 additionally includes a thread spawning unit to spawn threads for execution on 3D/Media sub-system 1815. The spawned threads perform computations for the media operations on one or more graphics execution units included in 3D/Media sub-system 1815.

In some embodiments, 3D/Media subsystem 1815 includes logic for executing threads spawned by 3D pipeline 1812 and media pipeline 1816. In one embodiment, the pipelines send thread execution requests to 3D/Media subsystem 1815, which includes thread dispatch logic for arbitrating and dispatching the various requests to available thread execution resources. The execution resources include an array of graphics execution units to process the 3D and media threads. In some embodiments, 3D/Media subsystem 1815 includes one or more internal caches for thread instructions and data. In some embodiments, the subsystem also includes shared memory, including registers and addressable memory, to share data between threads and to store output data.

3D/Media Processing

Figure 19:
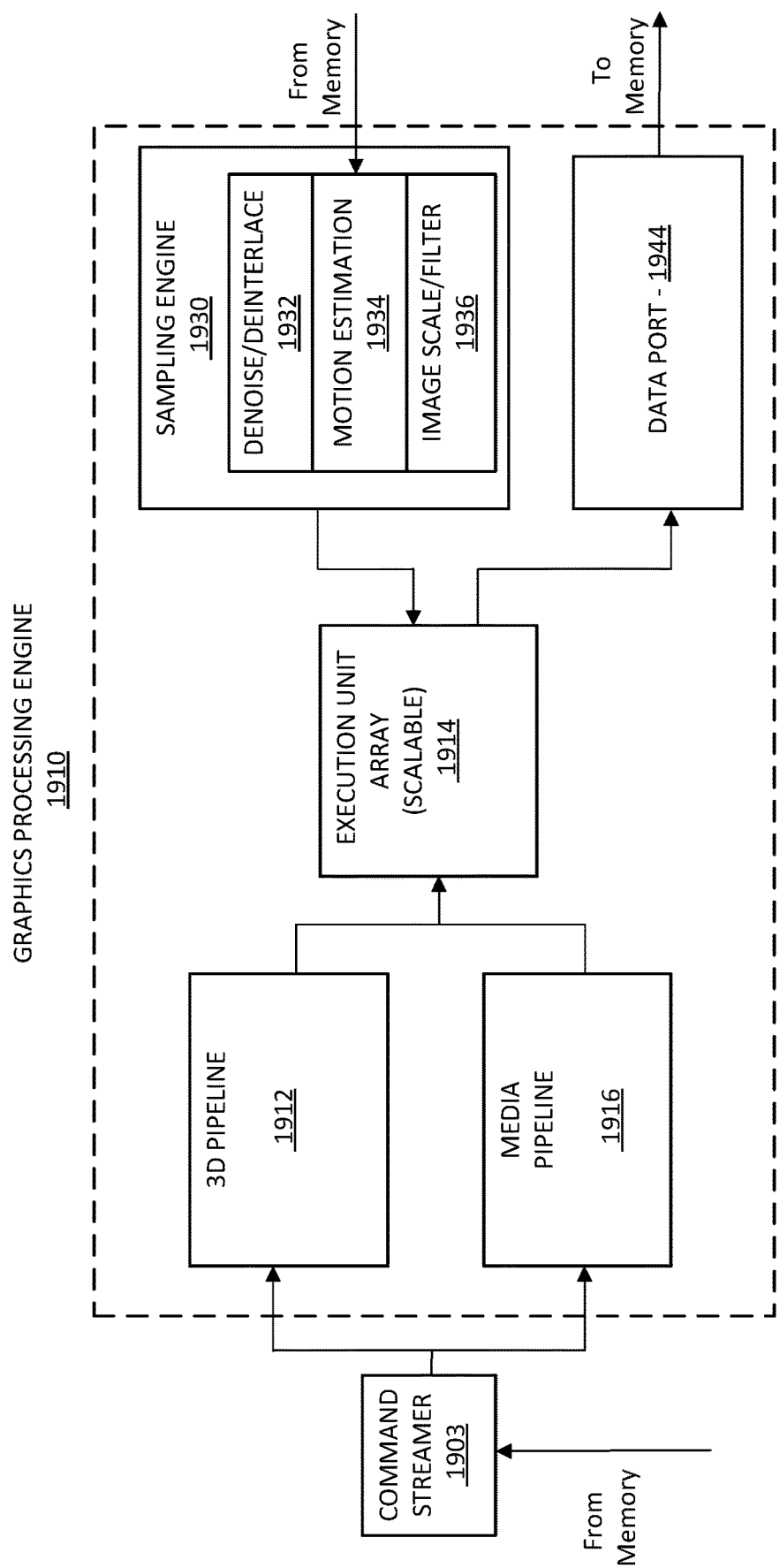
FIG. 19 is a block diagram of an example of a graphics processing engine according to an embodiment.

FIG. 19 is a block diagram of a graphics processing engine 1910 of a graphics processor in accordance with some embodiments. In one embodiment, the GPE 1910 is a version of the GPE 1810 shown in FIG. 18. Elements of FIG. 19 having the same reference numbers (or names) as the elements of any other figure herein can operate or function in any manner similar to that described elsewhere herein, but are not limited to such.

In some embodiments, GPE 1910 couples with a command streamer 1903, which provides a command stream to the GPE 3D and media pipelines 1912, 1916. In some embodiments, command streamer 1903 is coupled to memory, which can be system memory, or one or more of internal cache memory and shared cache memory. In some embodiments, command streamer 1903 receives commands from the memory and sends the commands to 3D pipeline 1912 and/or media pipeline 1916. The commands are directives fetched from a ring buffer, which stores commands for the 3D and media pipelines 1912, 1916. In one embodiment, the ring buffer can additionally include batch command buffers storing batches of multiple commands. The 3D and media pipelines 1912, 1916 process the commands by performing operations via logic within the respective pipelines or by dispatching one or more execution threads to an execution unit array 1914. In some embodiments, execution unit array 1914 is scalable, such that the array includes a variable number of execution units based on the target power and performance level of GPE 1910.

In some embodiments, a sampling engine 1930 couples with memory (e.g., cache memory or system memory) and execution unit array 1914. In some embodiments, sampling engine 1930 provides a memory access mechanism for execution unit array 1914 that allows execution array 1914 to read graphics and media data from memory. In some embodiments, sampling engine 1930 includes logic to perform specialized image sampling operations for media.

In some embodiments, the specialized media sampling logic in sampling engine 1930 includes a de-noise/de-interlace module 1932, a motion estimation module 1934, and an image scaling and filtering module 1936. In some embodiments, de-noise/de-interlace module 1932 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 1932 includes dedicated motion detection logic (e.g., within the motion estimation engine 1934).

In some embodiments, motion estimation engine 1934 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 1934 to perform operations on video at the macro-block level that may otherwise be too computationally intensive to perform with a general-purpose processor. In some embodiments, motion estimation engine 1934 is generally available to graphics processor components to assist with video decode and processing functions that are sensitive or adaptive to the direction or magnitude of the motion within video data.

In some embodiments, image scaling and filtering module 1936 performs image-processing operations to enhance the visual quality of generated images and video. In some embodiments, scaling and filtering module 1936 processes image and video data during the sampling operation before providing the data to execution unit array 1914.

In some embodiments, the GPE 1910 includes a data port 1944, which provides an additional mechanism for graphics subsystems to access memory. In some embodiments, data port 1944 facilitates memory access for operations including render target writes, constant buffer reads, scratch memory space reads/writes, and media surface accesses. In some embodiments, data port 1944 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 1914 communicate with the data port by exchanging messages via a data distribution interconnect that couples each of the sub-systems of GPE 1910.

Execution Units

Figure 20:
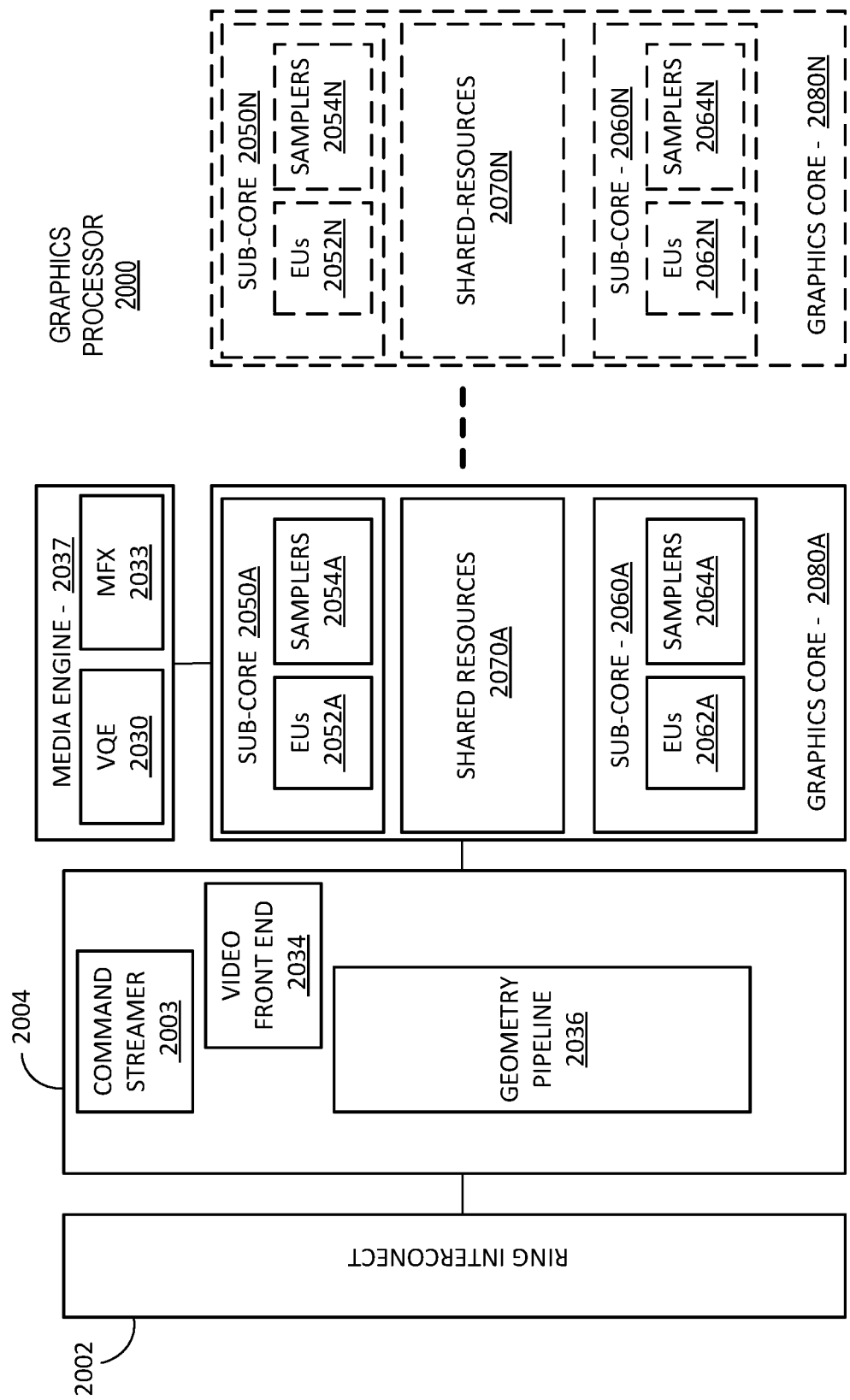
FIGS. 20-22 are block diagrams of examples of execution units according to an embodiment.

FIG. 20 is a block diagram of another embodiment of a graphics processor 2000. Elements of FIG. 20 having the same reference numbers (or names) as the elements of any other figure herein can operate or function in any manner similar to that described elsewhere herein, but are not limited to such.

In some embodiments, graphics processor 2000 includes a ring interconnect 2002, a pipeline front-end 2004, a media engine 2037, and graphics cores 2080A-2080N. In some embodiments, ring interconnect 2002 couples the graphics processor to other processing units, including other graphics processors or one or more general-purpose processor cores. In some embodiments, the graphics processor is one of many processors integrated within a multi-core processing system.

In some embodiments, graphics processor 2000 receives batches of commands via ring interconnect 2002. The incoming commands are interpreted by a command streamer 2003 in the pipeline front-end 2004. In some embodiments, graphics processor 2000 includes scalable execution logic to perform 3D geometry processing and media processing via the graphics core(s) 2080A-2080N. For 3D geometry processing commands, command streamer 2003 supplies commands to geometry pipeline 2036. For at least some media processing commands, command streamer 2003 supplies the commands to a video front end 2034, which couples with a media engine 2037. In some embodiments, media engine 2037 includes a Video Quality Engine (VQE) 2030 for video and image post-processing and a multi-format encode/decode (MFX) 2033 engine to provide hardware-accelerated media data encode and decode. In some embodiments, geometry pipeline 2036 and media engine 2037 each generate execution threads for the thread execution resources provided by at least one graphics core 2080A.

In some embodiments, graphics processor 2000 includes scalable thread execution resources featuring modular cores 2080A-2080N (sometimes referred to as core slices), each having multiple sub-cores 2050A-2050N, 2060A-2060N (sometimes referred to as core sub-slices). In some embodiments, graphics processor 2000 can have any number of graphics cores 2080A through 2080N. In some embodiments, graphics processor 2000 includes a graphics core 2080A having at least a first sub-core 2050A and a second core sub-core 2060A. In other embodiments, the graphics processor is a low power processor with a single sub-core (e.g., 2050A). In some embodiments, graphics processor 2000 includes multiple graphics cores 2080A-2080N, each including a set of first sub-cores 2050A-2050N and a set of second sub-cores 2060A-2060N. Each sub-core in the set of first sub-cores 2050A-2050N includes at least a first set of execution units 2052A-2052N and media/texture samplers 2054A-2054N. Each sub-core in the set of second sub-cores 2060A-2060N includes at least a second set of execution units 2062A-2062N and samplers 2064A-2064N. In some embodiments, each sub-core 2050A-2050N, 2060A-2060N shares a set of shared resources 2070A-2070N. In some embodiments, the shared resources include shared cache memory and pixel operation logic. Other shared resources may also be included in the various embodiments of the graphics processor.

Figure 21:
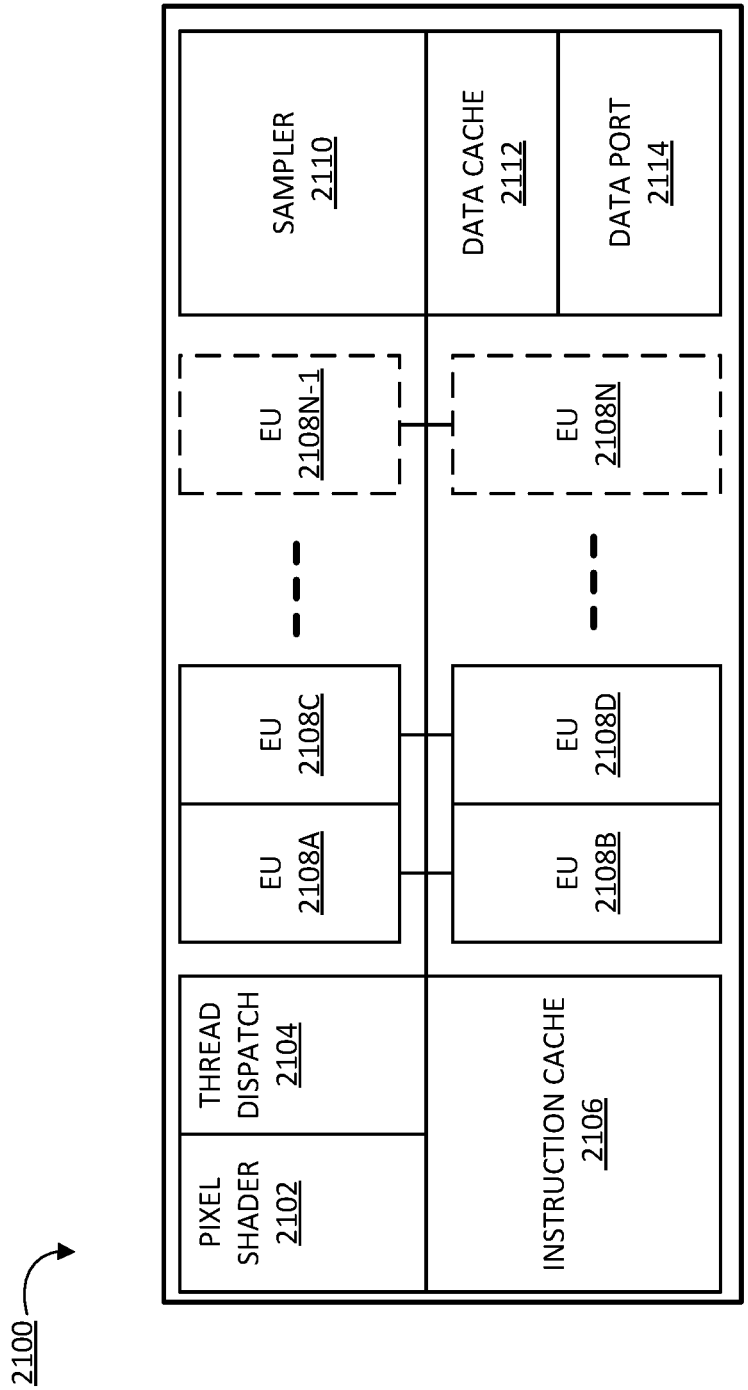

FIG. 21 illustrates thread execution logic 2100 including an array of processing elements employed in some embodiments of a GPE. Elements of FIG. 21 having the same reference numbers (or names) as the elements of any other figure herein can operate or function in any manner similar to that described elsewhere herein, but are not limited to such.

In some embodiments, thread execution logic 2100 includes a pixel shader 2102, a thread dispatcher 2104, instruction cache 2106, a scalable execution unit array including a plurality of execution units 2108A-2108N, a sampler 2110, a data cache 2112, and a data port 2114. In one embodiment the included components are interconnected via an interconnect fabric that links to each of the components. In some embodiments, thread execution logic 2100 includes one or more connections to memory, such as system memory or cache memory, through one or more of instruction cache 2106, data port 2114, sampler 2110, and execution unit array 2108A-2108N. In some embodiments, each execution unit (e.g. 2108A) is an individual vector processor capable of executing multiple simultaneous threads and processing multiple data elements in parallel for each thread. In some embodiments, execution unit array 2108A-2108N includes any number individual execution units.

In some embodiments, execution unit array 2108A-2108N is primarily used to execute "shader" programs. In some embodiments, the execution units in array 2108A-2108N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 2108A-2108N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2108A-2108N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2106) are included in the thread execution logic 2100 to cache thread instructions for the execution units. In some embodiments, one or more data caches (e.g., 2112) are included to cache thread data during thread execution. In some embodiments, sampler 2110 is included to provide texture sampling for 3D operations and media sampling for media operations. In some embodiments, sampler 2110 includes specialized texture or media sampling functionality to process texture or media data during the sampling process before providing the sampled data to an execution unit.

During execution, the graphics and media pipelines send thread initiation requests to thread execution logic 2100 via thread spawning and dispatch logic. In some embodiments, thread execution logic 2100 includes a local thread dispatcher 2104 that arbitrates thread initiation requests from the graphics and media pipelines and instantiates the requested threads on one or more execution units 2108A-2108N. For example, the geometry pipeline (e.g., 2036 of FIG. 20) dispatches vertex processing, tessellation, or geometry processing threads to thread execution logic 2100 (FIG. 21). In some embodiments, thread dispatcher 2104 can also process runtime thread spawning requests from the executing shader programs.

Once a group of geometric objects has been processed and rasterized into pixel data, pixel shader 2102 is invoked to further compute output information and cause results to be written to output surfaces (e.g., color buffers, depth buffers, stencil buffers, etc.). In some embodiments, pixel shader 2102 calculates the values of the various vertex attributes that are to be interpolated across the rasterized object. In some embodiments, pixel shader 2102 then executes an application programming interface (API)-supplied pixel shader program. To execute the pixel shader program, pixel shader 2102 dispatches threads to an execution unit (e.g., 2108A) via thread dispatcher 2104. In some embodiments, pixel shader 2102 uses texture sampling logic in sampler 2110 to access texture data in texture maps stored in memory. Arithmetic operations on the texture data and the input geometry data compute pixel color data for each geometric fragment, or discards one or more pixels from further processing.

In some embodiments, the data port 2114 provides a memory access mechanism for the thread execution logic 2100 output processed data to memory for processing on a graphics processor output pipeline. In some embodiments, the data port 2114 includes or couples to one or more cache memories (e.g., data cache 2112) to cache data for memory access via the data port.

Figure 22:
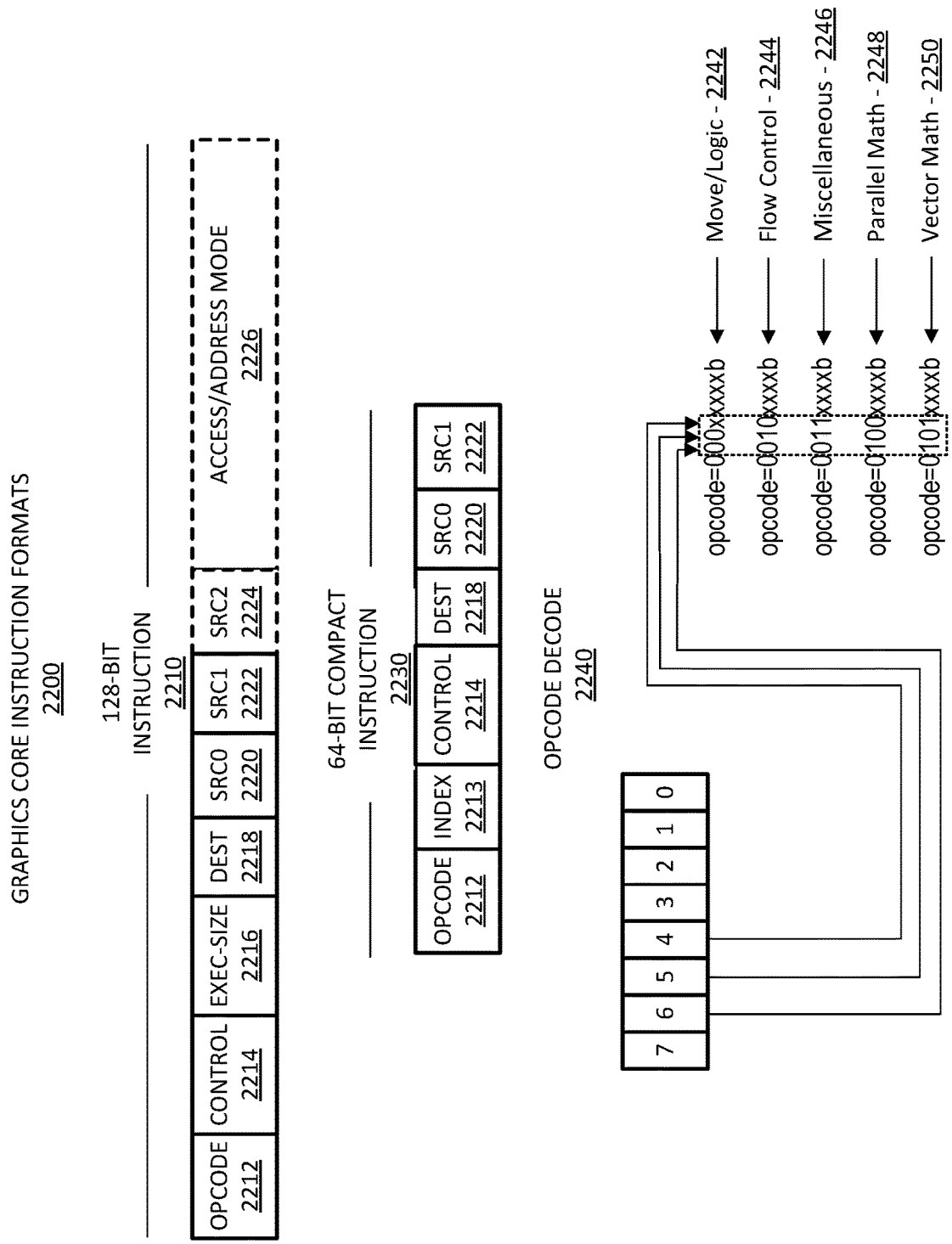

FIG. 22 is a block diagram illustrating a graphics processor instruction formats 2200 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2200 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 2210. A 64-bit compacted instruction format 2230 is available for some instructions based on the selected instruction, instruction options, and number of operands. The native 128-bit format 2210 provides access to all instruction options, while some options and operations are restricted in the 64-bit format 2230. The native instructions available in the 64-bit format 2230 vary by embodiment. In some embodiments, the instruction is compacted in part using a set of index values in an index field 2213. The execution unit hardware references a set of compaction tables based on the index values and uses the compaction table outputs to reconstruct a native instruction in the 128-bit format 2210.

For each format, instruction opcode 2212 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2214 enables control over certain execution options, such as channels selection (e.g., predication) and data channel order (e.g., swizzle). For 128-bit instructions 2210 an exec-size field 2216 limits the number of data channels that will be executed in parallel. In some embodiments, exec-size field 2216 is not available for use in the 64-bit compact instruction format 2230.

Some execution unit instructions have up to three operands including two source operands, src0 2220, src1 2222, and one destination 2218. In some embodiments, the execution units support dual destination instructions, where one of the destinations is implied. Data manipulation instructions can have a third source operand (e.g., SRC2 2224), where the instruction opcode 2212 determines the number of source operands. An instruction's last source operand can be an immediate (e.g., hard-coded) value passed with the instruction.

In some embodiments, the 128-bit instruction format 2210 includes an access/address mode information 2226 specifying, for example, whether direct register addressing mode or indirect register addressing mode is used. When direct register addressing mode is used, the register address of one or more operands is directly provided by bits in the instruction 2210.

In some embodiments, the 128-bit instruction format 2210 includes an access/address mode field 2226, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 2210 may use byte-aligned addressing for source and destination operands and when in a second mode, the instruction 2210 may use 16-byte-aligned addressing for all source and destination operands.

In one embodiment, the address mode portion of the access/address mode field 2226 determines whether the instruction is to use direct or indirect addressing. When direct register addressing mode is used bits in the instruction 2210 directly provide the register address of one or more operands. When indirect register addressing mode is used, the register address of one or more operands may be computed based on an address register value and an address immediate field in the instruction.

In some embodiments instructions are grouped based on opcode 2212 bit-fields to simplify Opcode decode 2240. For an 8-bit opcode, bits 4, 5, and 6 allow the execution unit to determine the type of opcode. The precise opcode grouping shown is merely an example. In some embodiments, a move and logic opcode group 2242 includes data movement and logic instructions (e.g., move (mov), compare (cmp)). In some embodiments, move and logic group 2242 shares the five most significant bits (MSB), where move (mov) instructions are in the form of 0000xxxxb and logic instructions are in the form of 0001xxxxb. A flow control instruction group 2244 (e.g., call, jump (jmp)) includes instructions in the form of 0010xxxxb (e.g., 0x20). A miscellaneous instruction group 2246 includes a mix of instructions, including synchronization instructions (e.g., wait, send) in the form of 0011xxxxb (e.g., 0x30). A parallel math instruction group 2248 includes component-wise arithmetic instructions (e.g., add, multiply (mul)) in the form of 0100xxxxb (e.g., 0x40). The parallel math group 2248 performs the arithmetic operations in parallel across data channels. The vector math group 2250 includes arithmetic instructions (e.g., dp4) in the form of 0101xxxxb (e.g., 0x50). The vector math group performs arithmetic such as dot product calculations on vector operands.

Graphics Pipeline

Figure 23:
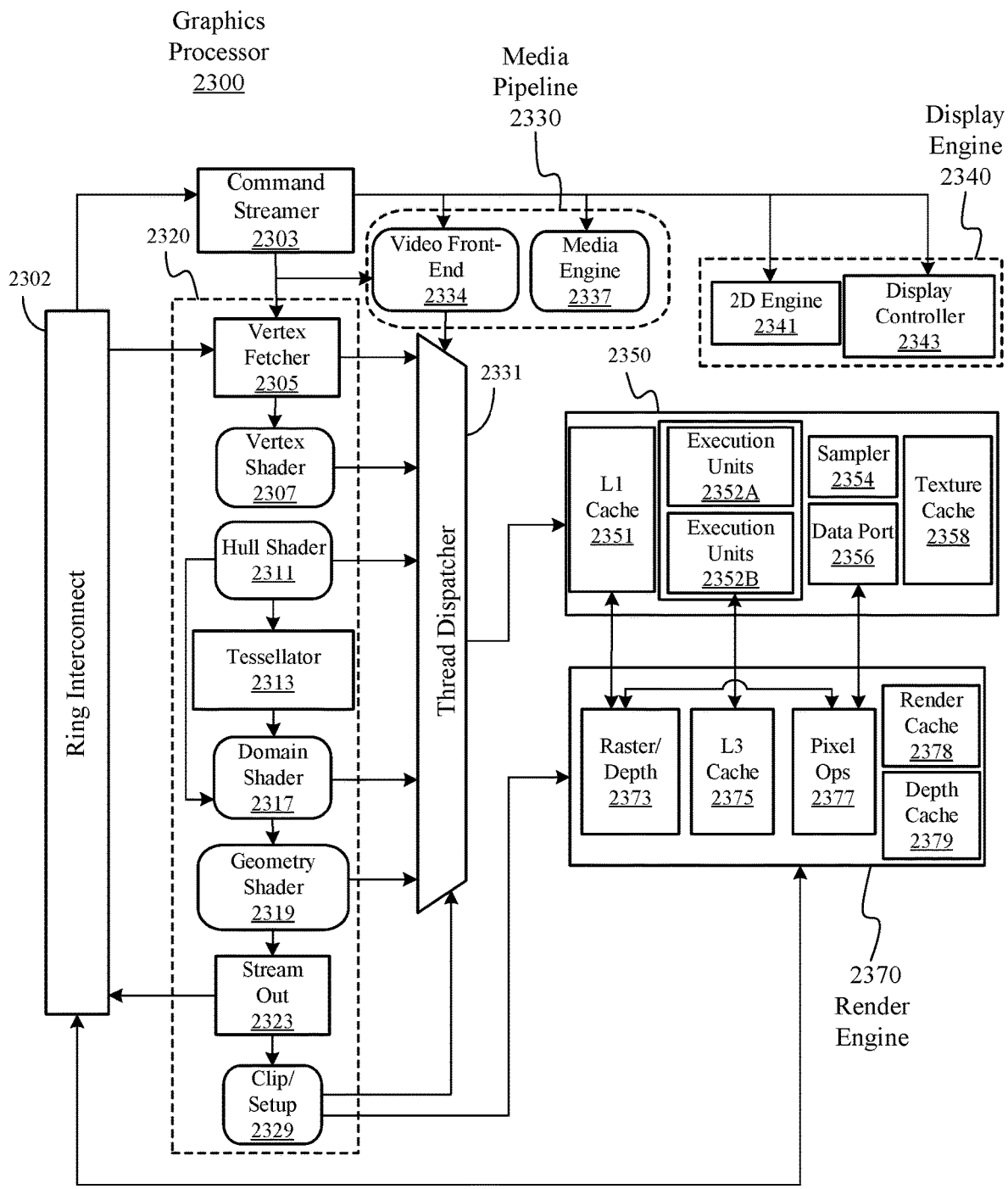
FIG. 23 is a block diagram of an example of a graphics pipeline according to an embodiment.

FIG. 23 is a block diagram of another embodiment of a graphics processor 2300. Elements of FIG. 23 having the same reference numbers (or names) as the elements of any other figure herein can operate or function in any manner similar to that described elsewhere herein, but are not limited to such.

In some embodiments, graphics processor 2300 includes a graphics pipeline 2320, a media pipeline 2330, a display engine 2340, thread execution logic 2350, and a render output pipeline 2370. In some embodiments, graphics processor 2300 is a graphics processor within a multi-core processing system that includes one or more general purpose processing cores. The graphics processor is controlled by register writes to one or more control registers (not shown) or via commands issued to graphics processor 2300 via a ring interconnect 2302. In some embodiments, ring interconnect 2302 couples graphics processor 2300 to other processing components, such as other graphics processors or general-purpose processors. Commands from ring interconnect 2302 are interpreted by a command streamer 2303, which supplies instructions to individual components of graphics pipeline 2320 or media pipeline 2330.

In some embodiments, command streamer 2303 directs the operation of a vertex fetcher 2305 that reads vertex data from memory and executes vertex-processing commands provided by command streamer 2303. In some embodiments, vertex fetcher 2305 provides vertex data to a vertex shader 2307, which performs coordinate space transformation and lighting operations to each vertex. In some embodiments, vertex fetcher 2305 and vertex shader 2307 execute vertex-processing instructions by dispatching execution threads to execution units 2352A, 2352B via a thread dispatcher 2331.

In some embodiments, execution units 2352A, 2352B are an array of vector processors having an instruction set for performing graphics and media operations. In some embodiments, execution units 2352A, 2352B have an attached L1 cache 2351 that is specific for each array or shared between the arrays. The cache can be configured as a data cache, an instruction cache, or a single cache that is partitioned to contain data and instructions in different partitions.

In some embodiments, graphics pipeline 2320 includes tessellation components to perform hardware-accelerated tessellation of 3D objects. In some embodiments, a programmable hull shader 2311 configures the tessellation operations. A programmable domain shader 2317 provides back-end evaluation of tessellation output. A tessellator 2313 operates at the direction of hull shader 2311 and contains special purpose logic to generate a set of detailed geometric objects based on a coarse geometric model that is provided as input to graphics pipeline 2320. In some embodiments, if tessellation is not used, tessellation components 2311, 2313, 2317 can be bypassed.

In some embodiments, complete geometric objects can be processed by a geometry shader 2319 via one or more threads dispatched to execution units 2352A, 2352B, or can proceed directly to the clipper 2329. In some embodiments, the geometry shader operates on entire geometric objects, rather than vertices or patches of vertices as in previous stages of the graphics pipeline. If the tessellation is disabled the geometry shader 2319 receives input from the vertex shader 2307. In some embodiments, geometry shader 2319 is programmable by a geometry shader program to perform geometry tessellation if the tessellation units are disabled.

Before rasterization, a clipper 2329 processes vertex data. The clipper 2329 may be a fixed function clipper or a programmable clipper having clipping and geometry shader functions. In some embodiments, a rasterizer 2373 (e.g., depth test component) in the render output pipeline 2370 dispatches pixel shaders to convert the geometric objects into their per pixel representations. In some embodiments, pixel shader logic is included in thread execution logic 2350. In some embodiments, an application can bypass the rasterizer 2373 and access un-rasterized vertex data via a stream out unit 2323.

The graphics processor 2300 has an interconnect bus, interconnect fabric, or some other interconnect mechanism that allows data and message passing amongst the major components of the processor. In some embodiments, execution units 2352A, 2352B and associated cache(s) 2351, texture and media sampler 2354, and texture/sampler cache 2358 interconnect via a data port 2356 to perform memory access and communicate with render output pipeline components of the processor. In some embodiments, sampler 2354, caches 2351, 2358 and execution units 2352A, 2352B each have separate memory access paths.

In some embodiments, render output pipeline 2370 contains a rasterizer 2373 that converts vertex-based objects into an associated pixel-based representation. In some embodiments, the rasterizer logic includes a windower/masker unit to perform fixed function triangle and line rasterization. An associated render cache 2378 and depth cache 2379 are also available in some embodiments. A pixel operations component 2377 performs pixel-based operations on the data, though in some instances, pixel operations associated with 2D operations (e.g. bit block image transfers with blending) are performed by the 2D engine 2341, or substituted at display time by the display controller 2343 using overlay display planes. In some embodiments, a shared L3 cache 2375 is available to all graphics components, allowing the sharing of data without the use of main system memory.

In some embodiments, graphics processor media pipeline 2330 includes a media engine 2337 and a video front end 2334. In some embodiments, video front end 2334 receives pipeline commands from the command streamer 2303. In some embodiments, media pipeline 2330 includes a separate command streamer. In some embodiments, video front-end 2334 processes media commands before sending the command to the media engine 2337. In some embodiments, media engine 2337 includes thread spawning functionality to spawn threads for dispatch to thread execution logic 2350 via thread dispatcher 2331.

In some embodiments, graphics processor 2300 includes a display engine 2340. In some embodiments, display engine 2340 is external to processor 2300 and couples with the graphics processor via the ring interconnect 2302, or some other interconnect bus or fabric. In some embodiments, display engine 2340 includes a 2D engine 2341 and a display controller 2343. In some embodiments, display engine 2340 contains special purpose logic capable of operating independently of the 3D pipeline. In some embodiments, display controller 2343 couples with a display device (not shown), which may be a system integrated display device, as in a laptop computer, or an external display device attached via a display device connector.

In some embodiments, graphics pipeline 2320 and media pipeline 2330 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 24A:
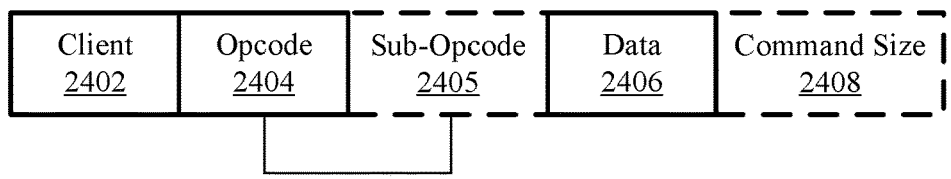
FIGS. 24A-24B are block diagrams of examples of graphics pipeline programming according to an embodiment.
Figure 24B:
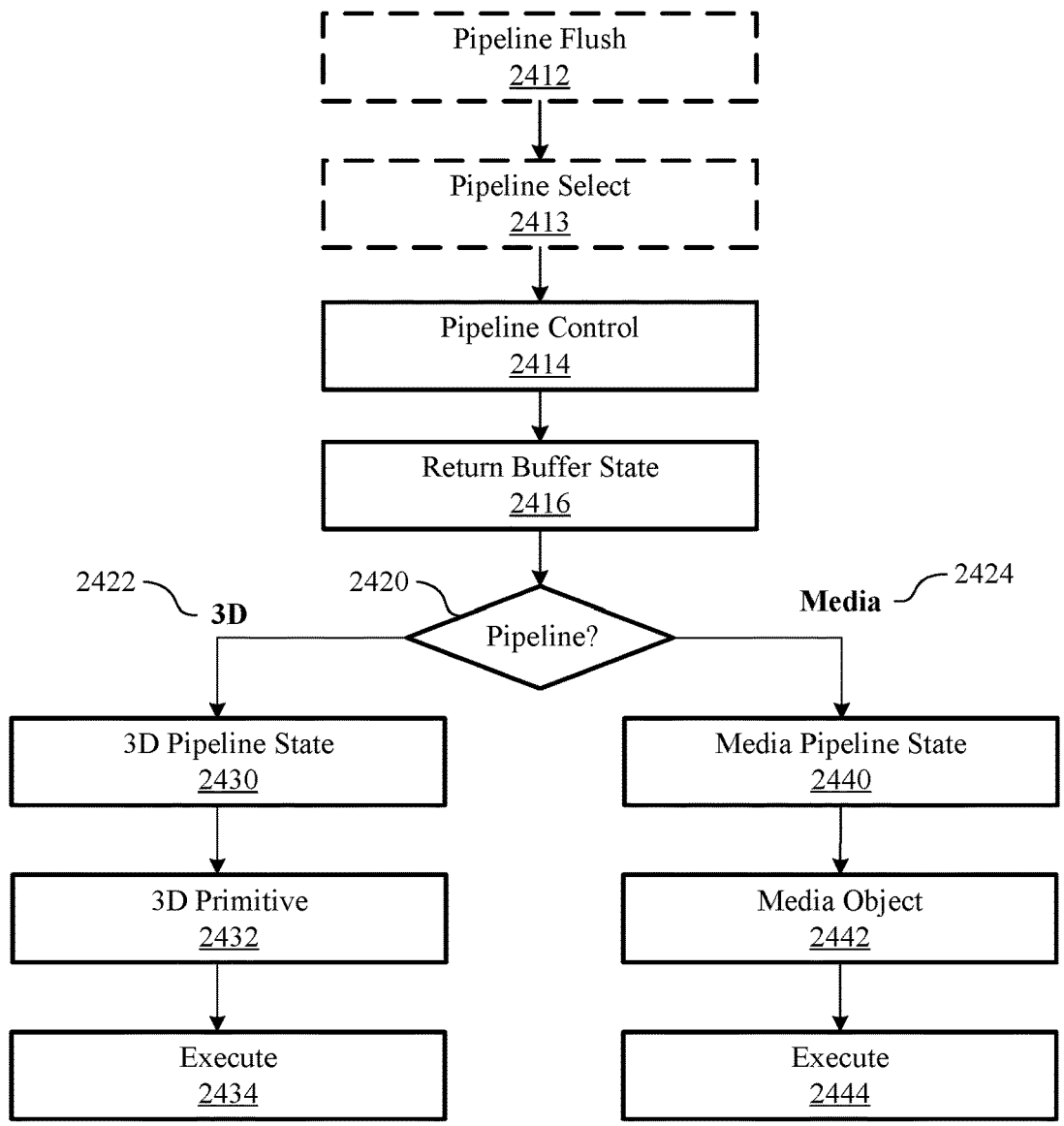

FIG. 24A is a block diagram illustrating a graphics processor command format 2400 according to some embodiments. FIG. 24B is a block diagram illustrating a graphics processor command sequence 2410 according to an embodiment. The solid lined boxes in FIG. 24A illustrate the components that are generally included in a graphics command while the dashed lines include components that are optional or that are only included in a sub-set of the graphics commands. The exemplary graphics processor command format 2400 of FIG. 24A includes data fields to identify a target client 2402 of the command, a command operation code (opcode) 2404, and the relevant data 2406 for the command. A sub-opcode 2405 and a command size 2408 are also included in some commands.

In some embodiments, client 2402 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2404 and, if present, sub-opcode 2405 to determine the operation to perform. The client unit performs the command using information in data field 2406. For some commands an explicit command size 2408 is expected to specify the size of the command. In some embodiments, the command parser automatically determines the size of at least some of the commands based on the command opcode. In some embodiments commands are aligned via multiples of a double word.

The flow diagram in FIG. 24B shows an exemplary graphics processor command sequence 2410. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2410 may begin with a pipeline flush command 2412 to cause any active graphics pipeline to complete the currently pending commands for the pipeline. In some embodiments, the 3D pipeline 2422 and the media pipeline 2424 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2412 can be used for pipeline synchronization or before placing the graphics processor into a low power state.

In some embodiments, a pipeline select command 2413 is used when a command sequence requires the graphics processor to explicitly switch between pipelines. In some embodiments, a pipeline select command 2413 is required only once within an execution context before issuing pipeline commands unless the context is to issue commands for both pipelines. In some embodiments, a pipeline flush command is 2412 is required immediately before a pipeline switch via the pipeline select command 2413.

In some embodiments, a pipeline control command 2414 configures a graphics pipeline for operation and is used to program the 3D pipeline 2422 and the media pipeline 2424. In some embodiments, pipeline control command 2414 configures the pipeline state for the active pipeline. In one embodiment, the pipeline control command 2414 is used for pipeline synchronization and to clear data from one or more cache memories within the active pipeline before processing a batch of commands.

In some embodiments, return buffer state commands 2416 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2416 includes selecting the size and number of return buffers to use for a set of pipeline operations.

The remaining commands in the command sequence differ based on the active pipeline for operations. Based on a pipeline determination 2420, the command sequence is tailored to the 3D pipeline 2422 beginning with the 3D pipeline state 2430, or the media pipeline 2424 beginning at the media pipeline state 2440.

The commands for the 3D pipeline state 2430 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 2430 commands are also able to selectively disable or bypass certain pipeline elements if those elements will not be used.

In some embodiments, 3D primitive 2432 command is used to submit 3D primitives to be processed by the 3D pipeline. Commands and associated parameters that are passed to the graphics processor via the 3D primitive 2432 command are forwarded to the vertex fetch function in the graphics pipeline. The vertex fetch function uses the 3D primitive 2432 command data to generate vertex data structures. The vertex data structures are stored in one or more return buffers. In some embodiments, 3D primitive 2432 command is used to perform vertex operations on 3D primitives via vertex shaders. To process vertex shaders, 3D pipeline 2422 dispatches shader execution threads to graphics processor execution units.

In some embodiments, 3D pipeline 2422 is triggered via an execute 2434 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2410 follows the media pipeline 2424 path when performing media operations. In general, the specific use and manner of programming for the media pipeline 2424 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2424 is configured in a similar manner as the 3D pipeline 2422. A set of media pipeline state commands 2440 are dispatched or placed into in a command queue before the media object commands 2442. In some embodiments, media pipeline state commands 2440 include data to configure the media pipeline elements that will be used to process the media objects. This includes data to configure the video decode and video encode logic within the media pipeline, such as encode or decode format. In some embodiments, media pipeline state commands 2440 also support the use one or more pointers to "indirect" state elements that contain a batch of state settings.

In some embodiments, media object commands 2442 supply pointers to media objects for processing by the media pipeline. The media objects include memory buffers containing video data to be processed. In some embodiments, all media pipeline states must be valid before issuing a media object command 2442. Once the pipeline state is configured and media object commands 2442 are queued, the media pipeline 2424 is triggered via an execute command 2444 or an equivalent execute event (e.g., register write). Output from media pipeline 2424 may then be post processed by operations provided by the 3D pipeline 2422 or the media pipeline 2424. In some embodiments, GPGPU operations are configured and executed in a similar manner as media operations.

Graphics Software Architecture

Figure 25:
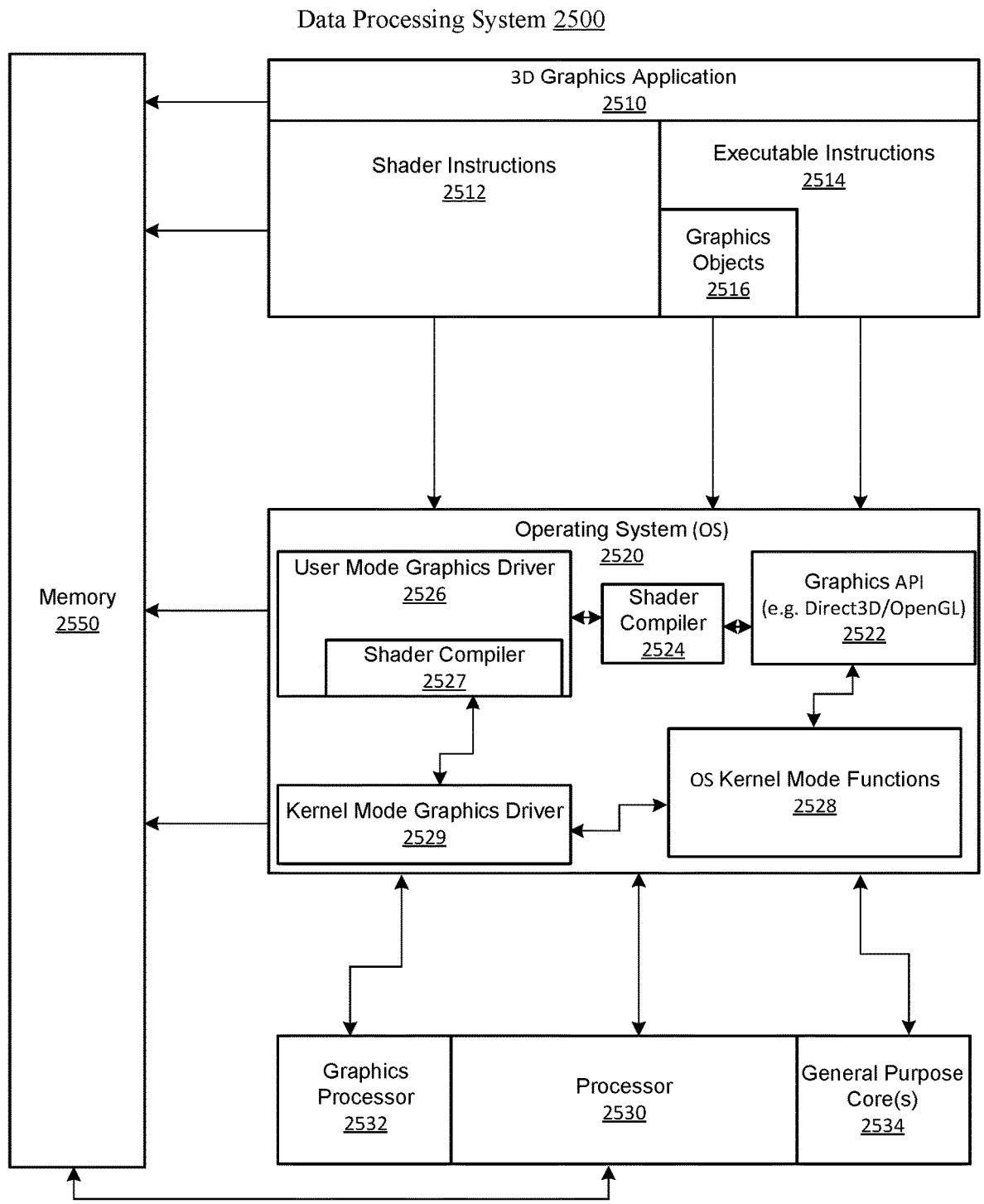
FIG. 25 is a block diagram of an example of a graphics software architecture according to an embodiment.

FIG. 25 illustrates exemplary graphics software architecture for a data processing system 2500 according to some embodiments. In some embodiments, software architecture includes a 3D graphics application 2510, an operating system 2520, and at least one processor 2530. In some embodiments, processor 2530 includes a graphics processor 2532 and one or more general-purpose processor core(s) 2534. The graphics application 2510 and operating system 2520 each execute in the system memory 2550 of the data processing system.

In some embodiments, 3D graphics application 2510 contains one or more shader programs including shader instructions 2512. The shader language instructions may be in a high-level shader language, such as the High Level Shader Language (HLSL) or the OpenGL Shader Language (GLSL). The application also includes executable instructions 2514 in a machine language suitable for execution by the general-purpose processor core 2534. The application also includes graphics objects 2516 defined by vertex data.

In some embodiments, operating system 2520 is a Microsoft® Windows® operating system from the Microsoft Corporation, a proprietary UNIX-like operating system, or an open source UNIX-like operating system using a variant of the Linux kernel. When the Direct3D API is in use, the operating system 2520 uses a front-end shader compiler 2524 to compile any shader instructions 2512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2510.

In some embodiments, user mode graphics driver 2526 contains a back-end shader compiler 2527 to convert the shader instructions 2512 into a hardware specific representation. When the OpenGL API is in use, shader instructions 2512 in the GLSL high-level language are passed to a user mode graphics driver 2526 for compilation. In some embodiments, user mode graphics driver 2526 uses operating system kernel mode functions 2528 to communicate with a kernel mode graphics driver 2529. In some embodiments, kernel mode graphics driver 2529 communicates with graphics processor 2532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 26:
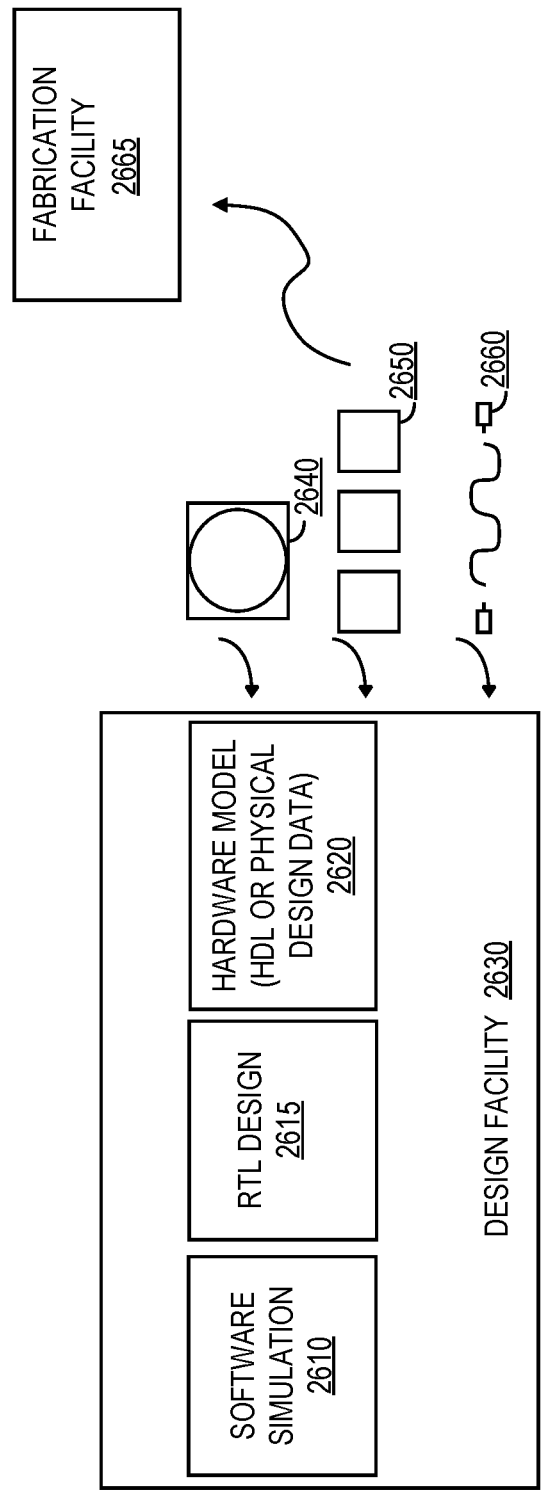
FIG. 26 is a block diagram of an example of an intellectual property (IP) core development system according to an embodiment.

FIG. 26 is a block diagram illustrating an IP core development system 2600 that may be used to manufacture an integrated circuit to perform operations according to an embodiment. The IP core development system 2600 may be used to generate modular, re-usable designs that can be incorporated into a larger design or used to construct an entire integrated circuit (e.g., an SOC integrated circuit). A design facility 2630 can generate a software simulation 2610 of an IP core design in a high level programming language (e.g., C/C++). The software simulation 2610 can be used to design, test, and verify the behavior of the IP core. A register transfer level (RTL) design can then be created or synthesized from the simulation model 2600. The RTL design 2615 is an abstraction of the behavior of the integrated circuit that models the flow of digital signals between hardware registers, including the associated logic performed using the modeled digital signals. In addition to an RTL design 2615, lower-level designs at the logic level or transistor level may also be created, designed, or synthesized. Thus, the particular details of the initial design and simulation may vary.

The RTL design 2615 or equivalent may be further synthesized by the design facility into a hardware model 2620, which may be in a hardware description language (HDL), or some other representation of physical design data. The HDL may be further simulated or tested to verify the IP core design. The IP core design can be stored for delivery to a $3^{rd}$ party fabrication facility 2665 using non-volatile memory 2640 (e.g., hard disk, flash memory, or any non-volatile storage medium). Alternatively, the IP core design may be transmitted (e.g., via the Internet) over a wired connection 2650 or wireless connection 2660. The fabrication facility 2665 may then fabricate an integrated circuit that is based at least in part on the IP core design. The fabricated integrated circuit can be configured to perform operations in accordance with at least one embodiment described herein.

Figure 27:
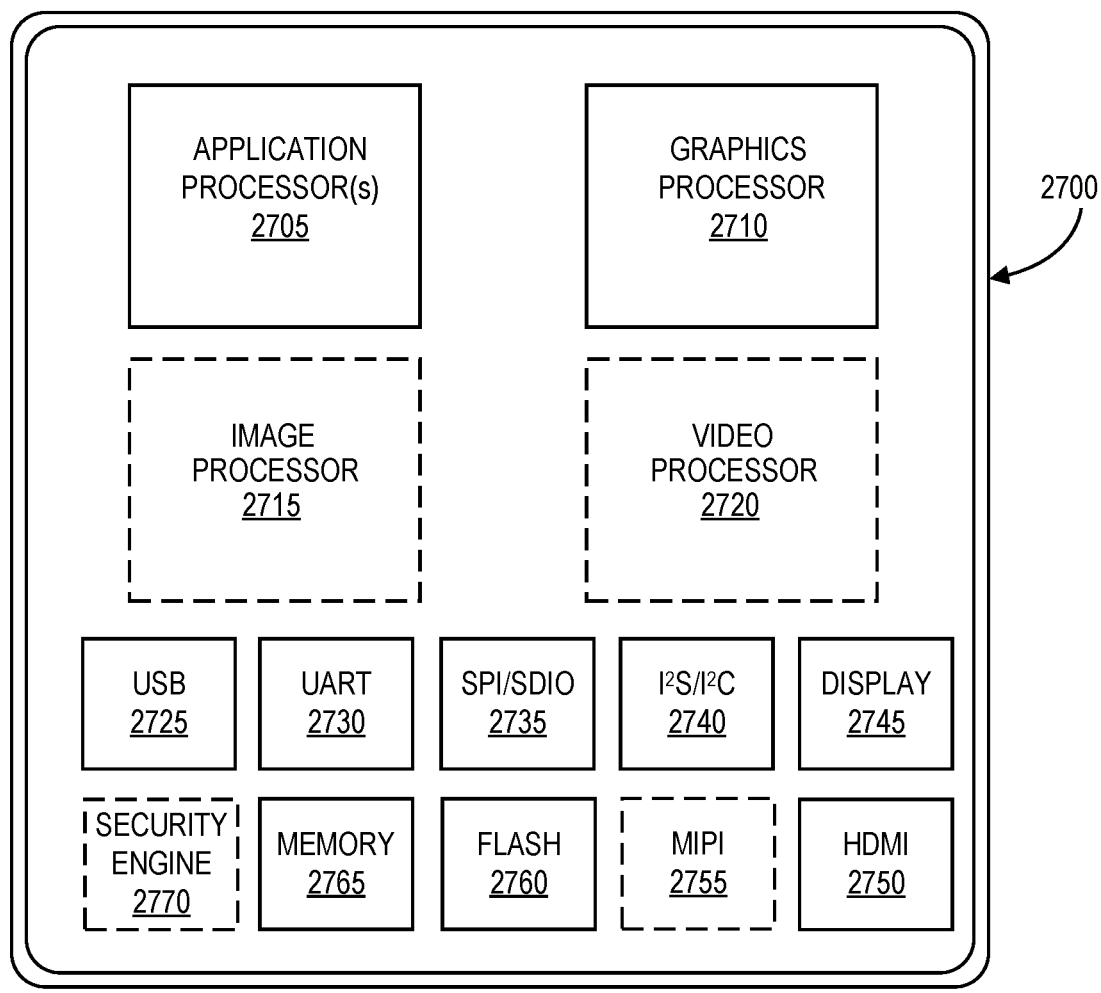
FIG. 27 is a block diagram of an example of a system on a chip integrated circuit according to an embodiment.

FIG. 27 is a block diagram illustrating an exemplary system on a chip integrated circuit 2700 that may be fabricated using one or more IP cores, according to an embodiment. The exemplary integrated circuit includes one or more application processors 2705 (e.g., CPUs), at least one graphics processor 2710, and may additionally include an image processor 2715 and/or a video processor 2720, any of which may be a modular IP core from the same or multiple different design facilities. The integrated circuit includes peripheral or bus logic including a USB controller 2725, UART controller 2730, an SPI/SDIO controller 2735, and an $I^2S/I^2C$ controller 2740. Additionally, the integrated circuit can include a display device 2745 coupled to one or more of a high-definition multimedia interface (HDMI) controller 2750 and a mobile industry processor interface (MIPI) display interface 2755. Storage may be provided by a flash memory subsystem 2760 including flash memory and a flash memory controller. Memory interface may be provided via a memory controller 2765 for access to SDRAM or SRAM memory devices. Some integrated circuits additionally include an embedded security engine 2770.

Additionally, other logic and circuits may be included in the processor of integrated circuit 2700, including additional graphics processors/cores, peripheral interface controllers, or general purpose processor cores.

Advantageously, any of the above systems, processors, graphics processors, apparatuses, and/or methods may be integrated or configured with any of the various embodiments described herein (e.g. or portions thereof), including, for example, those described in the following Additional Notes and Examples.

Additional Notes and Examples

Example 1 may include an electronic processing system, comprising a display processor to generate image data for a display, a memory communicatively coupled to the display processor to store a two-dimensional (2D) frame which corresponds to a projection from a 360 video space, a quality selector communicatively coupled to the display processor to select a quality factor for a first block of the 2D frame based on quality information from one or more neighboring blocks of the 2D frame, wherein the one or more neighboring blocks of the 2D frame includes one or more blocks which are neighboring to the first block of the 2D frame only in the 360 video space, a range adjuster communicatively coupled to the display processor to adjust a search range for the 2D frame based on a search area of the 2D frame, and a viewport manager communicatively coupled to the display processor to determine if a request for a viewport of the 2D frame extends beyond a first edge of the 2D frame and to fill the requested viewport with wrap-around image information.

Example 2 may include the system of Example 1, further comprising a motion estimator communicatively coupled to the display processor to estimate motion information based on both color information and depth information.

Example 3 may include the system of Example 2, wherein the motion estimator is further to determine a first motion estimate based on the depth information, and to determine a second motion estimate based on the first motion estimate and the color information.

Example 4 may include the system of Example 1, wherein the quality selector is further to select a quantization parameter for the second block based on quantization parameter information for the first block if the first block is determined to be the neighbor of the second block in the 360 video space.

Example 5 may include the system of Example 1, wherein the 2D frame corresponds to an equirectangular projection of the 360 video space, and wherein the range adjuster is further to adjust a first search range for a pole area of the 2D frame to be relatively larger than a second search range for a central area of the 2D frame.

Example 6 may include the system of Example 1, wherein the viewport manager is further to fill the requested viewport with image information starting from a second edge of the frame which is contiguous with the first edge in 360 video space.

Example 7 may include a graphics apparatus, comprising an encoder to encode a first block of a two-dimensional (2D) frame, where the 2D frame corresponds to a projection of a 360 video space, and a quality selector communicatively coupled to the encoder to determine if the first block is a neighbor of a second block of the 2D frame in the 360 video space, and to select a quality factor for the second block based on quality information for the first block if the first block is determined to be the neighbor of the second block in the 360 video space.

Example 8 may include the apparatus of Example 7, wherein the quality selector is further to select a quantization parameter for the second block based on quantization parameter information for the first block if the first block is determined to be the neighbor of the second block in the 360 video space.

Example 9 may include the apparatus of Example 7, wherein the quality selector is further to determine a difference between a first quality factor for the first block and the selected quality factor, and to adjust the selected quality factor to keep the difference within a difference threshold.

Example 10 may include the apparatus of Example 7, wherein the encoder is further to encode the second block of the 2D frame based on the selected quality factor.

Example 11 may include the apparatus of Example 7, further comprising a range adjuster communicatively coupled to the encoder to adjust a search range for the 2D frame based on a search area of the 2D frame.

Example 12 may include the apparatus of Example 7, further comprising a viewport manager communicatively coupled to the encoder to determine if a request for a viewport of the 2D frame extends beyond a first edge of the 2D frame and to fill the requested viewport with wrap-around image information.

Example 13 may include the apparatus of Example 7, further comprising a motion estimator communicatively coupled to the display processor to estimate motion information based on both color information and depth information.

Example 14 may include a method of processing a 360 video, comprising encoding a first block of a two-dimensional (2D) frame, where the 2D frame corresponds to a projection of a 360 video space, determining if the first block is a neighbor of a second block of the 2D frame in the 360 video space, and selecting a quality factor for the second block based on quality information for the first block if the first block is determined to be the neighbor of the second block in the 360 video space.

Example 15 may include the method of Example 14, further comprising selecting a quantization parameter for the second block based on quantization parameter information for the first block if the first block is determined to be the neighbor of the second block in the 360 video space.

Example 16 may include the method of Example 14, further comprising determining a difference between a first quality factor for the first block and the selected quality factor, and adjusting the selected quality factor to keep the difference within a difference threshold.

Example 17 may include the method of Example 14, further comprising encoding the second block of the 2D frame based on the selected quality factor.

Example 18 may include at least one computer readable medium, comprising a set of instructions, which when executed by a computing device cause the computing device to encode a first block of a two-dimensional (2D) frame, where the 2D frame corresponds to a projection of a 360 video space, determine if the first block is a neighbor of a second block of the 2D frame in the 360 video space, and select a quality factor for the second block based on quality information for the first block if the first block is determined to be the neighbor of the second block in the 360 video space.

Example 19 may include the at least one computer readable medium of Example 18, comprising a further set of instructions, which when executed by a computing device cause the computing device to select a quantization parameter for the second block based on quantization parameter information for the first block if the first block is determined to be the neighbor of the second block in the 360 video space.

Example 20 may include the at least one computer readable medium of Example 18, comprising a further set of instructions, which when executed by a computing device cause the computing device to determine a difference between a first quality factor for the first block and the selected quality factor, and adjust the selected quality factor to keep the difference within a difference threshold.

Example 21 may include the at least one computer readable medium of Example 18, comprising a further set of instructions, which when executed by a computing device cause the computing device to encode the second block of the 2D frame based on the selected quality factor.

Example 22 may include a graphics apparatus, comprising means for encoding a first block of a two-dimensional (2D) frame, where the 2D frame corresponds to a projection of a 360 video space, means for determining if the first block is a neighbor of a second block of the 2D frame in the 360 video space, and means for selecting a quality factor for the second block based on quality information for the first block if the first block is determined to be the neighbor of the second block in the 360 video space.

Example 23 may include the apparatus of Example 22, further comprising means for selecting a quantization parameter for the second block based on quantization parameter information for the first block if the first block is determined to be the neighbor of the second block in the 360 video space.

Example 24 may include the apparatus of Example 22, further comprising means for determining a difference between a first quality factor for the first block and the selected quality factor, and means for adjusting the selected quality factor to keep the difference within a difference threshold.

Example 25 may include the apparatus of Example 22, further comprising means for encoding the second block of the 2D frame based on the selected quality factor.

Example 26 may include a graphics apparatus, comprising an encoder to encode a first block of a two-dimensional (2D) frame, where the 2D frame corresponds to a projection of a 360 video space, and a range adjuster communicatively coupled to the encoder to adjust a search range for the 2D frame based on a search area of the 2D frame.

Example 27 may include the apparatus of Example 26, wherein the range adjuster is further to adjust a first search range for a first search area of the 2D frame to be relatively larger than a second search range for a second search area of the 2D frame based on the first search area having relatively more geometric distortion as compared to the second search area.

Example 28 may include the apparatus of Example 26, wherein the 2D frame corresponds to an equirectangular projection of the 360 video space, and wherein the range adjuster is further to adjust a first search range for a pole area of the 2D frame to be relatively larger than a second search range for a central area of the 2D frame.

Example 29 may include the apparatus of Example 28, wherein the encoder is further to perform a motion estimation for the 2D frame based on the first and second search ranges.

Example 30 may include the apparatus of Example 26, further comprising a viewport manager communicatively coupled to the encoder to determine if a request for a viewport of the 2D frame extends beyond a first edge of the 2D frame and to fill the requested viewport with wrap-around image information.

Example 31 may include the apparatus of Example 26, further comprising a motion estimator communicatively coupled to the display processor to estimate motion information based on both color information and depth information.

Example 32 may include a method of processing a 360 video, comprising encoding a first block of a two-dimensional (2D) frame, where the 2D frame corresponds to a projection of a 360 video space, and adjusting a search range for the 2D frame based on a search area of the 2D frame.

Example 33 may include the method of Example 32, further comprising adjusting a first search range for a first search area of the 2D frame to be relatively larger than a second search range for a second search area of the 2D frame based on the first search area having relatively more geometric distortion as compared to the second search area.

Example 34 may include the method of Example 32, wherein the 2D frame corresponds to an equirectangular projection of the 360 video space, further comprising adjusting a first search range for a pole area of the 2D frame to be relatively larger than a second search range for a central area of the 2D frame.

Example 35 may include the method of Example 34, further comprising performing a motion estimation for the 2D frame based on the first and second search ranges.

Example 36 may include at least one computer readable medium, comprising a set of instructions, which when executed by a computing device cause the computing device to encode a first block of a two-dimensional (2D) frame, where the 2D frame corresponds to a projection of a 360 video space, and adjust a search range for the 2D frame based on a search area of the 2D frame.

Example 37 may include the at least one computer readable medium of Example 36, comprising a further set of instructions, which when executed by a computing device cause the computing device to adjust a first search range for a first search area of the 2D frame to be relatively larger than a second search range for a second search area of the 2D frame based on the first search area having relatively more geometric distortion as compared to the second search area.

Example 38 may include the at least one computer readable medium of Example 36, wherein the 2D frame corresponds to an equirectangular projection of the 360 video space, comprising a further set of instructions, which when executed by a computing device cause the computing device to adjust a first search range for a pole area of the 2D frame to be relatively larger than a second search range for a central area of the 2D frame.

Example 39 may include the at least one computer readable medium of Example 38, comprising a further set of instructions, which when executed by a computing device cause the computing device to perform a motion estimation for the 2D frame based on the first and second search ranges.

Example 40 may include a graphics apparatus, comprising means for encoding a first block of a two-dimensional (2D) frame, where the 2D frame corresponds to a projection of a 360 video space, and means for adjusting a search range for the 2D frame based on a search area of the 2D frame.

Example 41 may include the apparatus of Example 40, further comprising means for adjusting a first search range for a first search area of the 2D frame to be relatively larger than a second search range for a second search area of the 2D frame based on the first search area having relatively more geometric distortion as compared to the second search area.

Example 42 may include the apparatus of Example 40, wherein the 2D frame corresponds to an equirectangular projection of the 360 video space, further comprising means for adjusting a first search range for a pole area of the 2D frame to be relatively larger than a second search range for a central area of the 2D frame.

Example 43 may include the apparatus of Example 42, further comprising means for performing a motion estimation for the 2D frame based on the first and second search ranges.

Example 44 may include a graphics apparatus, comprising a memory communicatively coupled to the display processor to store a frame of a video, and a viewport manager communicatively coupled to the memory to determine if a request for a viewport of the frame extends beyond a first edge of the frame, determine if the video is identified as 360 video, and fill the requested viewport with wrap-around image information if the video is identified as 360 video.

Example 45 may include the apparatus of Example 44, wherein the viewport manager is further to fill the requested viewport with image information starting from a second edge of the frame which is contiguous with the first edge in 360 video space.

Example 46 may include the apparatus of Example 45, wherein the viewport manager is further to identify the request as out-of-bounds if the video is not identified as 360 video.

Example 47 may include the apparatus of Example 46, further comprising a graphics processor including logic to implement the viewport manager.

Example 48 may include the apparatus of Example 47, further comprising a motion estimator communicatively coupled to the graphics processor to estimate motion information based on both color information and depth information.

Example 49 may include a method of processing a 360 video, comprising storing a frame of a video, and determining if a request for a viewport of the frame extends beyond a first edge of the frame, determining if the video is identified as 360 video, and filling the requested viewport with wrap-around image information if the video is identified as 360 video.

Example 50 may include the method of Example 49, further comprising filling the requested viewport with image information starting from a second edge of the frame which is contiguous with the first edge in 360 video space.

Example 51 may include the method of Example 49, further comprising identifying the request as out-of-bounds if the video is not identified as 360 video.

Example 52 may include the method of Example 51, further comprising returning a partial viewport if the video is not identified as 360 video.

Example 53 may include at least one computer readable medium, comprising a set of instructions, which when executed by a computing device cause the computing device to store a frame of a video, and determine if a request for a viewport of the frame extends beyond a first edge of the frame, determine if the video is identified as 360 video, and fill the requested viewport with wrap-around image information if the video is identified as 360 video.

Example 54 may include the at least one computer readable medium of Example 53, comprising a further set of instructions, which when executed by a computing device cause the computing device to fill the requested viewport with image information starting from a second edge of the frame which is contiguous with the first edge in 360 video space.

Example 55 may include the at least one computer readable medium of Example 53, comprising a further set of instructions, which when executed by a computing device cause the computing device to identify the request as out-of-bounds if the video is not identified as 360 video.

Example 56 may include the at least one computer readable medium of Example 55, comprising a further set of instructions, which when executed by a computing device cause the computing device to return a partial viewport if the video is not identified as 360 video.

Example 57 may include a graphics apparatus, comprising means for storing a frame of a video, and means for determining if a request for a viewport of the frame extends beyond a first edge of the frame, means for determining if the video is identified as 360 video, and means for filling the requested viewport with wrap-around image information if the video is identified as 360 video.

Example 58 may include the apparatus of Example 57, further comprising means for filling the requested viewport with image information starting from a second edge of the frame which is contiguous with the first edge in 360 video space.

Example 59 may include the apparatus of Example 57, further comprising means for identifying the request as out-of-bounds if the video is not identified as 360 video.

Example 60 may include the apparatus of Example 57, further comprising means for returning a partial viewport if the video is not identified as 360 video.

Example 61 may include a graphics apparatus, comprising a motion estimator to estimate motion information for a frame based on both color information from a frame and depth information, and an encoder communicatively coupled to the motion estimator to encode the frame based on the estimated motion information.

Example 62 may include the apparatus of Example 61, wherein the motion estimator is further to determine a first motion estimate based on the depth information, and to determine a second motion estimate based on the first motion estimate and the color information.

Example 63 may include the apparatus of Example 62, wherein the motion estimator is further to determine an estimated motion vector based on the first motion estimate and the second motion estimate.

Example 64 may include the apparatus of Example 62, wherein the motion estimator is further to determine one of segmentation information and depth discontinuity information based on the depth information.

Example 65 may include a method of processing a frame, comprising estimating motion information for a frame based on both color information from a frame and depth information, and encoding the frame based on the estimated motion information.

Example 66 may include the method of Example 65, further comprising determining a first motion estimate based on the depth information, and determining a second motion estimate based on the first motion estimate and the color information.

Example 67 may include the method of Example 66, further comprising determining an estimated motion vector based on the first motion estimate and the second motion estimate.

Example 68 may include the method of Example 66, further comprising determining one of segmentation information and depth discontinuity information based on the depth information.

Example 69 may include at least one computer readable medium, comprising a set of instructions, which when executed by a computing device cause the computing device to estimate motion information for a frame based on both color information from a frame and depth information, and encode the frame based on the estimated motion information.

Example 70 may include the at least one computer readable medium of Example 69, comprising a further set of instructions, which when executed by a computing device cause the computing device to determine a first motion estimate based on the depth information, and determine a second motion estimate based on the first motion estimate and the color information.

Example 71 may include the at least one computer readable medium of Example 70, comprising a further set of instructions, which when executed by a computing device cause the computing device to determine an estimated motion vector based on the first motion estimate and the second motion estimate.

Example 72 may include the at least one computer readable medium of Example 70, comprising a further set of instructions, which when executed by a computing device cause the computing device to determine one of segmentation information and depth discontinuity information based on the depth information.

Example 73 may include a graphics apparatus, comprising means for estimating motion information for a frame based on both color information from a frame and depth information, and means for encoding the frame based on the estimated motion information.

Example 74 may include the apparatus of Example 73, further comprising means for determining a first motion estimate based on the depth information, and means for determining a second motion estimate based on the first motion estimate and the color information.

Example 75 may include the apparatus of Example 74, further comprising means for determining an estimated motion vector based on the first motion estimate and the second motion estimate.

Example 76 may include the apparatus of Example 74, further comprising means for determining one of segmentation information and depth discontinuity information based on the depth information.

Example 77 may include a graphics apparatus, comprising a memory communicatively coupled to the display processor to store a frame of a video, and a viewport manager communicatively coupled to the memory to receive a block instruction request to perform a read/write operation for a viewport of the frame, determine if the block instruction request for the viewport of the frame extends beyond a first edge of the frame, determine if the video is identified as 360 video, and perform the read/write operation for the viewport with wrap-around image information if the video is identified as 360 video.

Example 78 may include a method of processing 360 video, comprising receiving a block instruction request to perform a read/write operation for a viewport of the frame, determining if the block instruction request for the viewport of the frame extends beyond a first edge of the frame, determining if the video is identified as 360 video, and performing the read/write operation for the viewport with wrap-around image information if the video is identified as 360 video.

Example 79 may include at least one computer readable medium, comprising a set of instructions, which when executed by a computing device cause the computing device to receive a block instruction request to perform a read/write operation for a viewport of the frame, determine if the block instruction request for the viewport of the frame extends beyond a first edge of the frame, determine if the video is identified as 360 video, and perform the read/write operation for the viewport with wrap-around image information if the video is identified as 360 video.

Example 80 may include a graphics apparatus, comprising means for receiving a block instruction request to perform a read/write operation for a viewport of the frame, means for determining if the block instruction request for the viewport of the frame extends beyond a first edge of the frame, means for determining if the video is identified as 360 video, and means for performing the read/write operation for the viewport with wrap-around image information if the video is identified as 360 video.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

INDEX OF REFERENCE SIGNS

100: Computing system
600: electronic processing system
700: graphics apparatus
730: method
740: system
750: 2D video frame
751: viewport
752: portion
753: portion
760: 2D video frame
761: block
762: block
763: block
764: block
766: frame boundary
770: 2D video frame
771: block
772: block
773: block
774: block
776: left frame boundary
777: right frame boundary
778: top frame boundary
779: bottom frame boundary
780: cube
790: 2D video frame
791: block
792: block
793: block
794: block
796: left frame boundary
797: right frame boundary
798: top frame boundary
799: bottom frame boundary
800: graphics apparatus
830: method
840: 2D frame
842: north pole area
844: south pole area
846: central area
900: graphics apparatus
930: method
940: 360 video
941: flat frame
942: left edge
943: right edge
1000: graphics apparatus
1041: first frame
1042: second frame
1043: extra frame
1044: depth discontinuity area
1100: system
1202: electromagnetic beam
1204: return electromagnetic beam
1206: distance
1300: system
1400: graphics display system
1402: hardware profile data
1406: automatic topology settings
1430: display units
1440: presentation
1500: cloud gaming system
2100: thread execution logic
2640: non-volatile memory
2650: wired connection
2660: wireless connection
G1: first group of blocks
G2: second group of blocks
d1: distance
d2: distance

We claim:

1. A computing system comprising:
a graphics processor;
a central processing unit; and
a memory including a set of instructions, which when executed by one or more of the graphics processor or the central processing unit, cause the computing system to:
identify a two-dimensional (2D) frame that is to include a first block and a second block, wherein the first block is to be discontinuous from the second block in the 2D frame, wherein the 2D frame is to correspond to a projection from a 360 video space;
identify that the first block and the second block are to be equidistant from an intersection in the 2D frame of a first line and a second line;
identify that the first block and the second block are to be neighbors in the 360 video space based on the first block and the second block being equidistant from the intersection in the 2D frame;
identify that a first set of blocks in the 2D frame are to include the first block and the second block based on the first block and the second block being neighbors in the 360 video space;
select a first quantization parameter value for each block of the first set of blocks;
identify a second set of blocks in the 2D frame; and
select a second quantization parameter value for each block of the second set of blocks, wherein the second quantization parameter value is to be different from the first quantization parameter value.

2. The system of claim 1, wherein the instructions, when executed, cause the computing system to select the second quantization parameter value based on the first quantization parameter value.

3. The system of claim 1, wherein the instructions, when executed, cause the computing system to determine that the first block of the first set of blocks is to neighbor a third block of the first set of blocks in the 360 video space, wherein the first block is to be discontiguous to the third block in the 2D frame.

4. The system of claim 3, wherein the instructions, when executed, cause the computing system to:

determine that the first block is to neighbor the third block in the 360 video space based on a first distance of the first block to a centerline of the 2D frame, and a second distance of the third block to the centerline of the 2D frame.

5. The system of claim 4, wherein the instructions, when executed, cause the computing system to determine that the first block is to neighbor the third block in the 360 video space based on an identification that the first and third blocks are adjacent to a same boundary of the 2D frame.

6. The system of claim 3, wherein the instructions, when executed, cause the computing system to determine that the first block neighbors the third block in the 360 video space based on a first distance of the first block to a boundary of the 2D frame, and a second distance of the third block to the boundary of the 2D frame.

7. An apparatus comprising:
a memory; and
logic communicatively coupled to the memory, wherein the logic is implemented at least partly in one or more of configurable logic or fixed-functionality logic hardware, the logic communicatively coupled to the memory to:
identify a two-dimensional (2D) frame that is to include a first block and a second block, wherein the first block is to be discontinuous from the second block in the 2D frame, wherein the 2D frame is to correspond to a projection from a 360 video space;
identify that the first block and the second block are to be equidistant from an intersection in the 2D frame of a first line and a second line;
identify that the first block and the second block are to be neighbors in the 360 video space based on the first block and the second block being equidistant from the intersection in the 2D frame;
identify that a first set of blocks in the 2D frame are to include the first block and the second block based on the first block and the second block being neighbors in the 360 video space;
select a first quantization parameter value for each block of the first set of blocks;
identify a second set of blocks in the 2D frame; and
select a second quantization parameter value for each block of the second set of blocks, wherein the second quantization parameter value is to be different from the first quantization parameter value.

8. The apparatus of claim 7, wherein the logic is to select the second quantization parameter value based on the first quantization parameter value.

9. The apparatus of claim 7, wherein the logic is to determine that the first block of the first set of blocks is to neighbor a third block of the first set of blocks in the 360 video space, wherein the first block is to be discontiguous to the third block in the 2D frame.

10. The apparatus of claim 9, wherein the logic is to determine that the first block is to neighbor the third block in the 360 video space based on a first distance of the first block to a centerline of the 2D frame, and a second distance of the third block to the centerline of the 2D frame.

11. The apparatus of claim 10, wherein the logic is to determine that the first block is to neighbor the third block in the 360 video space based on an identification that the first and third blocks are adjacent to a same boundary of the 2D frame.

12. The apparatus of claim 9, wherein the logic is to determine that the first block is to neighbor the third block in the 360 video space based on a first distance of the first block to a boundary of the 2D frame, and a second distance of the third block to the boundary of the 2D frame.

13. At least one non-transitory computer readable medium, comprising a set of instructions, which when executed by a computing device cause the computing device to:
identify a two-dimensional (2D) frame that is to include a first block and a second block, wherein the first block is to be discontinuous from the second block in the 2D frame, wherein the 2D frame is to correspond to a projection from a 360 video space;
identify that the first block and the second block are to be equidistant from an intersection in the 2D frame of a first line and a second line;
identify that the first block and the second block are to be neighbors in the 360 video space based on the first block and the second block being equidistant from the intersection in the 2D frame;
identify that a first set of blocks in the 2D frame are to include the first block and the second block based on the first block and the second block being neighbors in the 360 video space;
select a first quantization parameter value for each block of the first set of blocks;
identify a second set of blocks in the 2D frame; and
select a second quantization parameter value for each block of the second set of blocks, wherein the second quantization parameter value is to be different from the first quantization parameter value.

14. The at least one non-transitory computer readable medium of claim 13, comprising a further set of instructions, which when executed by a computing device cause the computing device to select the second quantization parameter value based on the first quantization parameter value.

15. The at least one non-transitory computer readable medium of claim 13, comprising a further set of instructions, which when executed by a computing device cause the computing device to determine that a first block of the first set of blocks is to neighbor a third block of the first set of blocks in the 360 video space, wherein the first block is to be discontiguous to the third block in the 2D frame.

16. The at least one non-transitory computer readable medium of claim 15, comprising a further set of instructions, which when executed by a computing device cause the computing device to determine that the first block is to neighbor the third block in the 360 video space based on a first distance of the first block to a centerline of the 2D frame, and a second distance of the third block to the centerline of the 2D frame.

17. The at least one non-transitory computer readable medium of claim 16, comprising a further set of instructions, which when executed by a computing device cause the computing device to determine that the first block is to neighbor the third block in the 360 video space based on an identification that the first and third blocks are adjacent to a same boundary of the 2D frame.

18. The at least one non-transitory computer readable medium of claim 15, comprising a further set of instructions, which when executed by a computing device cause the computing device to determine that the first block is to neighbor the third block in the 360 video space based on a first distance of the first block to a boundary of the 2D frame, and a second distance of the third block to the boundary of the 2D frame.

19. A method comprising:
identifying a two-dimensional (2D) frame that includes a first block and a second block, wherein the first block is discontinuous from the second block in the 2D frame, and wherein the 2D frame corresponds to a projection from a 360 video space;
identifying that the first block and the second block are equidistant from an intersection in the 2D frame of a first line and a second line;
identifying that the first block and the second block are neighbors in the 360 video space based on the first block and the second block being equidistant from the intersection in the 2D frame;
identifying that a first set of blocks in the 2D frame include the first block and the second block based on the first block and the second block being neighbors in the 360 video space;
selecting a first quantization parameter value for each block of the first set of blocks;
identifying a second set of blocks in the 2D frame; and
selecting a second quantization parameter value for each block of the second set of blocks, wherein the second quantization parameter value is to be different from the first quantization parameter value.

20. The method of claim 19, further comprising selecting the second quantization parameter value based on the first quantization parameter value.

21. The method of claim 19, further comprising determining that the first block of the first set of blocks neighbors a third block of the first set of blocks in the 360 video space, wherein the first block is discontiguous to the third block in the 2D frame.

22. The method of claim 21, further comprising determining that the first block neighbors the third block in the 360 video space based on a first distance of the first block to a centerline of the 2D frame, and a second distance of the third block to the centerline of the 2D frame.

23. The method of claim 22, further comprising determining that the first block neighbors the third block in the 360 video space based on an identification that the first and third blocks are adjacent to a same boundary of the 2D frame.

24. The method of claim 21, further comprising determining that the first block neighbors the third block in the 360 video space based on a first distance of the first block to a boundary of the 2D frame, and a second distance of the third block to the boundary of the 2D frame.

* * * * *